US005526197A

United States Patent [19]
Nelson et al.

[11] Patent Number: 5,526,197
[45] Date of Patent: Jun. 11, 1996

[54] TAPE DRIVE SYSTEM

[75] Inventors: Alfred M. Nelson, Redondo Beach; Robert P. Adams, Santa Monica, both of Calif.

[73] Assignee: Hightree Media Corporation, El Segundo, Calif.

[21] Appl. No.: 210,305

[22] Filed: Mar. 17, 1994

[51] Int. Cl.$^6$ ................................................ G11B 5/86
[52] U.S. Cl. ............................................................. 360/17
[58] Field of Search ................................. 360/17, 59, 16

[56]  References Cited

U.S. PATENT DOCUMENTS

| | | | |
|---|---|---|---|
| 3,777,075 | 12/1973 | Hendershot, III et al. | 360/17 |
| 3,827,077 | 7/1974 | Kobilka | 360/59 X |
| 3,971,069 | 7/1976 | Hanai et al. | 360/16 |
| 4,032,923 | 6/1977 | Pond et al. | 360/59 X |
| 5,311,371 | 5/1994 | Clark | 360/16 |

*Primary Examiner*—Andrew L. Sniezek
*Attorney, Agent, or Firm*—Ellsworth R. Roston; Charles H. Schwartz

[57]  ABSTRACT

A thermomagnetic layer on a slave tape has a Curie temperature above which it loses, and below which it stores, an image. Such layer is heated above the Curie temperature just before such layer records an image. To compensate for image stretching in such layer by the heat, the lines in a raster scan on the mirror-master tape are lengthened relative to such lines on a master tape during an image transfer between the tapes. To accomplish this, a rotary member holding the mirror-master tape has a larger diameter than, and rotates at the same angular speed as, a rotary member holding the master tape. To inhibit the slave tape separation from the heater by water vaporization in the thermomagnetic layer, (1) the heater heats such layer while the slave tape moves in a direction opposite to its movement during the image transfer or (2) a microwave oven heats such layer. The slave tape length may be determined from (1) the capstan revolutions for a reference tape of a given length and for the full length of the slave tape or (2) the angular revolutions of the slave tape supply and take-up reels at successive time instants, and the radius of the slave tape supply and take-up reels without tape on such reels. A sufficiently long slave tape may then be wound on the supply reel through an angular revolution of the particular reel dependent upon the image length on the master tape.

36 Claims, 27 Drawing Sheets

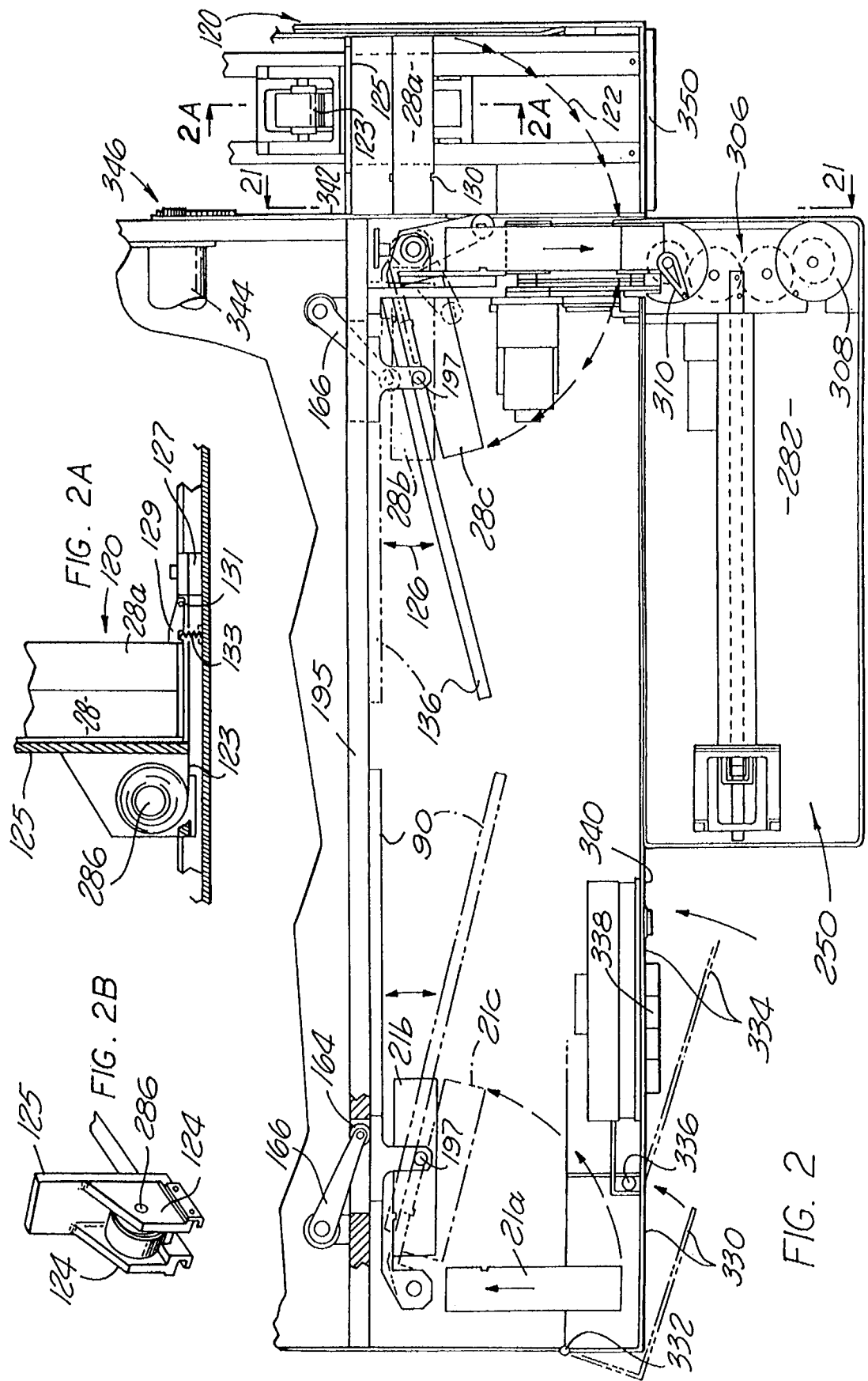

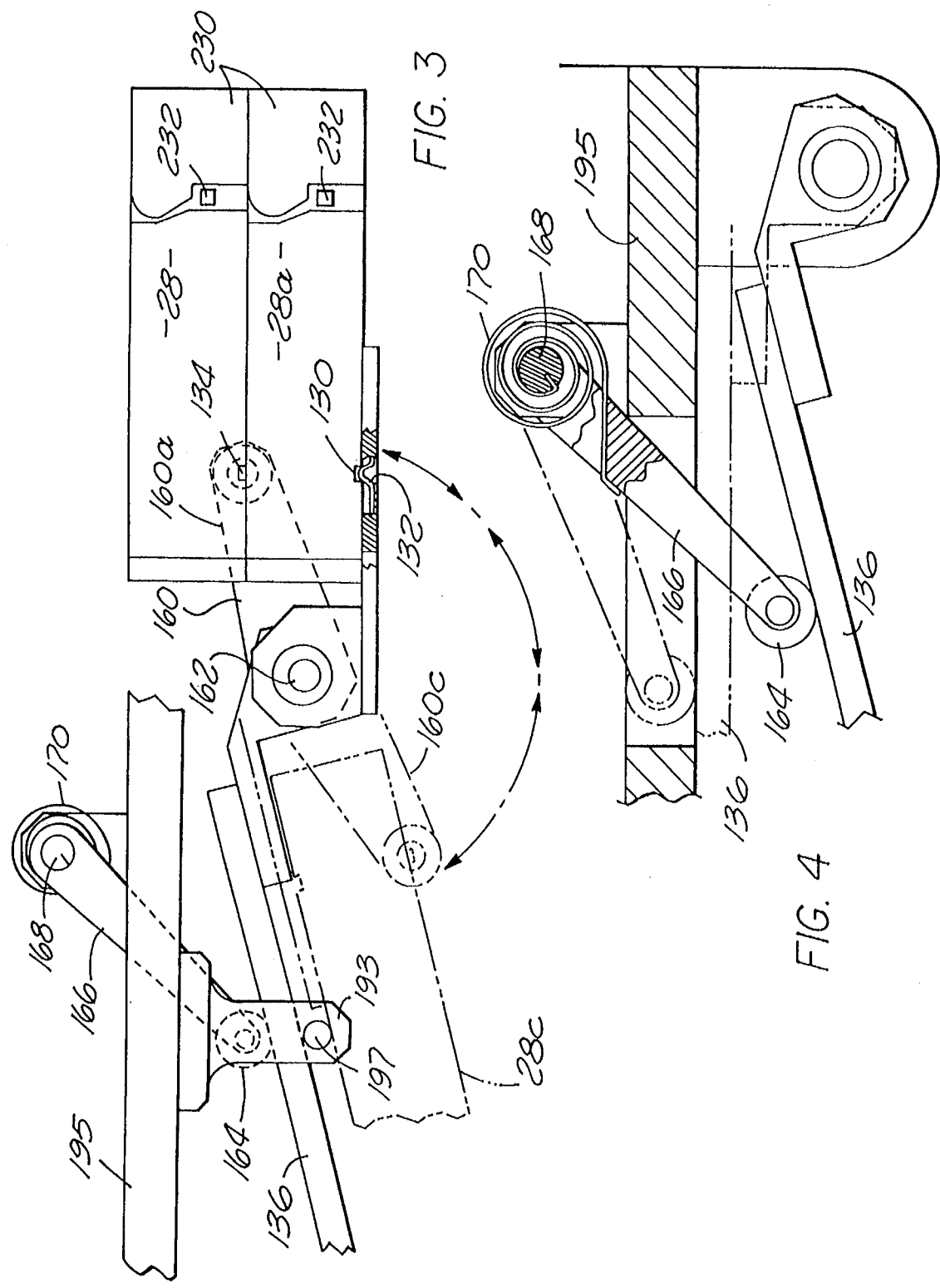

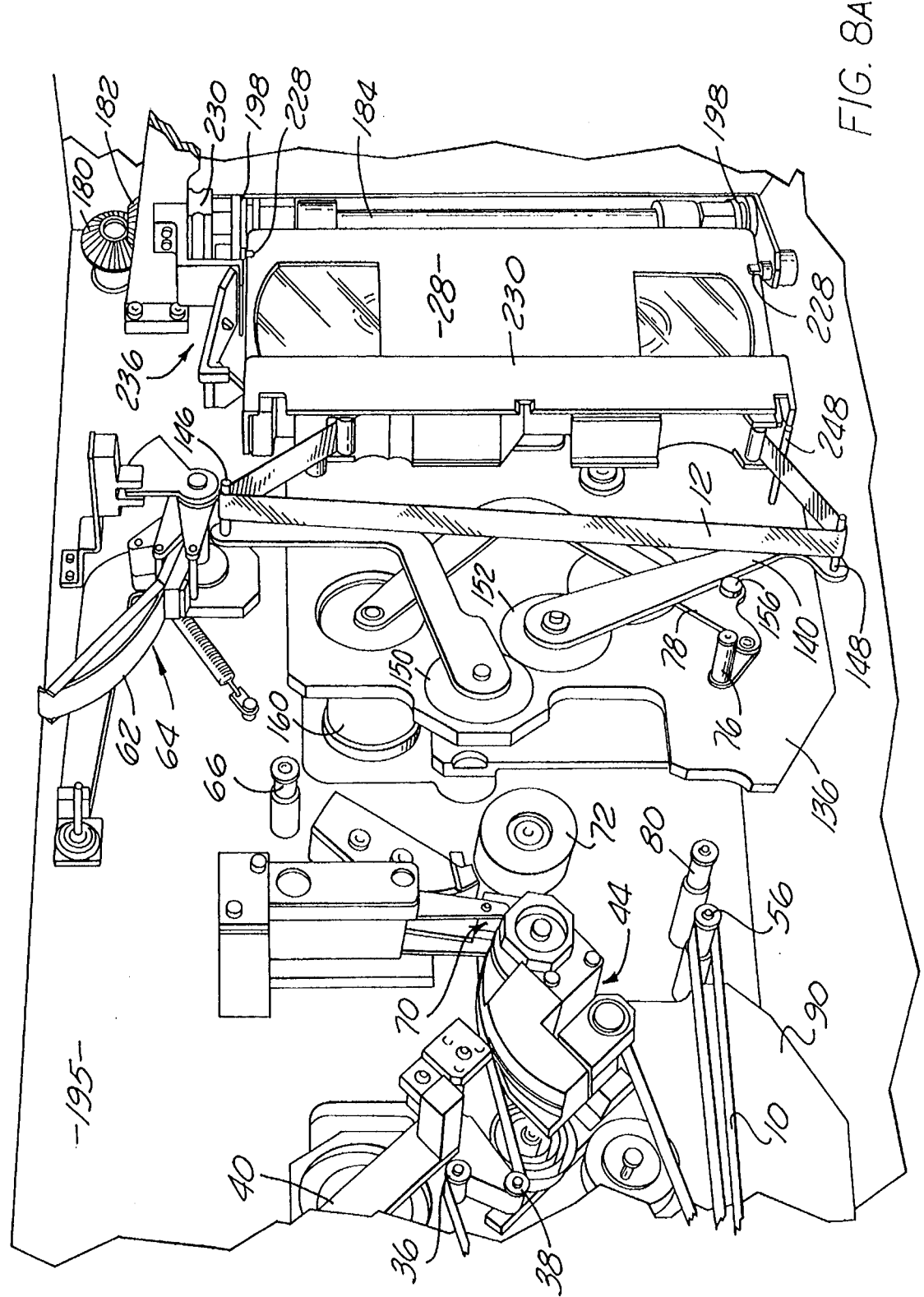

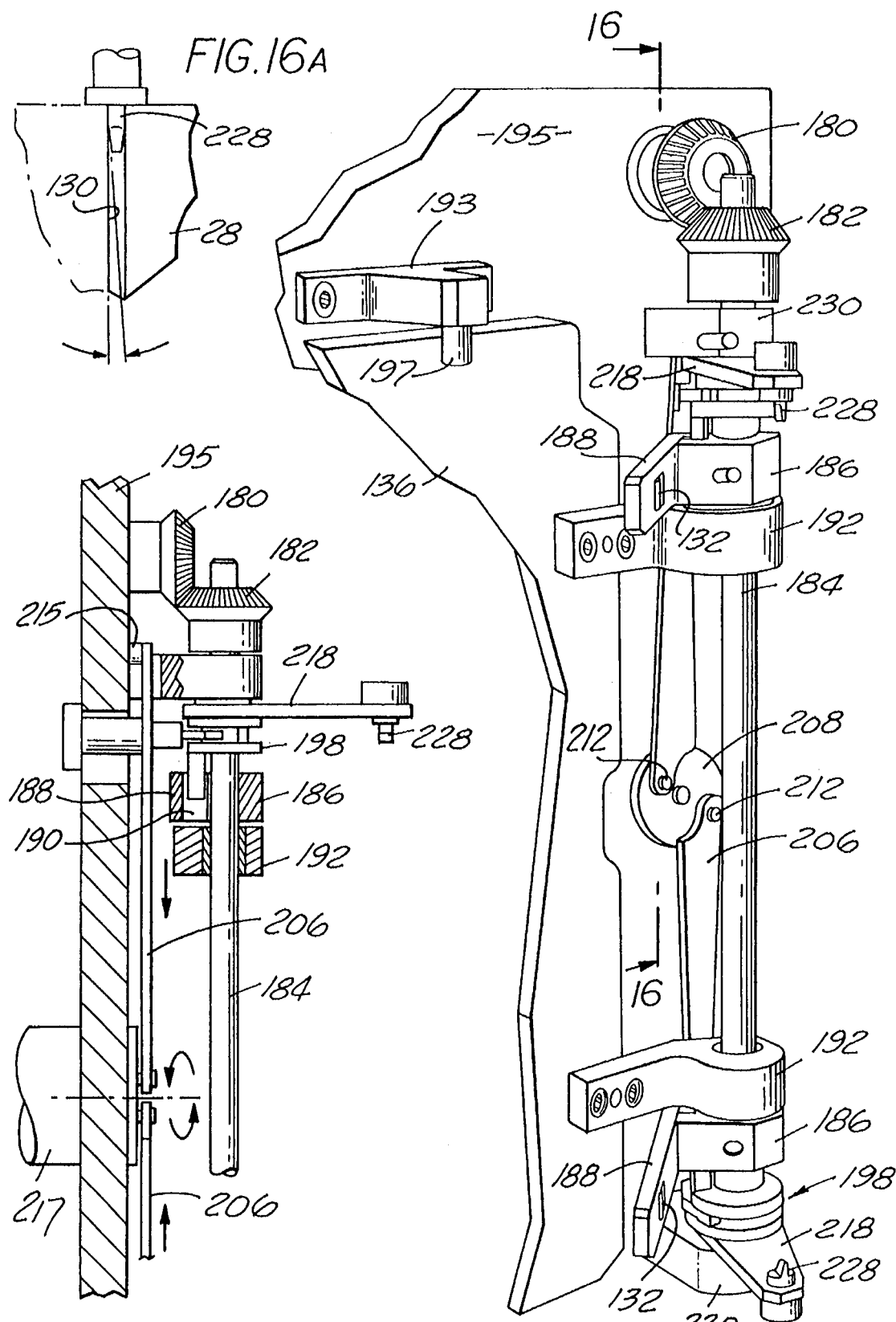

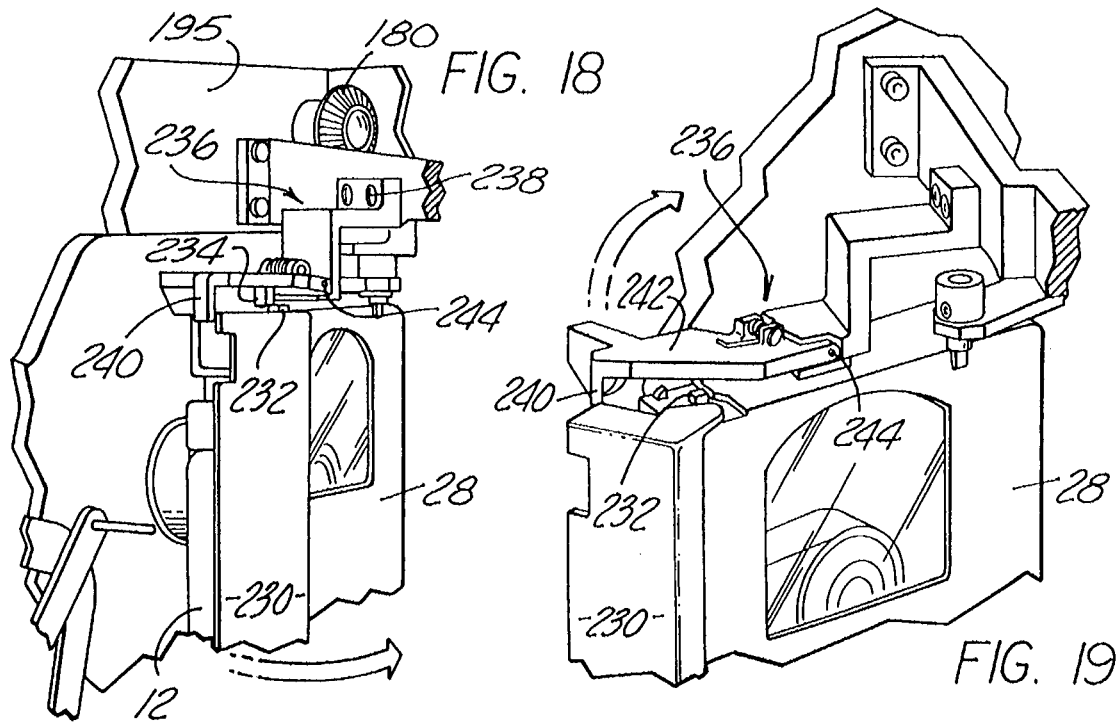
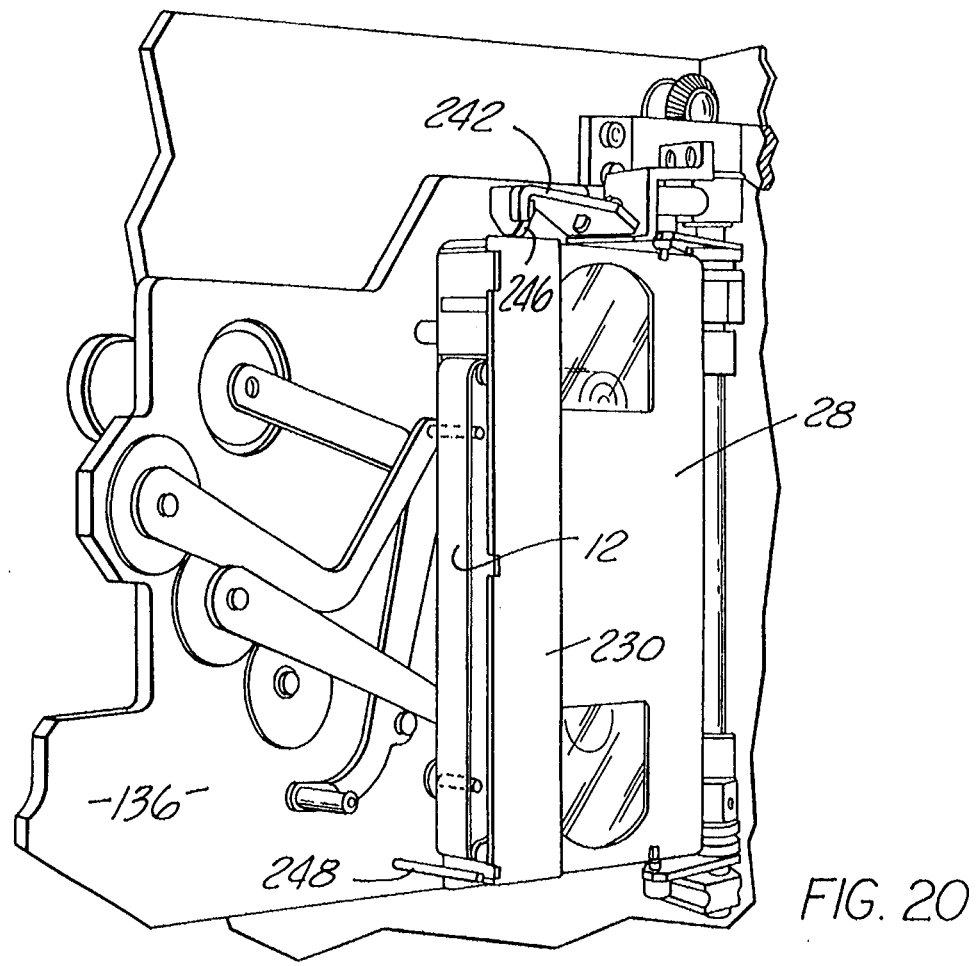

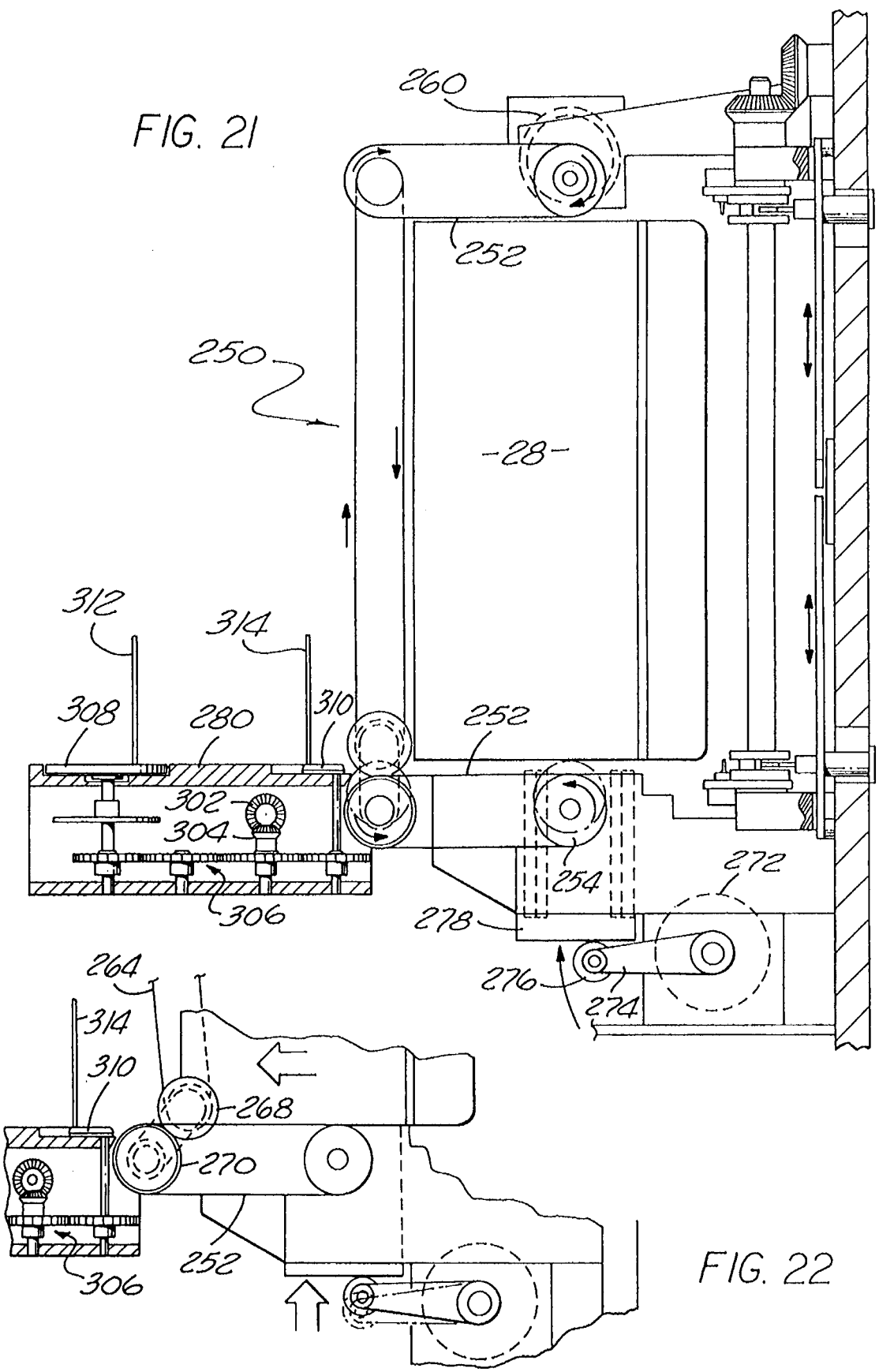

TAPE DRIVE SYSTEM

This invention relates to a system for, and a method of, recording an image on a slave tape. More particularly, the invention relates to a system for, and a method of, recording an image on a slave tape having a thermomagnetic layer with a Curie temperature above which the layer loses any image and below which the layer is capable of recording and storing an image. The invention particularly relates to a system for, and a method of, recording an image on a thermomagnetic layer of a slave tape with an accuracy and fidelity greater than that which has been capable of being attained in the prior art.

Visual and audio information is often stored on a tape for playback at a subsequent time. For example, visual and audio information relating to popular motion pictures is stored on tapes. These tapes are rented or sold at neighborhood stores. A popular movie such as "Aladdin" or a movie winning an Academy Award has millions of taped copies distributed to satisfy the demands of purchasers and renters. Substantially all of these taped copies have to be made available at a pre-selected release date in order to satisfy the pent-up demand of viewers for such taped copies. Although the demand for movie rentals and sales is great, it still seems to be increasing significantly from year to year.

Visual and audio information on tapes is not only provided in the form of movies for entertainment. It is also provided in large volume for business purposes. For example, large corporations deliver messages in the form of tapes to their sales personnel to acquaint such sales personnel with the construction, operation and advantages of new products. Since large corporations employ large numbers of sales personnel, many copies of such messages have to be prepared for distribution to such sales personnel.

The visual and audio information on most tapes is in magnetic form. One reason is that information in magnetic form can be relatively easily and inexpensively reproduced. For example, most reproducing apparatus in the home use magnetic heads to read the information stored magnetically on the tapes when the tapes are inserted into such apparatus. Another reason is that tapes with information recorded in magnetic form are less expensive to reproduce than tapes in other forms such as in optical form.

One type of tape for recording information in magnetic form has a thermomagnetic layer on the tape. The thermomagnetic layer may be formed from a suitable material such as chromium dioxide. The thermomagnetic layer has a Curie temperature at or above which any magnetic information on the tape is destroyed and below which magnetic information can be recorded on the tape. Thermomagnetic tape is advantageous because information can be recorded on the thermomagnetic tape at a temperature at or somewhat below the Curie temperature by pressing a master tape against the thermomagnetic layer on the slave tape at such a temperature. This causes the surface of the thermomagnetic layer to become cooled to a temperature below the Curie temperature by contact with the cool surface of the master tape. As the thermomagnetic layer cools to a temperature below the Curie temperature, the magnetic information on the magnetic tape becomes transferred to the thermomagnetic layer on the slave tape. The information on the master tape thus becomes transferred in mirror form to the thermomagnetic layer on the slave tape without having to use any magnetic heads to write information on the slave tape.

There is at least one apparatus now in use for transferring information in magnetic form on a master tape to a thermomagnetic layer on a slave tape. Although this apparatus is fast, it is large, cumbersome and expensive, and requires excessive electrical power. With the millions of copies that have to be made of a single movie such as the movie winning an Academy Award, it would be desirable to provide apparatus which is relatively inexpensive and which transfers information from a master tape to a slave tape in a minimal period of time. For example, it would be desirable to provide equipment which is relatively inexpensive and which transfer information from a master tape to a slave tape in a minimal period of time. For example, it would be desirable to provide equipment which is relatively inexpensive and which reproduces a two (2) hour movie in approximately thirty (30) to sixty (60) seconds without any need for using magnetic reproducing heads. Because of the desire, and actually the need, for such apparatus, a considerable effort has been devoted, and a significant amount of money has been expended, to develop apparatus which meet such criteria. In spite of such effort and such money expenditure, no satisfactory apparatus meeting such criteria has been provided to this date.

The invention disclosed and claimed in application Ser. No. 07/733,174 abandoned filed by us on Jul. 19, 1991 for a "Tape Duplicating System" and assigned by us to the assignee of record in this application provides apparatus which more than meets the criteria specified in the previous paragraph. It is able to record a two (2) hour movie in approximately thirty (30) to sixty (60) seconds such that the duplicated copy has the visual and audio fidelity of the original or master copy. It is compact so that it occupies relatively little space. This is important when a large number of apparatuses are used simultaneously in an enclosure such as a room to make duplicate copies. For example, the apparatus can be used to transfer the information on a master tape to a mirror-master tape, and subsequently the same apparatus can be used to transfer the information on the mirror-master tape to a slave tape, all without using recording heads.

In one embodiment of the invention disclosed and claimed in application Ser. No. 07/733,174 abandoned, a mirror-master tape moves between first supply and take-up reels over a pinch roller. A slave tape moves between second supply and take-up reels over a capstan. First and second guides can be respectively constructed and adjustably positioned to regulate the movement of the mirror-master and slave tapes to aligned positions on the pinch roller and the capstan. A heater disposed between the capstan and the second guide heats only a thermomagnetic layer on the slave tape to at least the Curie temperature. The heater is adjustable in position to facilitate the movement of the slave tape to the aligned position on the capstan. A brake shoe between the capstan and the second supply reel controls the tension of the slave tape and damps any variations in the tension of the slave tape. A brake shoe between the pinch roller and the first supply reel controls the tension of the mirror-master tape and damps any variations in the tension of the mirror-master tape.

The pinch roller is movable to a first position, locked in position relative to the capstan, in which it abuts the capstan to facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the mirror-master tape on the pinch roller and the slave tape on the capstan. The heater is pivotable relative to the capstan to facilitate the disposition of the slave tape on the capstan. The capstan, preferably of a unitary construction, receives forces to maintain the rotational axis of the capstan substantially constant.

Since the tapes pass over surfaces between the brake shoes and the capstan and the pinch roller, the tensions on the mirror-master and slave tapes are not as closely regulated at the position of transfer of the magnetic information from the mirror-master tape to the slave tape as might otherwise be desired. Specifically, the tapes pass over alignment guides which have a variable friction with time and physical conditions. This variable friction inhibits a precise regulation of the tape tensions at the abutting positions between the capstan and the pinch roller where the magnetic information is transferred to the slave tape.

In one embodiment of the invention disclosed and claimed by us in application Ser. No. 07/886,688 U.S. Pat. No. 5,392,976 filed by us on May 19, 1992, for a "Tape Duplicating System" and assigned by us of record to the assignee of record of this application, a mirror-master tape movable in a closed loop including a pinch roller transfers a mirror-image to a slave tape movable in a closed loop including a capstan. A thermomagnetic layer on the slave tape has a Curie temperature above which magnetic information is destroyed and below which magnetic information can be recorded on such layer. The thermomagnetic layer is heated above the Curie temperature and is accordingly lengthened by thermal expansion just before the slave tape reaches the capstan.

A first guide contiguous to the heater regulates the tension of the slave tape. A downstream portion of a peripheral surface, preferably defining a cylindrical segment, on the guide receives a pressurized fluid for sensing the tape tension in accordance with the tape width, the spacing from the axis of the peripheral surface and the fluid pressure. An upstream portion of the peripheral surface receives a vacuum adjustable to vary the spacing between the slave tape and the downstream portion. This regulates the tape tension.

The mirror-master tape is lengthened by a second guide having the same construction as the first guide to compensate for the lengthening of the slave tape by the heater and the first guide, thereby producing a true mirror-image on the slave tape after the slave tape has cooled to the ambient temperature. Each of the mirror-master tape and the slave tape has a particular product of the Youngs modulus, tape width and tape thickness to provide a controlled strain on the tape when the tension on the tape is regulated.

The invention disclosed and claim in application Ser. No. 07/886,688 provides apparatus for, and methods of, regulating the tension of the mirror-master tape at a position contiguous to the pinch roller and for regulating the tension of the slave tape at a position contiguous to the heater, which is in turn contiguous to the capstan. The apparatus and method of application Ser. No. 07/886,688 are adapted to be used in the apparatus and method of co-pending application Ser. No. 07/733,174 and to constitute an improvement in the apparatus and method of co-pending application Ser. No. 07/733,174. Co-pending application Ser. No. 07/733,174 also provides a master tape and a slave tape which may be constructed especially for the apparatus and method of the invention disclosed in such application to obtain all of the advantages provided by the apparatus and method of such application.

In one embodiment of the invention disclosed and claimed in application Ser. No. 08/026,697 pending filed by us on Mar. 5, 1993, for a "Tape Duplicating System" and assigned of record to the assignee of record of this application, a mirror-master tape moves from a first supply reel to a first take-up reel in a first cassette. A slave tape moves from a second supply reel to a second take-up reel in a second cassette. A pinch roller locked in a first position between the first supply and take-up reels abuts a capstan between the second supply and take-up reels to transfer to the slave tape the image on the mirror-master tape. At the end of such transfer, a signal sensing the completion of the transfer causes the pinch roller to be unlocked and to be moved to a second position displaced from the first position. In this position, the second cassette is replaceable by another one of the second cassettes for an image transfer from the mirror-master tape to a slave tape to such other one of the second cassettes.

In the invention disclosed and claimed in application Ser. No. 08/026,697 (attorneys file D-2666) filed by Alfred M. Nelson and Robert P. Adams on Mar. 5, 1993, and assigned of record to the assignee of record in this application, the rotations of the supply reels produce eccentricities which vary the tensions of the tapes as the supply reels rotate. These tension variations are compensated at positions before the pinch roller and the capstan by springs guide the tapes and by damping members attached to the springs. The damping members are pre-stressed to provide damped compliances in accordance with the tension variations. Stiffeners are attached to the spring ends to provide for the compliances by the springs.

Application Ser. No. 08/026,697 also discloses and claims a capstan which may be hollow, non-conductive, and non-magnetic to receive a magnetic head within the capstan. A constant amplitude alternating signal applied to the head to apply initially rising and then decaying amplitudes to the tape as it is displaced from the head erases any image on the slave tape by providing a magnetizing force greater than that of the slave tape but less than that of the mirror-master tape. Thus, the image on the mirror-master tape is transferred to the slave tape by the abutting tape relationship.

In one embodiment of this invention, apparatus is provided for sequentially transferring a plurality of slave cassettes from a supply station and for processing the slave tapes in such slave cassettes to obtain a transfer to the slave tapes of an image on a mirror-master tape. The apparatus also provides for moving the slave cassettes to another station after the transfer of the image to the slave tapes and for storing the slave tapes in a stacked relationship in such other station. The apparatus provides such image transfers in a minimal time and with a minimal number of components and with a high resolution in the transfer of the image on the mirror-master tape to the slave tapes. The invention also includes methods of providing the functions specified above in this paragraph.

In one embodiment of the invention disclosed and claimed in application Ser. No. 08/028,240 pending filed by Alfred M. Nelson, Charles E. Redman and Alan N. Raffaelli on Mar. 9, 1993, for "Tape Duplicating Apparatus and Method", slave cassettes each including a slave tape and having a peripheral groove are stacked in a first station. Gripping fingers are movable into the groove in the forward cassette, and into the groove in the next cassette, in the station grip the forward cassette. During the pivoting of the forward cassette to a second station, a cover on the slave cassette is pivoted to expose the slave tape. At the second station, the threading arms are moved from retracted to extended position.

The slave cassette and the threading arms are then moved to a third station planar with a pinch roller which is displaced from the capstan. The threading arms are then retracted. With a mirror-master tape disposed on the pinch roller, the pinch roller is moved to a second position abutting the capstan. The pinch roller and capstan are then rotated to transfer the image on the master tape to the slave tape such that the image beginning is at the slave tape beginning. The pinch roller is moved to the displaced position; the threading arms are extended; the cassette is moved to the second station to decouple the slave tape from the capstan; and the threading arms are retracted.

This invention provides a system for, and a method of, enhancing the accuracy with which an image on a master tape is duplicated on a slave tape. The system and method of this invention compensate for the stretching of the slave tape as a result of the elevated temperature in the slave tape at the time of the transfer of the image to the slave tape. Because of this compensation, the image on the slave tape after the contraction of the slave tape with the temperature reduction to ambient temperatures is a duplicate of the image on the master tape.

The system and method of this invention also provide for an efficient operation of the heater over an extended period of time without any deterioration in the heater operation. The system and method of this invention further provide for an accurate determination of the full length of the slave tape and an accurate determination of the portion of this full length for receiving the image on the master tape. In this way, the slave tape can be wound on the supply reel in the slave tape cassette to such portion of the full length of the slave tape while the image on the mirror-master tape is transferred to the slave tape, thereby placing the slave tape cassette in readiness for the image on the slave tape to be provided to a viewer.

The cassette is then moved to a position where belts are coupled to the cassette and the gripping fingers are thereafter released from the cassette. The belts then move the cassette to the mouth of a fourth station. Pins are rotated to position the cassette properly relative to the mouth of the fourth station. Continued pin rotations produce a movement of the cassette through the mouth and into the fourth station.

In one embodiment of the invention, a thermomagnetic layer on a slave tape has a Curie temperature above which it loses, and below which it stores, an image. Such layer is heated above the Curie temperature just before such layer records an image. To compensate for image stretching in such layer by the heat, the lines in a raster scan on the mirror-master tape are lengthened relative to such lines on a master tape during an image transfer between the tapes. To accomplish this, a rotary member holding the mirror-master tape has a larger diameter than, and rotates at the same angular speed as, a rotary member holding the master tape.

To inhibit the slave tape separation from the heater by water vaporization in the thermomagnetic layer, (1) the heater heats such layer while the slave tape moves in a direction opposite to its movement during the image transfer or (2) a microwave oven heats such layer. The slave tape length may be determined from (1) the capstan revolutions for a reference tape of a given length and for the full length of the slave tape or (2) the angular revolutions of the slave tape supply and take-up reels at successive time instants, and the radius of such reels without tape on such reels. A sufficiently long slave tape may then be wound on the supply reel through an angular revolution of a particular reel dependent upon the image length on the master tape.

In the drawings:

FIG. 2 is a schematic plan view of different elements in the apparatus of this invention and schematically illustrates the operation of the apparatus at different stations;

FIG. 2A is a sectional view taken substantially on the line 2A—2A of FIG. 2 and illustrates in additional detail certain features of a first (supply) station for holding the slave cassettes in a stacked relationship before the slave cassettes are transferred to other stations;

FIG. 2B is a perspective view of a spring shown in FIGS. 2 and 2A for holding the slave cassettes in the stacked relationship in the first station;

FIG. 3 is an enlarged fragmentary schematic plan view of apparatus for transferring the slave cassettes from the first (supply) station to a second (threading) station and then to a third (image transfer) station for transferring the image on the mirror-master tape to the slave tape;

FIG. 4 is an enlarged fragmentary schematic plan view of the apparatus shown in FIG. 3 and is partially sectioned to show in additional detail the apparatus for moving the slave cassette from the second (threading) station to the third (image transfer) station;

Figure 1:
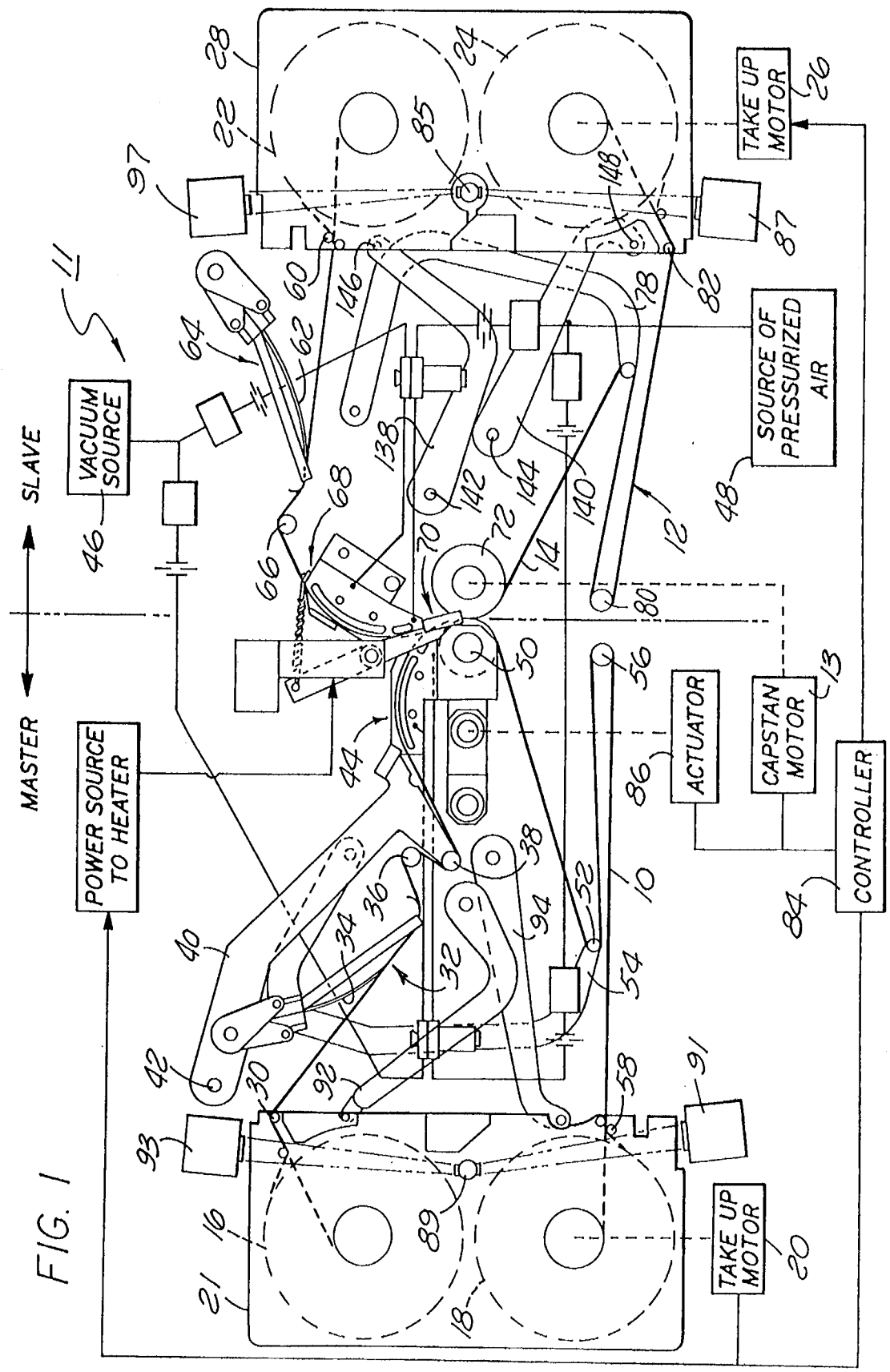
FIG. 1 is a schematic diagram of a system in a operative relationship for transferring an image on a mirror-master tape to a slave tape.
Figure 5:
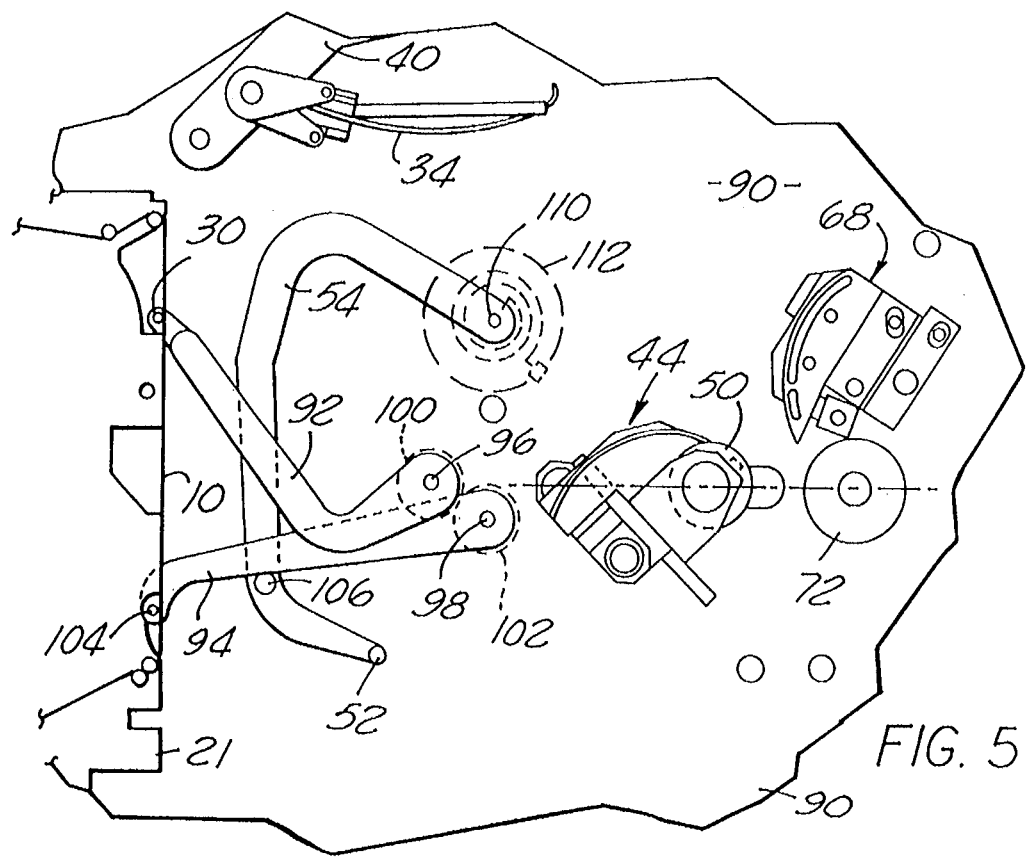
FIG. 5 is an enlarged fragmentary view of threading and dancer arms for the master cassette in retracted positions at the second (threading) station with the mirror-master tape still in the master cassette and with the threading arms engaging the mirror-master tape in the master cassette.
Figure 6:
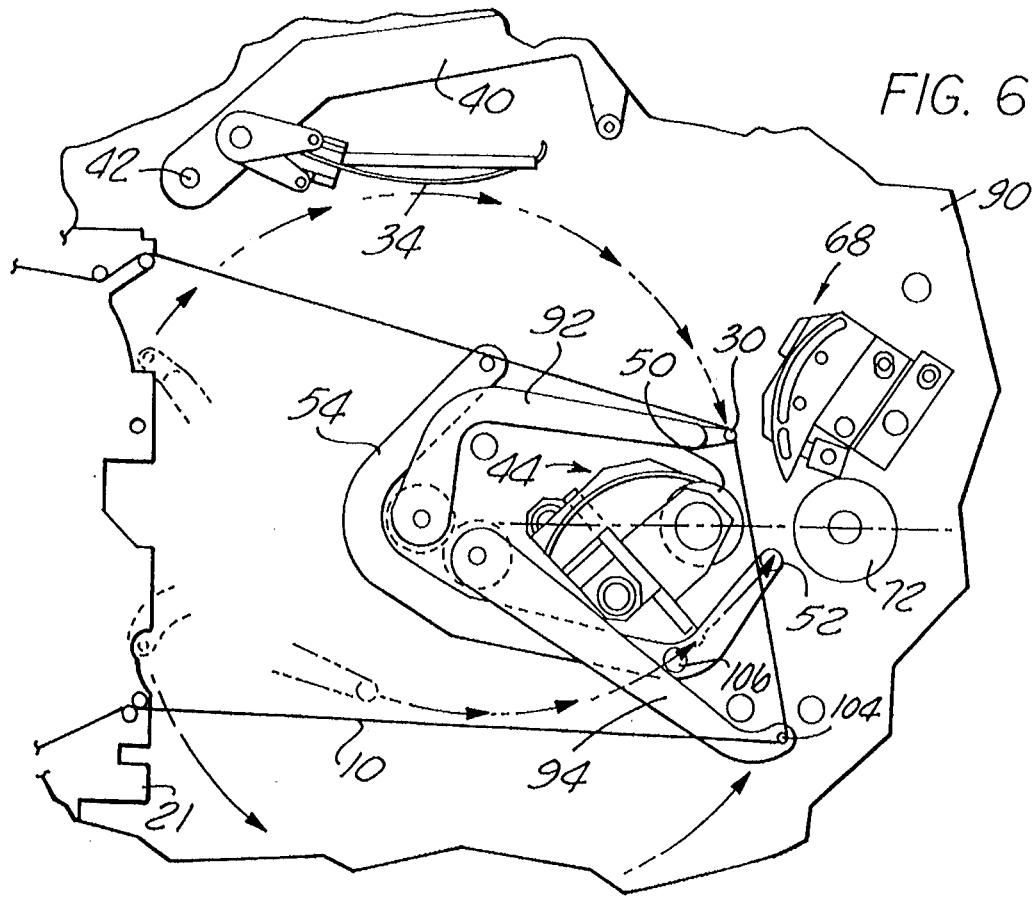
Figure 7:
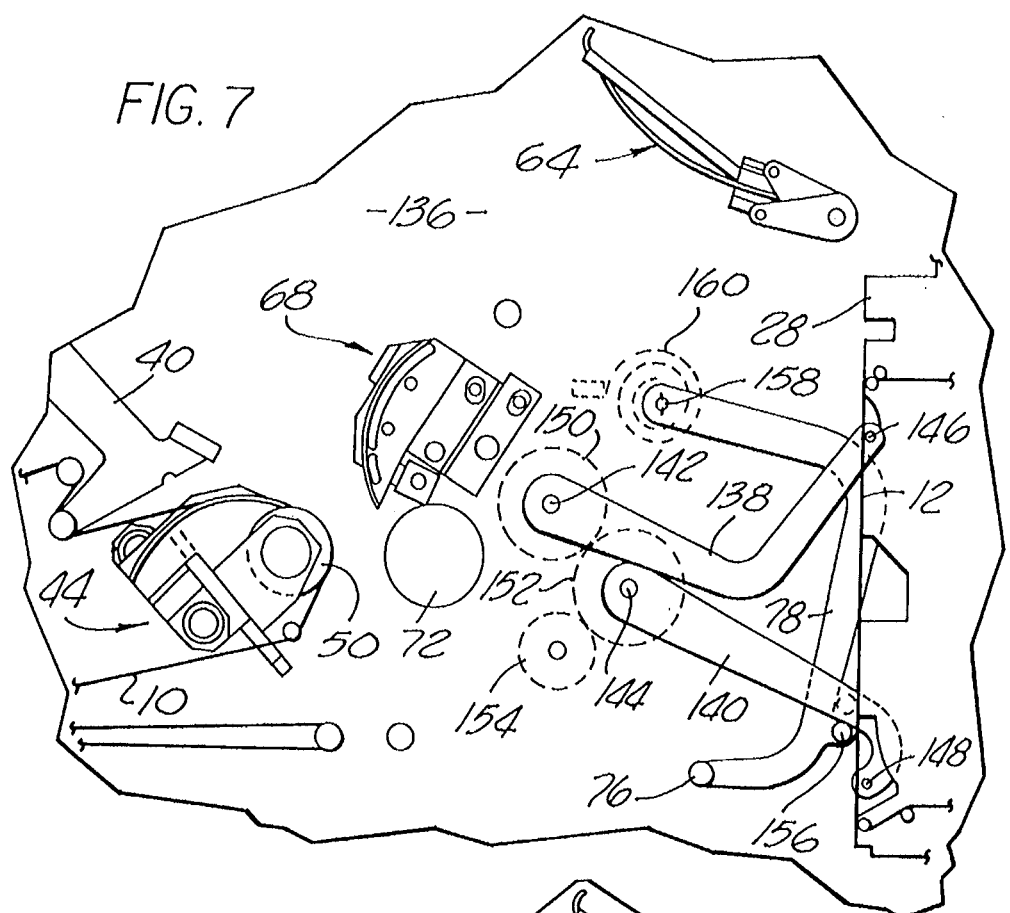
Figure 8:
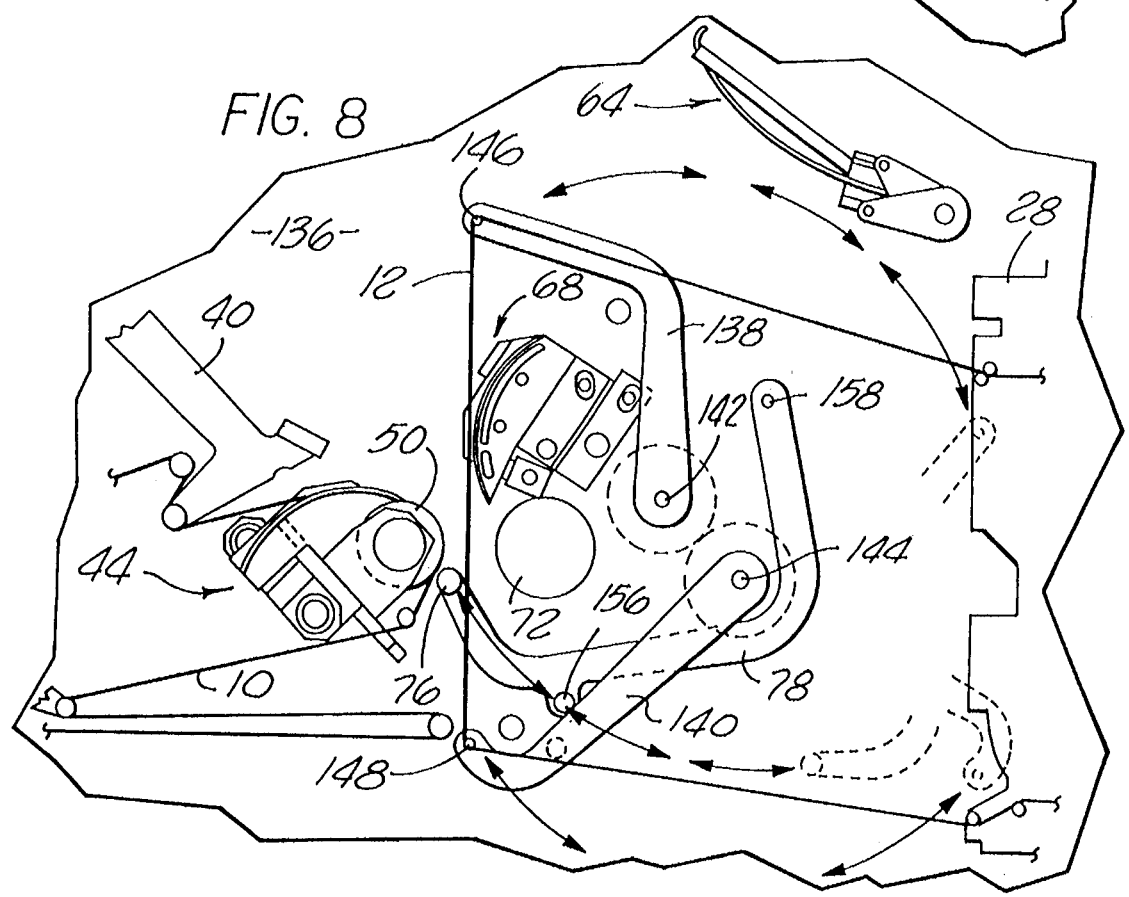
Figure 8B:
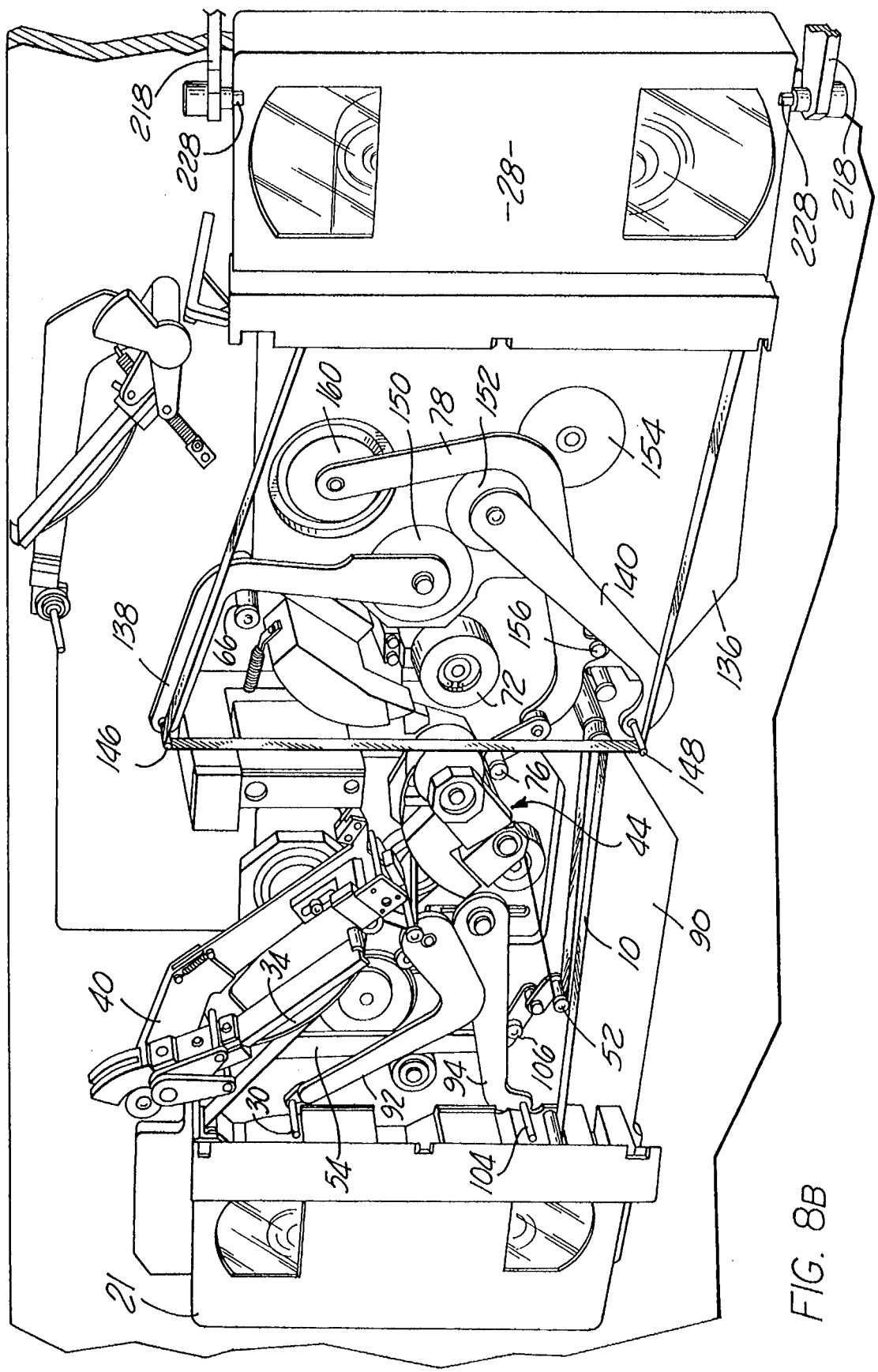
Figure 9:
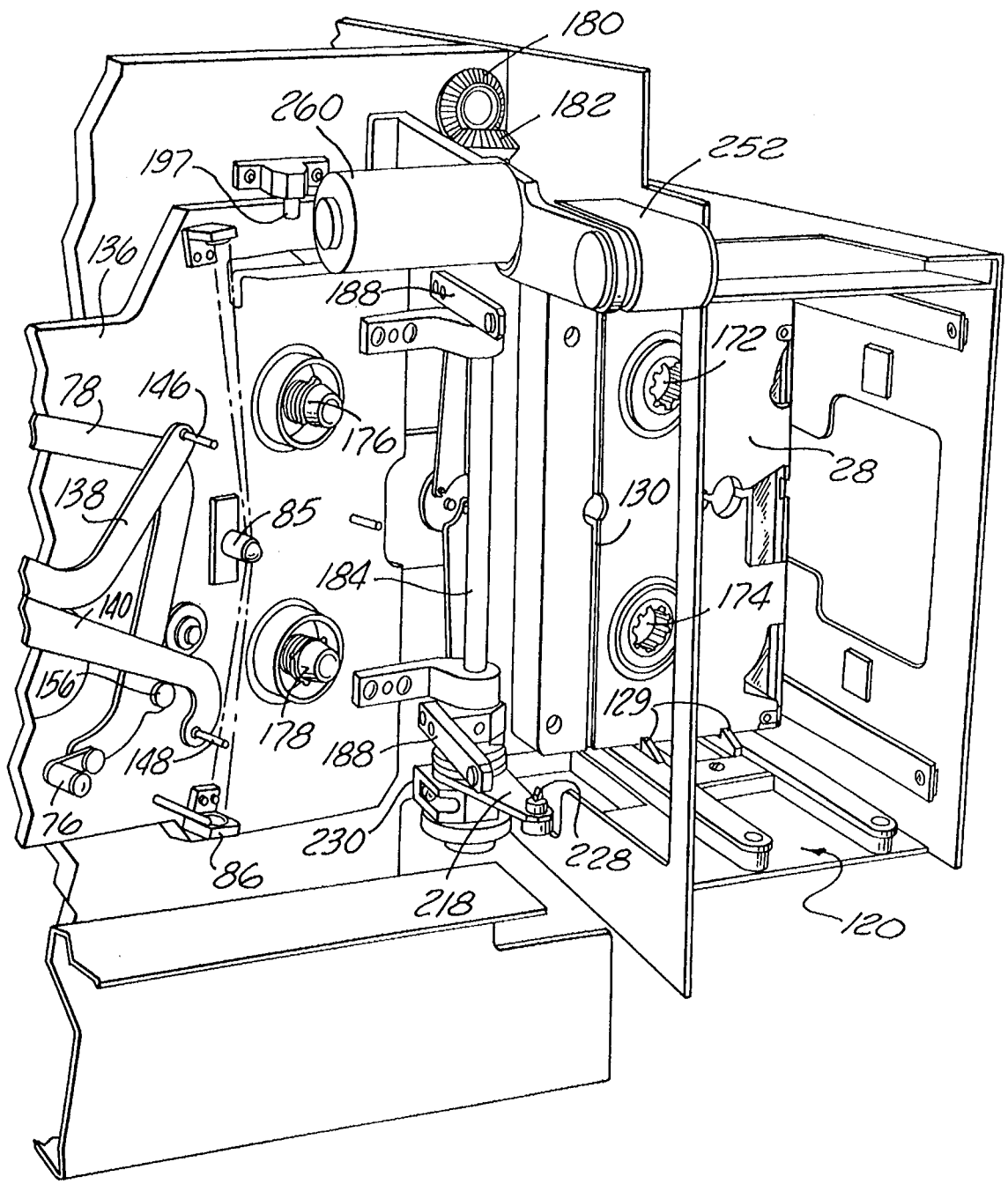
Figure 10:
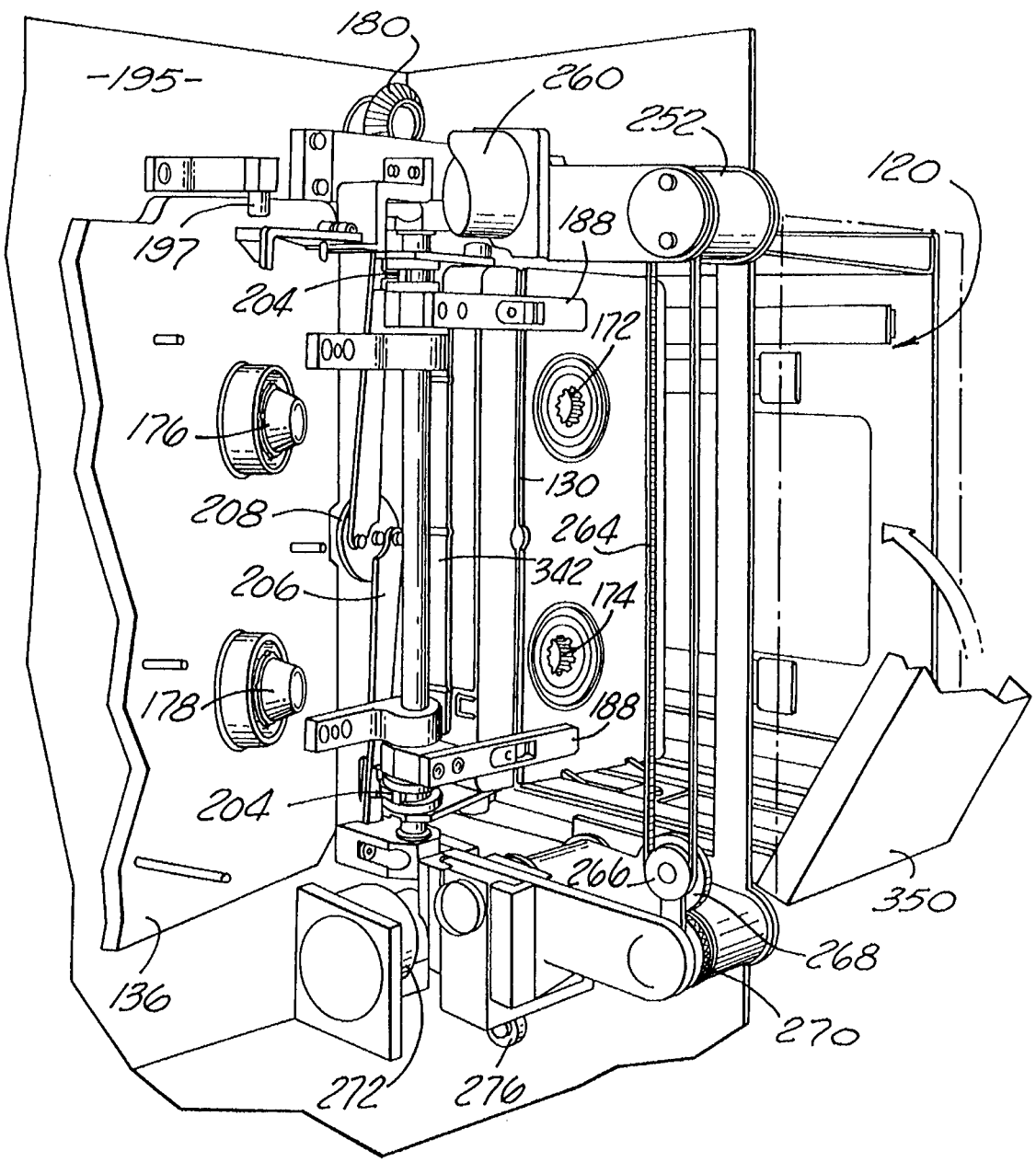
Figure 11:
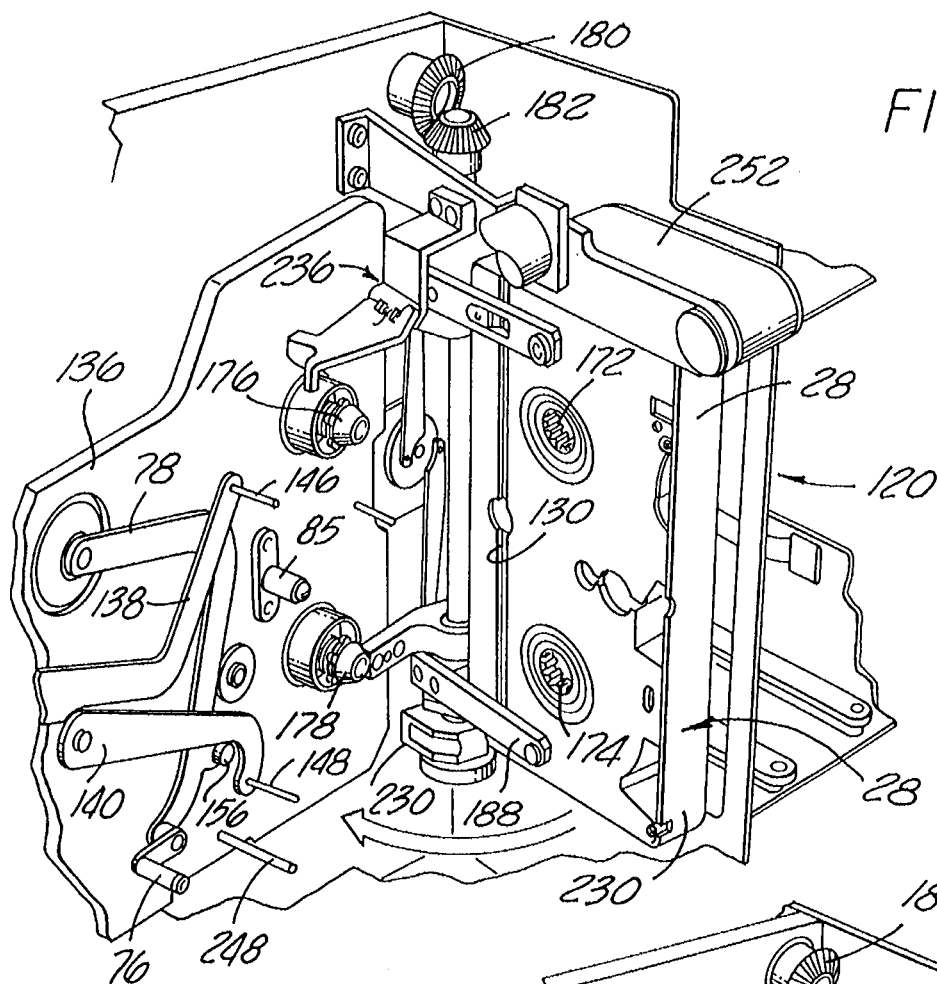
Figure 12:
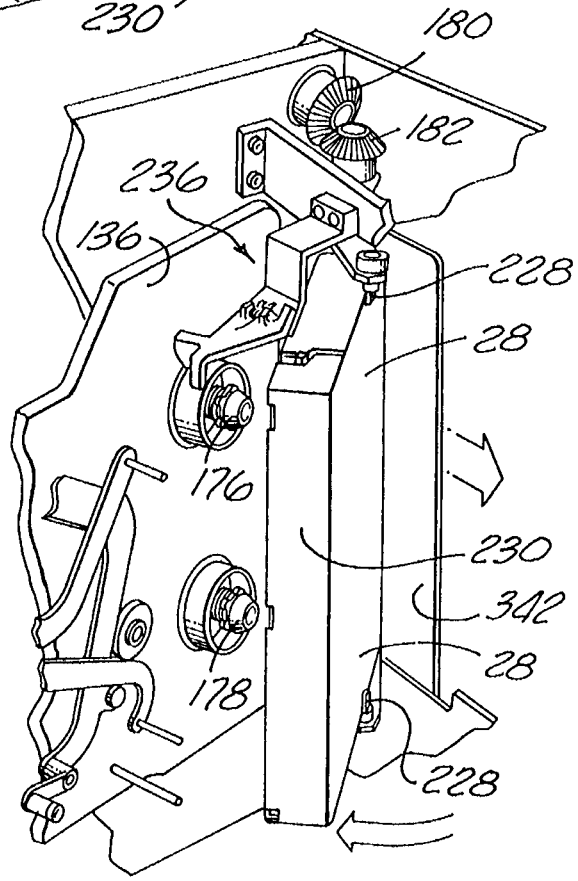
Figure 13:
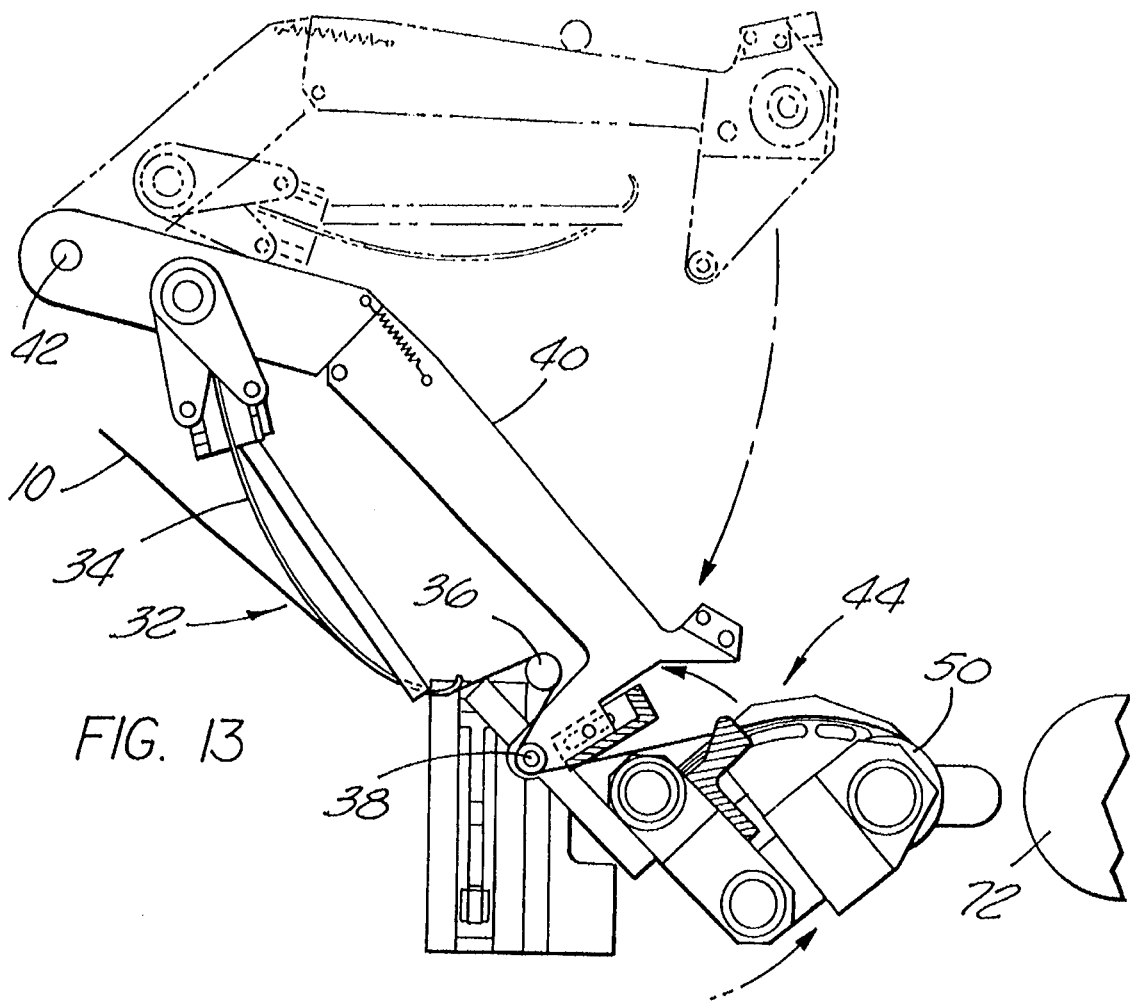
Figure 14:
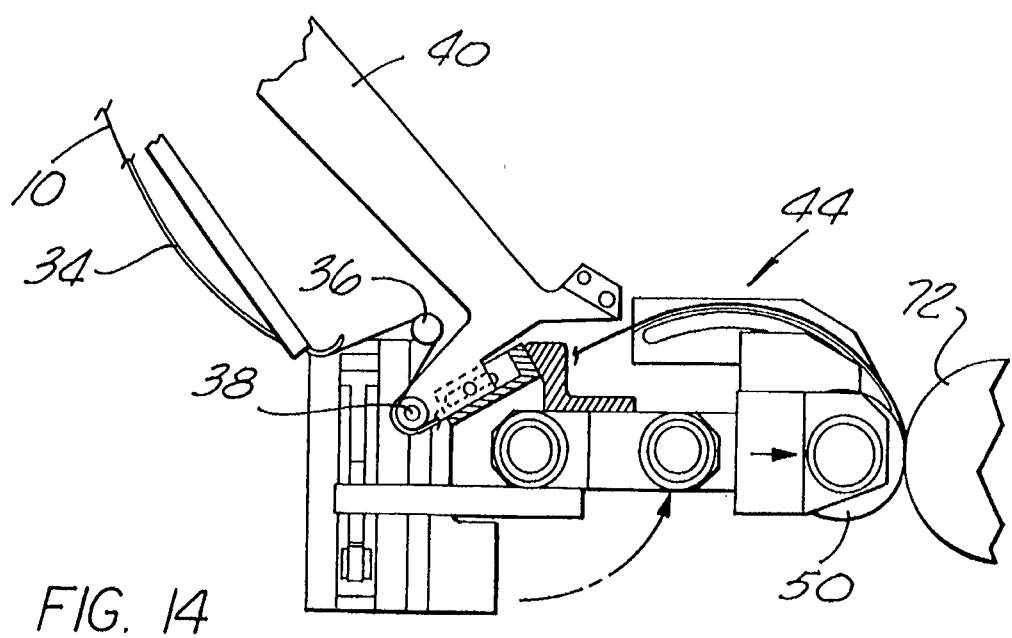
Figure 17:
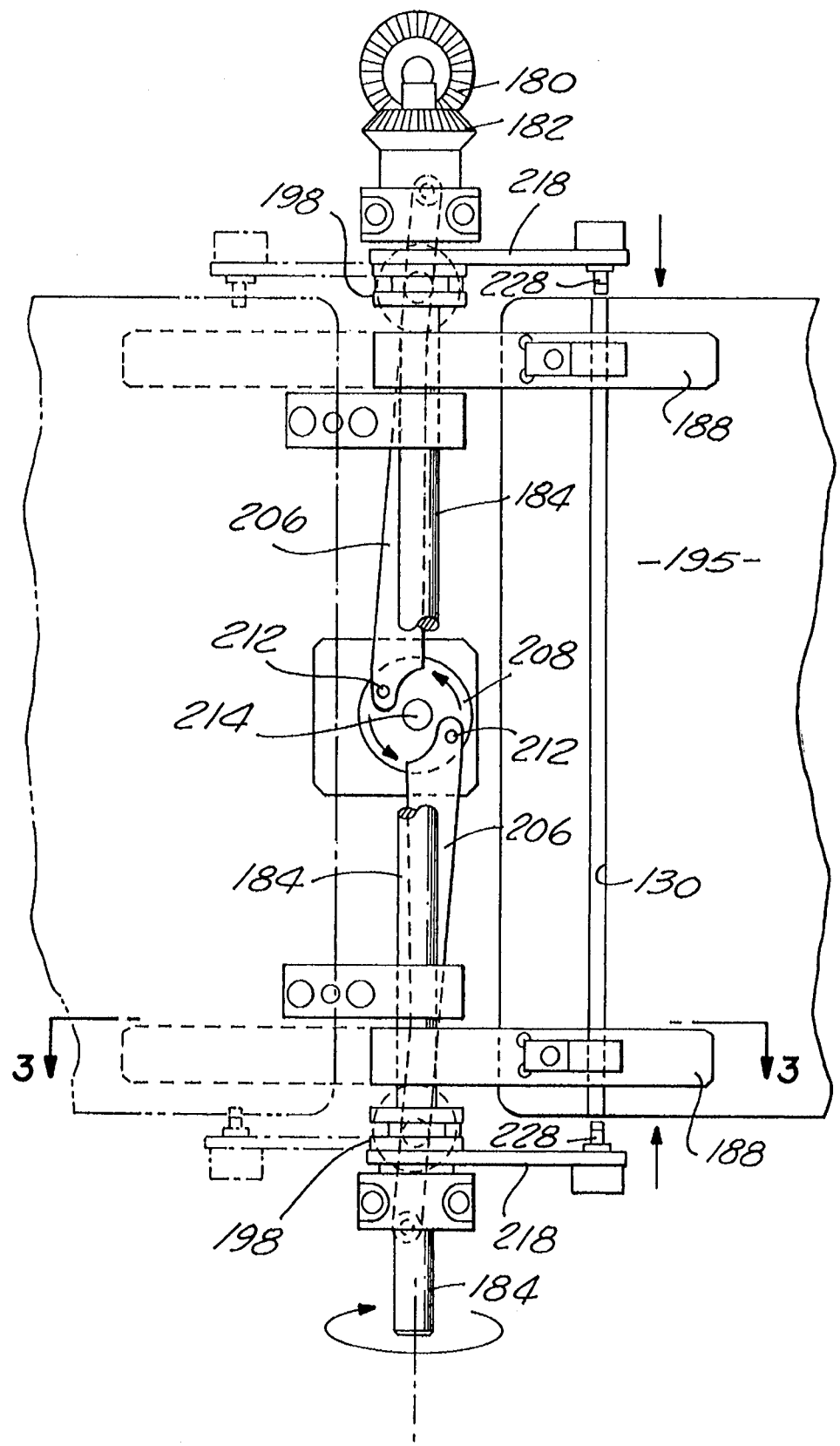
Figure 17A:
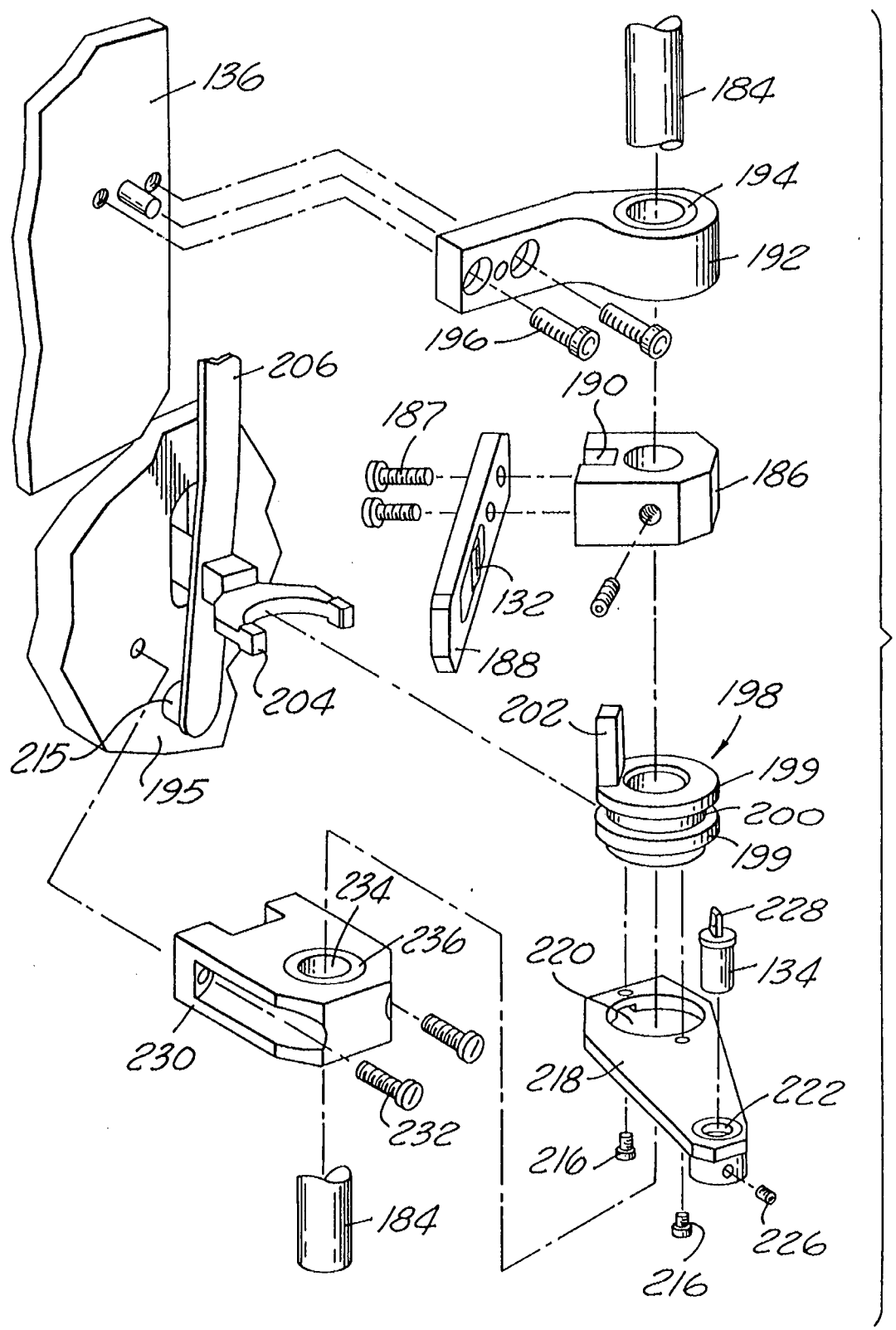
Figure 23:
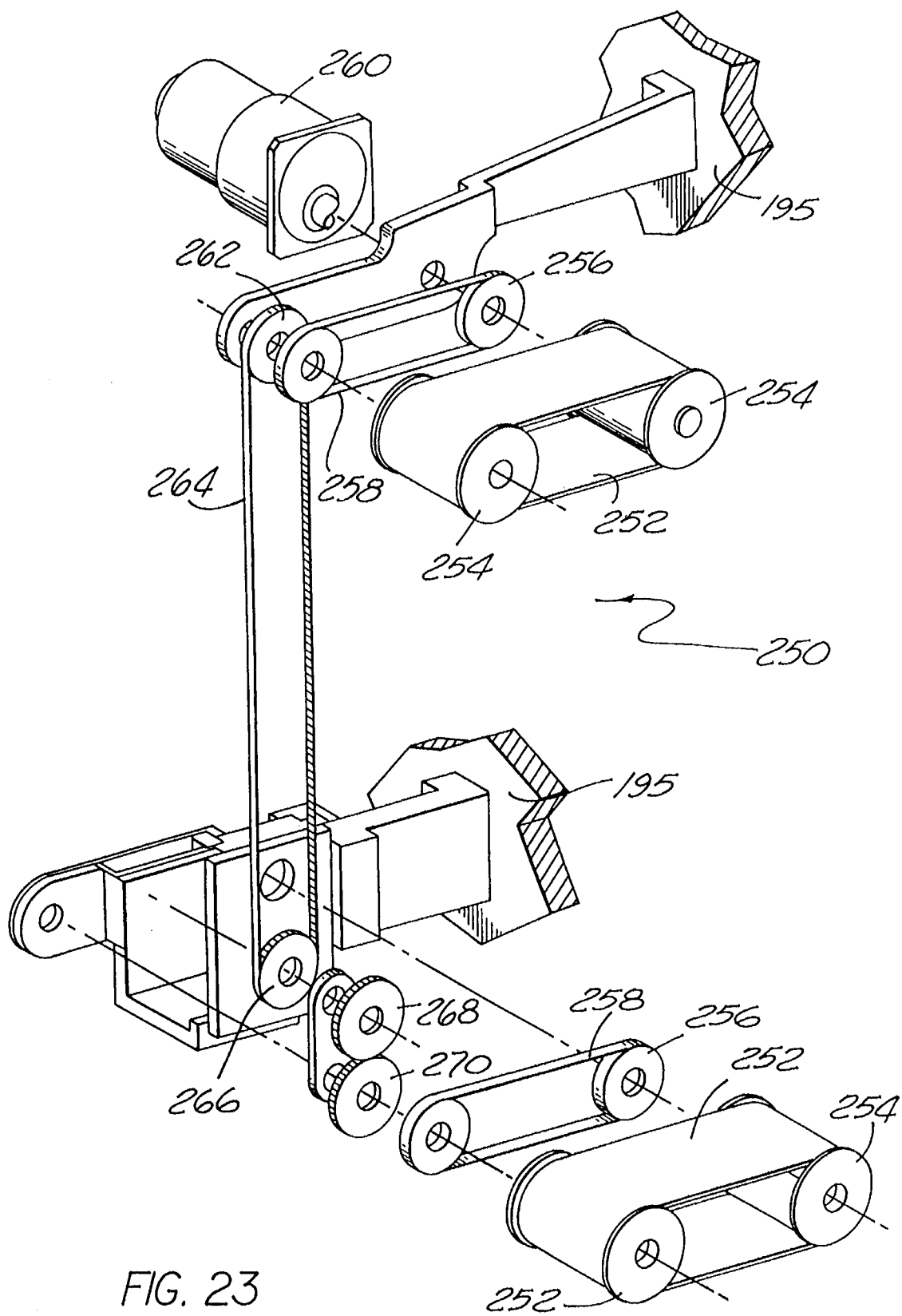
Figure 24:
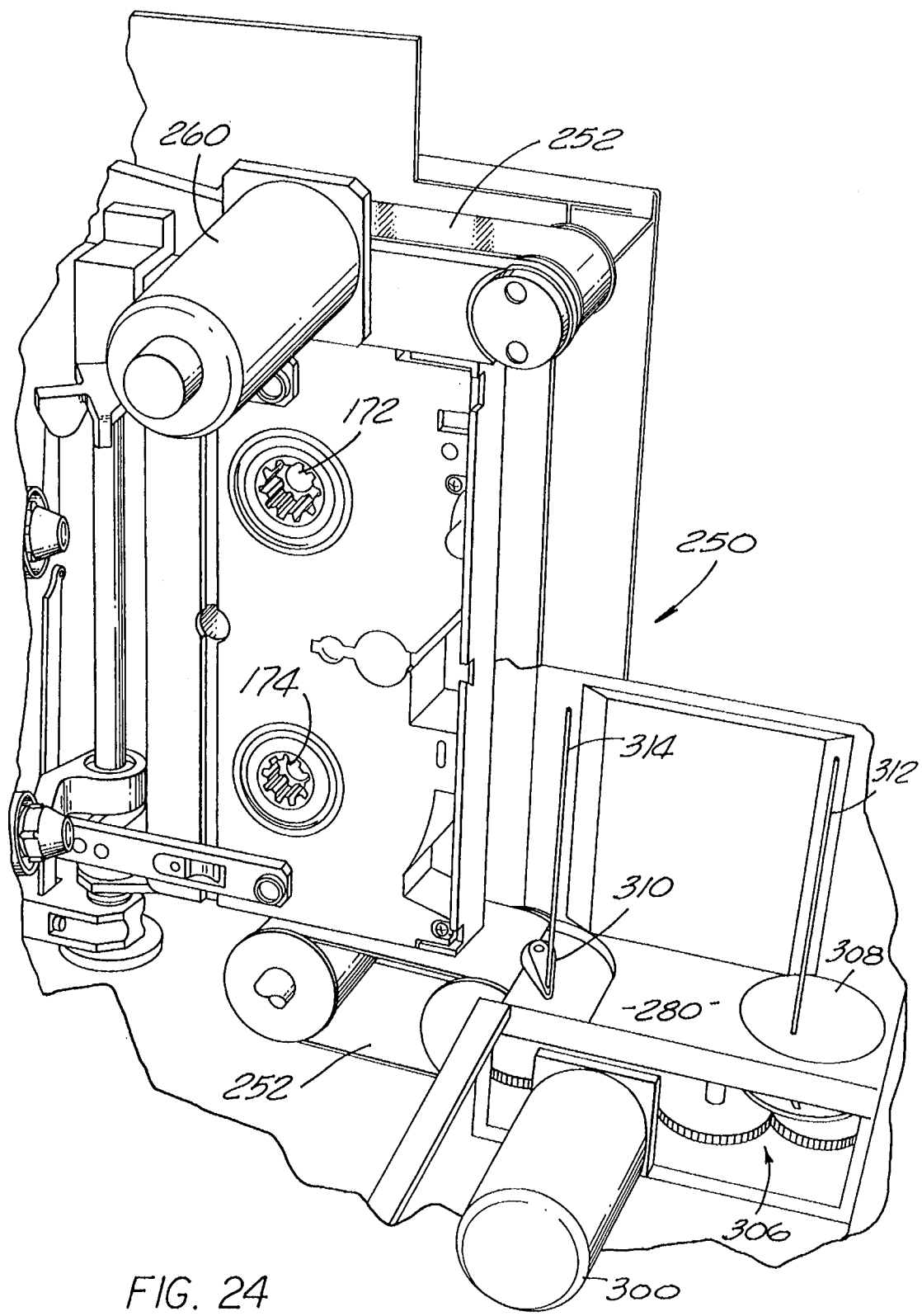
Figure 25:
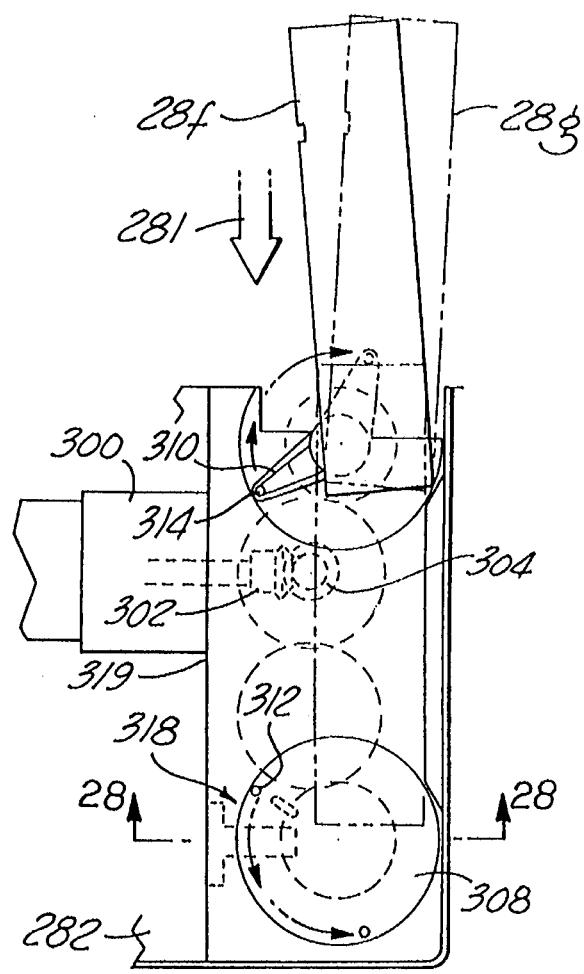
Figure 26:
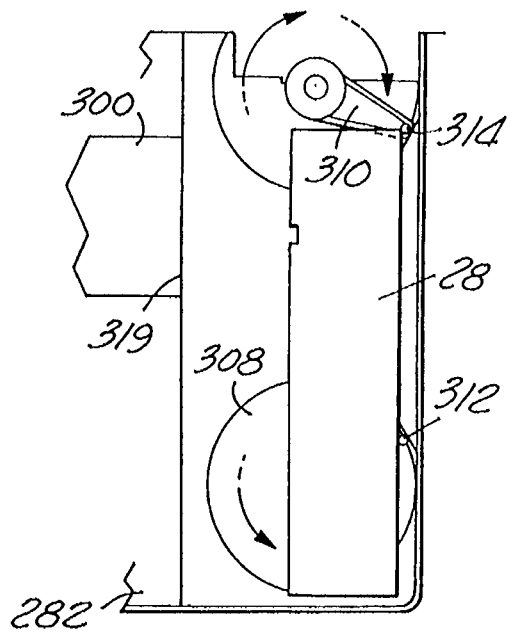
Figure 27:
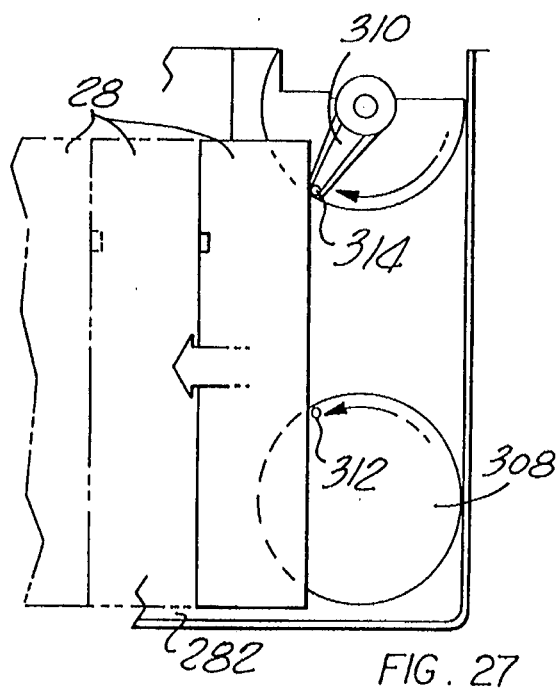
Figure 28:
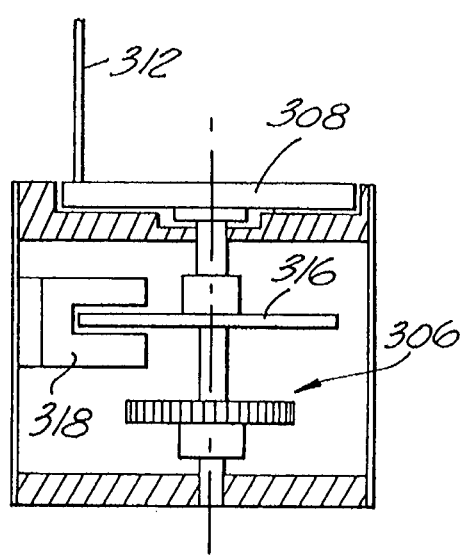
Figure 29:
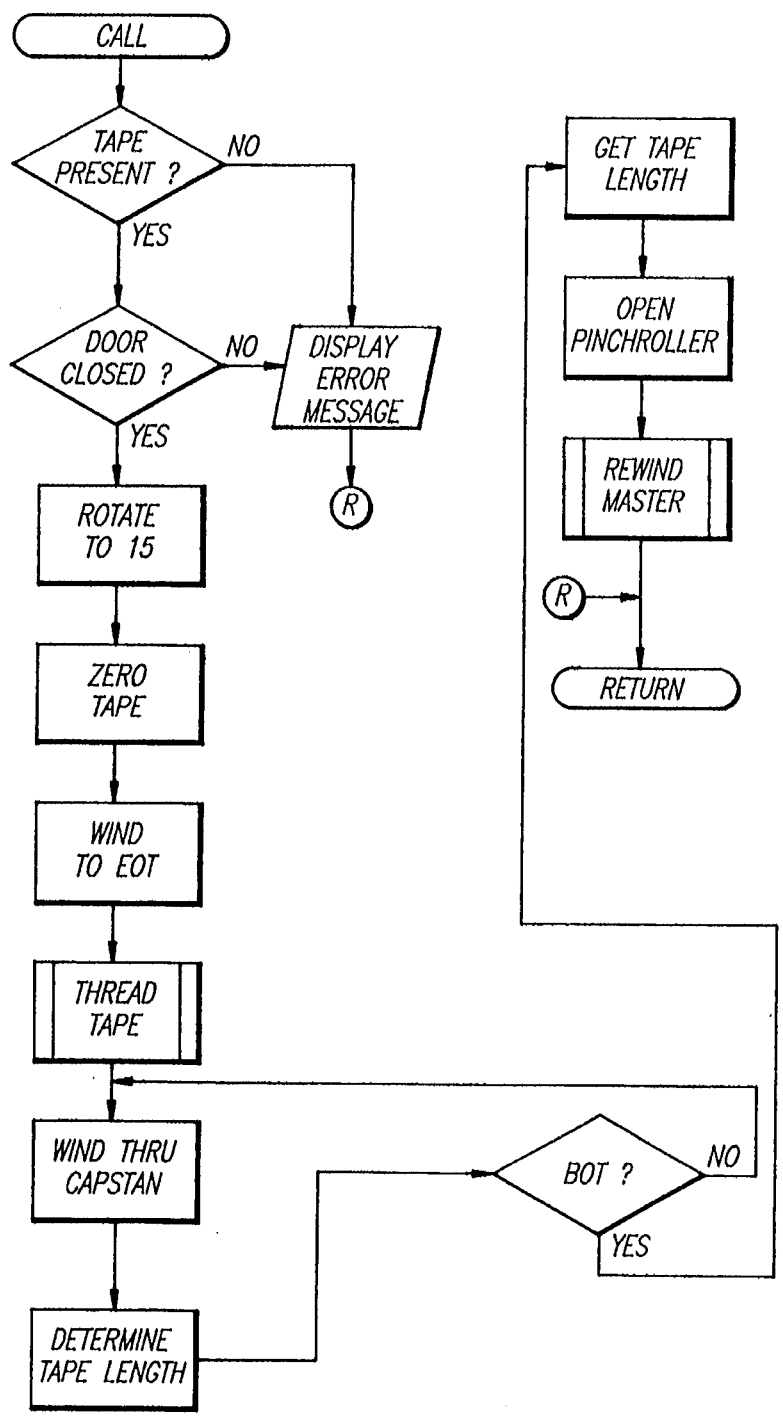
Figure 30:
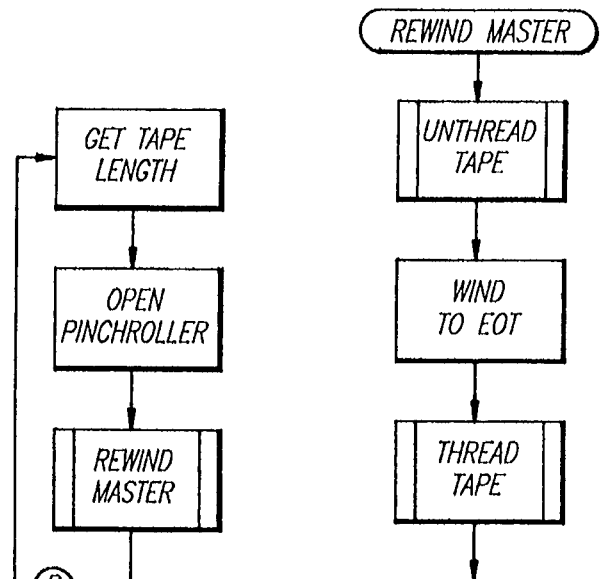
Figure 31:
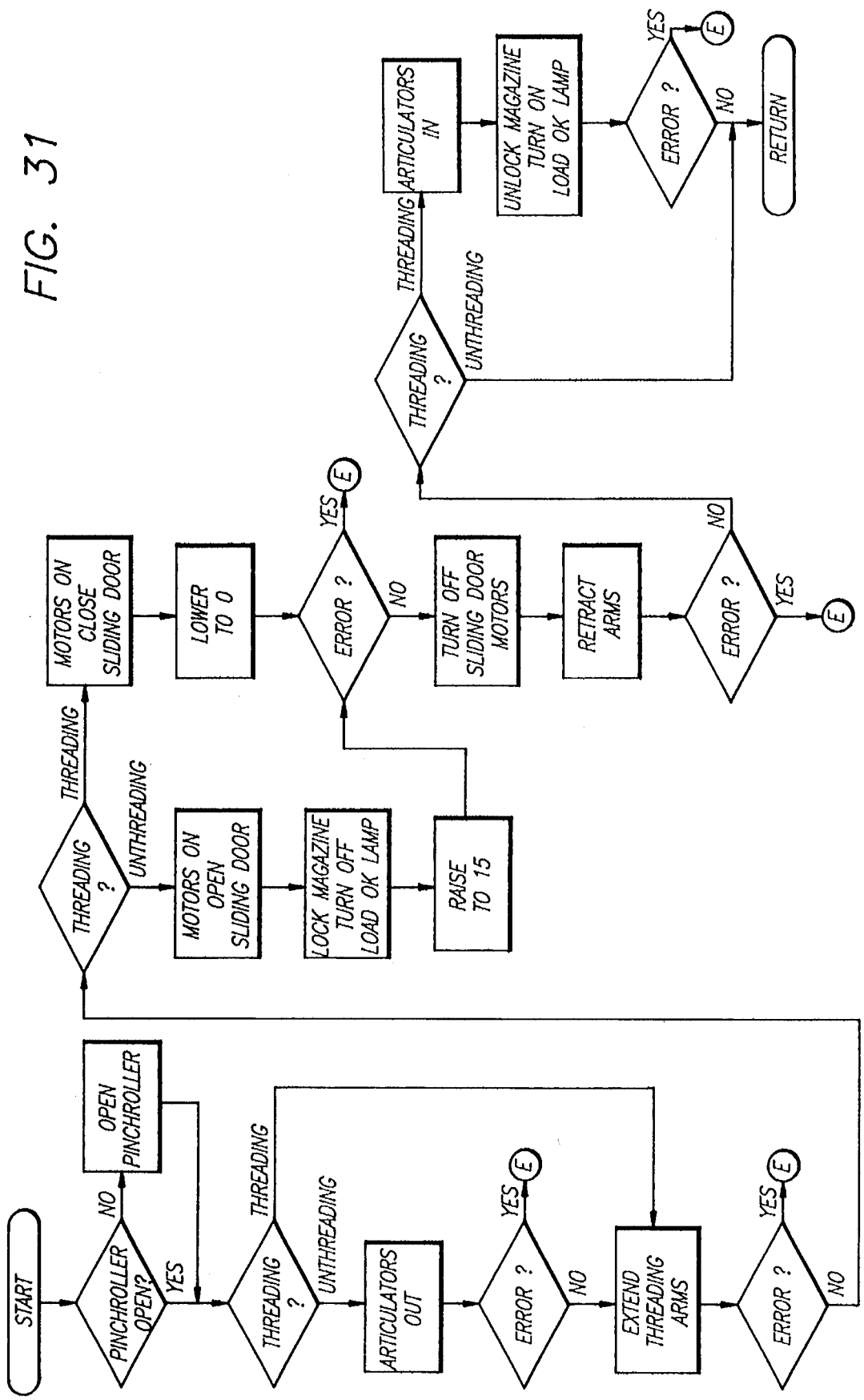
Figure 32:
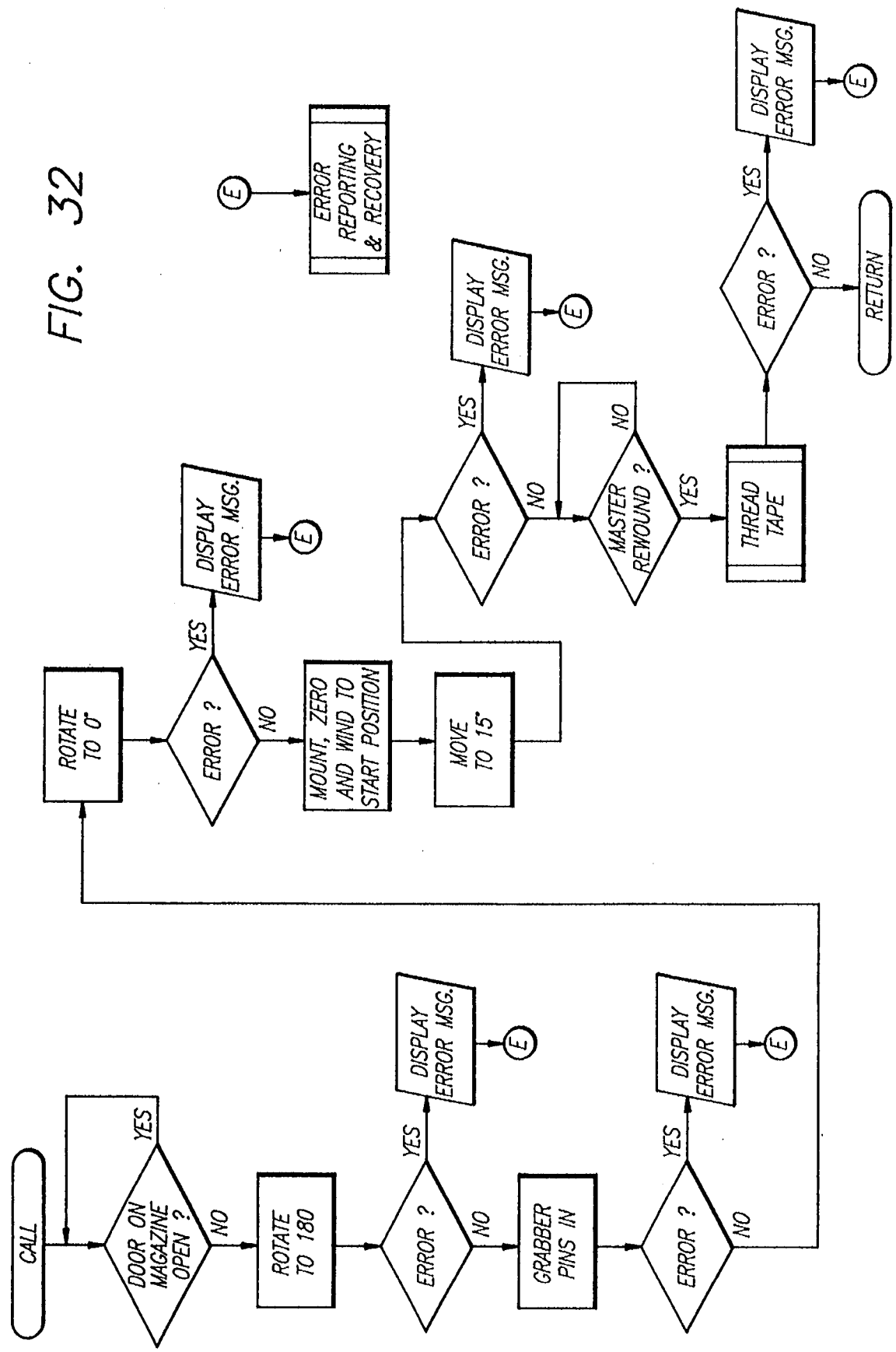
Figure 33:
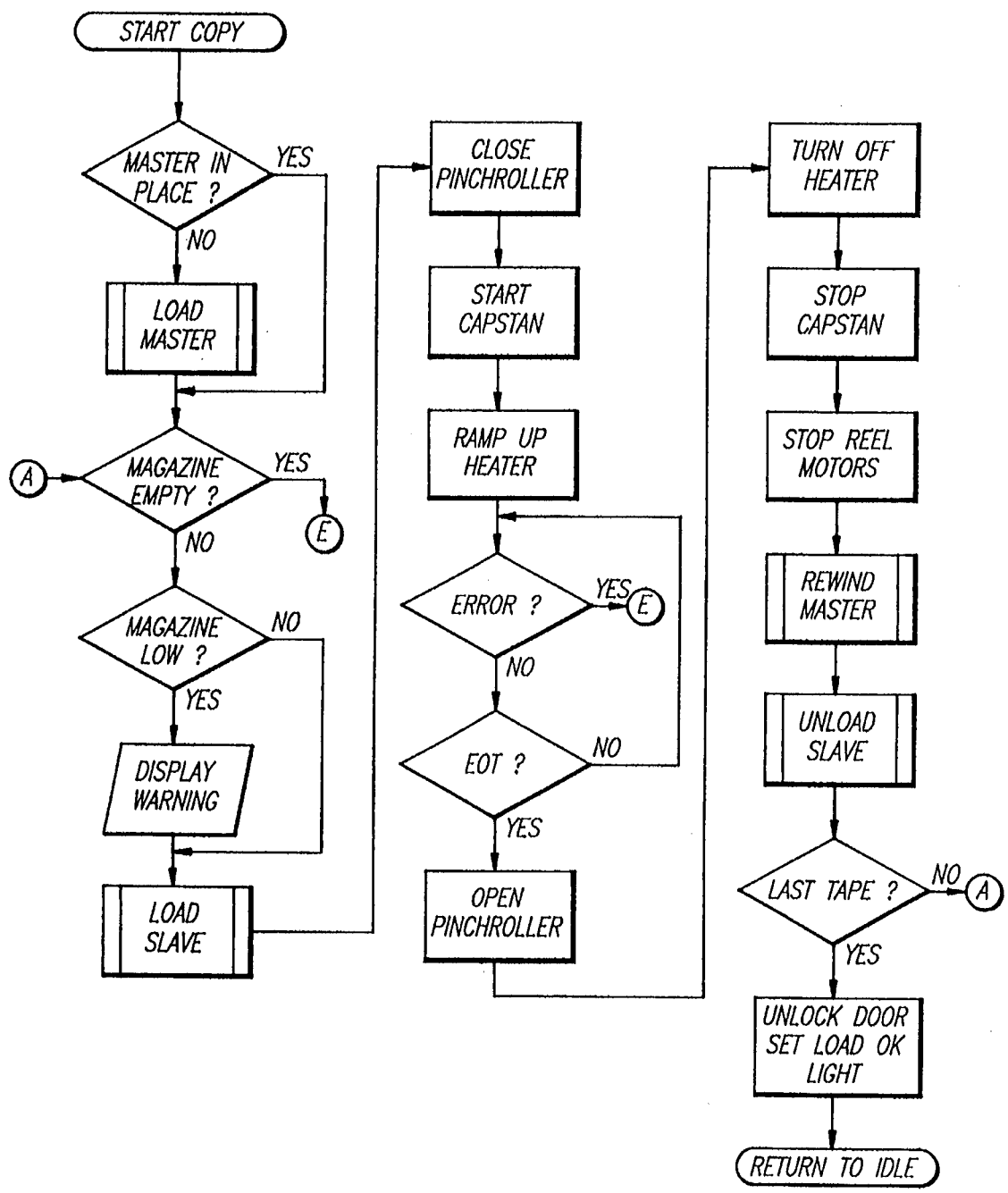
Figure 35:
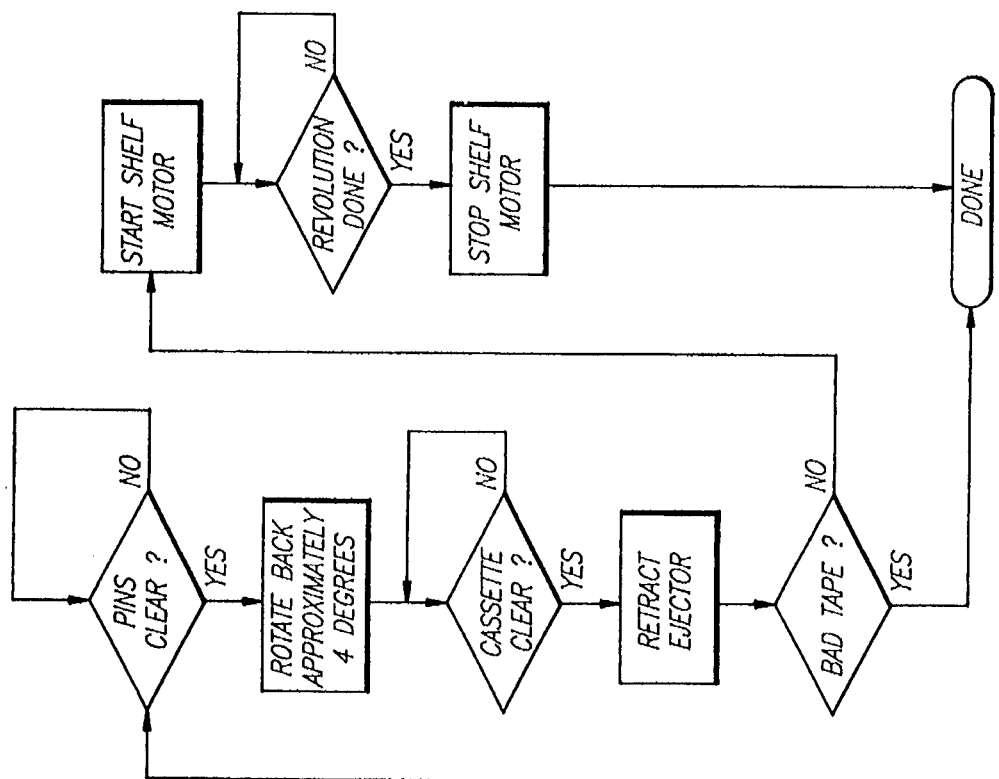
Figure 34:
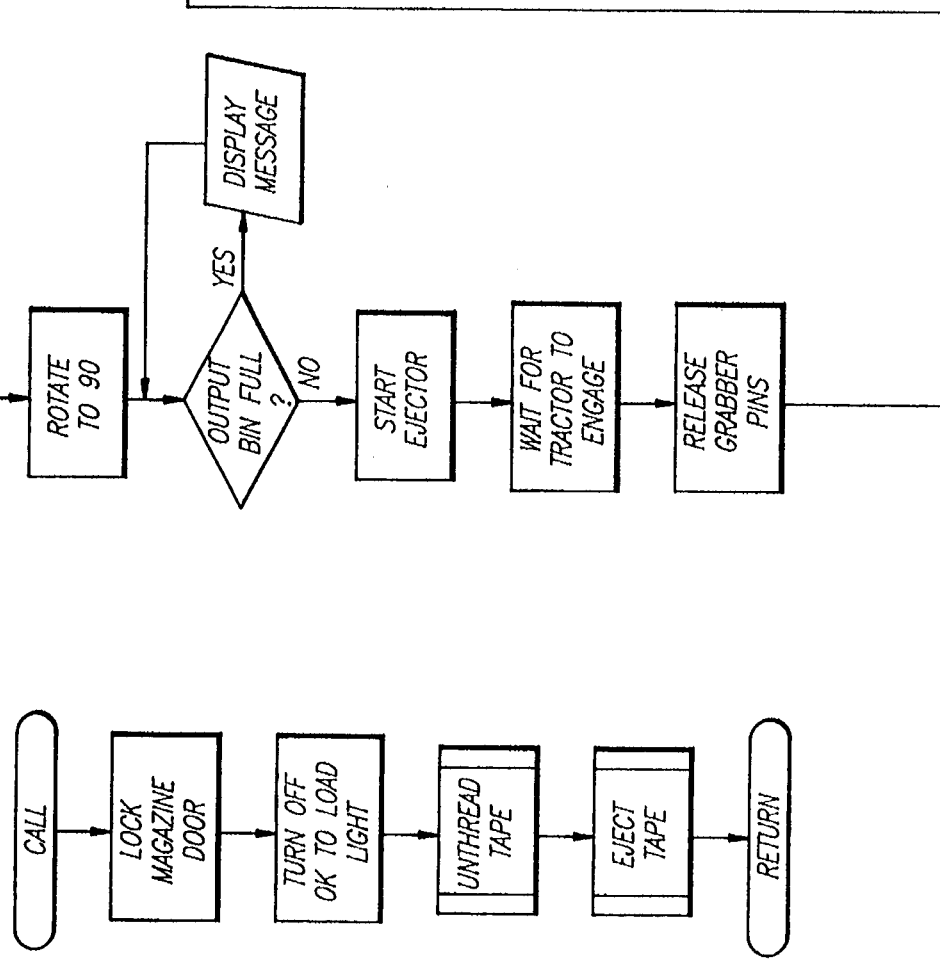
Figure 36:
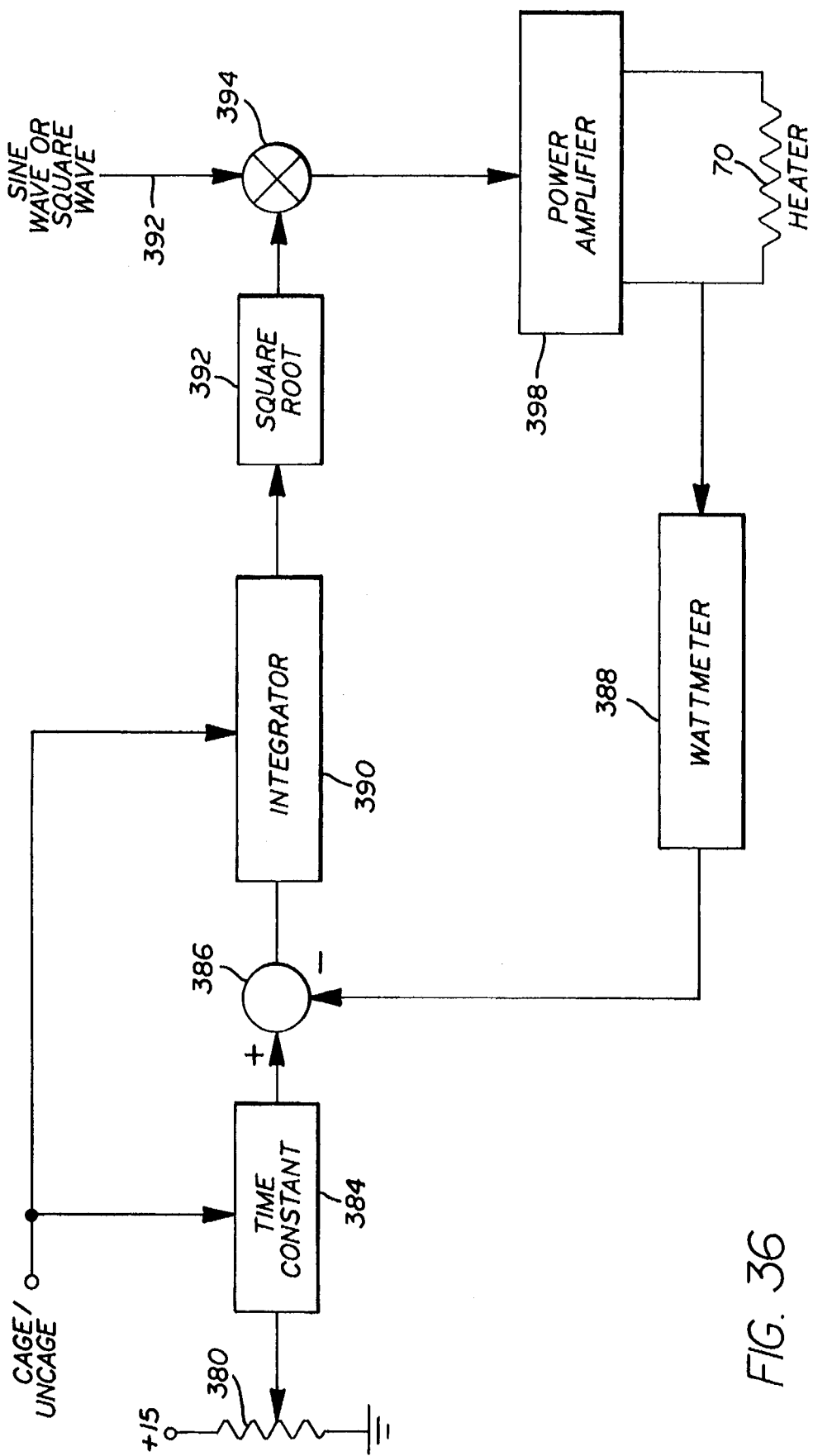
Figure 37:
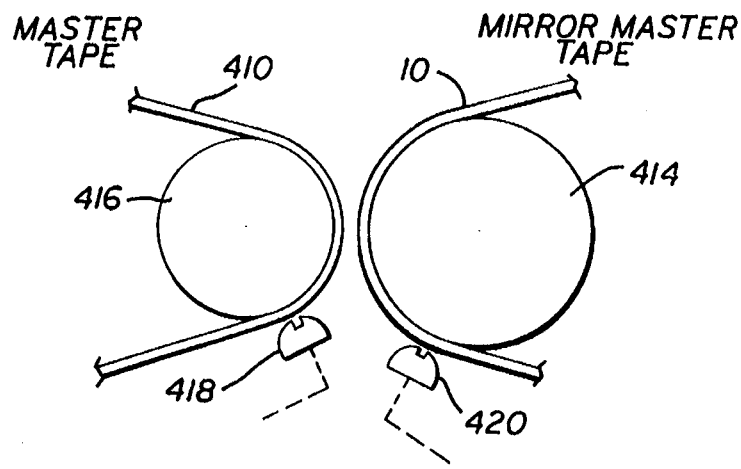
Figure 38:
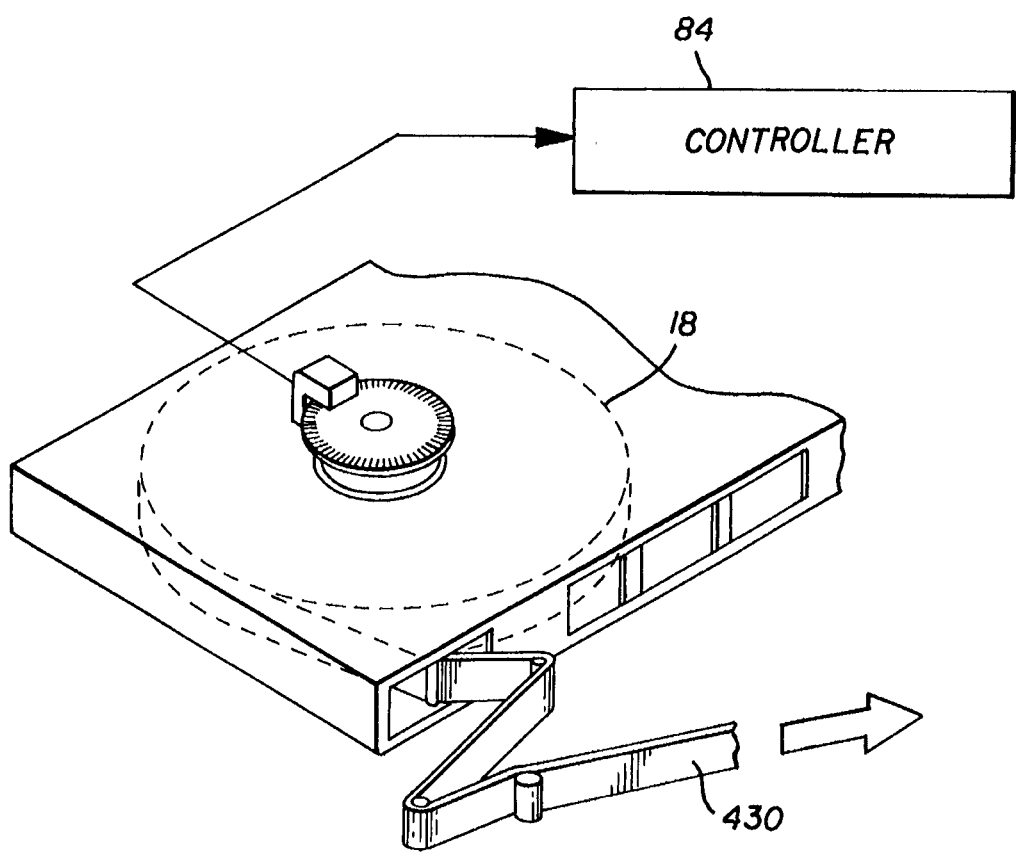
Figure 39:
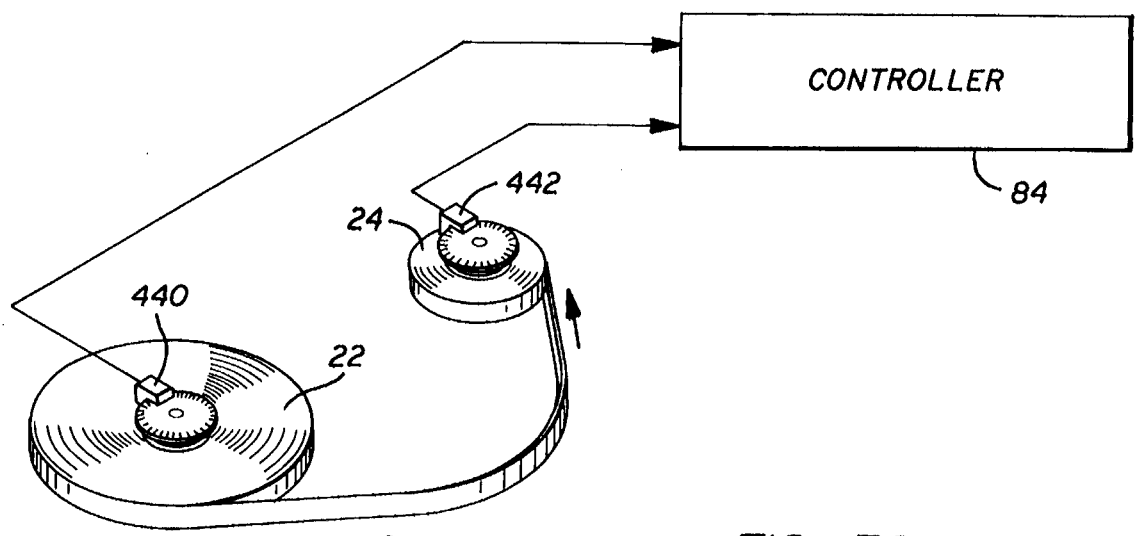
Figure 40:
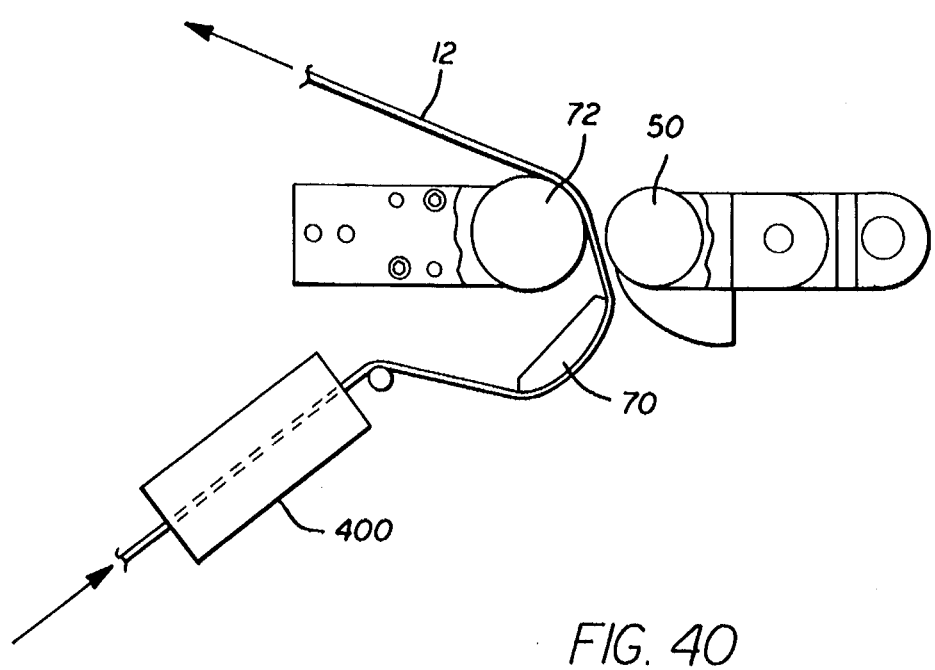

FIG. 6 is an enlarged fragmentary view similar to that shown in FIG. 5 and the threading and dancer arms for the master cassette in extended positions at the third image transfer station with the mirror-master tape raised over a pinch roller and a guide to become disposed on the pinch roller and the guide as shown in FIG. 1 when the threading and dancer arms are returned to their retracted positions;

FIG. 7 is an enlarged fragmentary view of threading and dancer arms for the slave cassette in retracted positions at the second (threading) station with the slave tape still in the slave cassette and with the threading arms engaging the slave tape in the slave cassette;

FIG. 8 is an enlarged fragmentary view similar to that shown in FIG. 7 and shows the threading and dancer arms for the slave cassette in extended positions at the third image transfer station with the slave tape raised over a capstan;

FIG. 8A is a perspective view of the apparatus shown in FIG. 1 and shows the slave tape and the threading and dancer arms for the slave tape at the second (threading) station when the threading arms and the dancer arms are moved partially from their retracted positions to their extended positions;

FIG. 8B is a perspective view of the apparatus shown in FIG. 1 and shows the slave tape and the threading arms and the dancer arm for the slave tape at the third (image transfer) station when the threading arms and the dancer arm are disposed to the fully extended position corresponding to that shown in FIG. 8;

FIG. 9 is a perspective view of the threading station and of the first (supply) station before the removal of the forward one of the slave cassettes from the first (supply) station for movement to the second (threading) station;

FIG. 10 is a perspective view of the apparatus shown in FIG. 9 with a door at the front of the first (supply) station partially open, this door being opened to provide for the stacking of additional ones of the slave cassettes into the first (supply) station;

FIG. 11 is a schematic fragmentary perspective view illustrating the disposition of the slave cassette during the pivotal transfer of the slave cassette from the first (supply) station to the second (threading) station and further illustrating apparatus for facilitating such transfer;

FIG. 12 is a schematic fragmentary perspective view similar to that shown in FIG. 9 but with the slave cassette approaching the second (threading) station in its pivotal movement;

FIG. 13 is a schematic fragmentary elevational view of the pinch roller and the tensioning guide contiguous to the pinch roller with the pinch roller and the guide displaced from the capstan to facilitate the disposition of the mirror-master tape on the guide and the pinch roller and further illustrates additional tensioning apparatus for the mirror-master tape, such additional tensioning apparatus being shown in solid lines in an operative position and in broken lines in a displaced position during the threading of the master tape;

FIG. 14 is a schematic fragmentary plan view similar to that shown in FIG. 13 but with the pinch roller and the guide in a second position where the pinch roller abuts the capstan and with the tensioning apparatus in the operative position;

FIG. 15 is a perspective view of the apparatus for gripping the slave cassette in the first station and moving the slave cassette to the different stations;

FIG. 16 is a fragmentary sectional view taken substantially on the line 16—16 of FIG. 15 and illustrates in additional detail the construction of the apparatus for gripping the slave cassette in the first station and moving the slave cassette to the different stations;

FIG. 16A is a fragmentary schematic elevational view of the forward slave cassette and the next slave cassette in the first station and of a finger disposed between the forward and next cassettes for gripping the forward cassette in the first station;

FIG. 17 is an elevational view of the apparatus shown in FIGS. 15, 16 and 16A for gripping the forward one of the slave cassettes in the first station and moving the slave cassette to the different stations;

FIG. 17A is an exploded perspective view of the apparatus shown in FIGS. 15–17 for gripping the forward one of the slave cassettes in the first (supply) station and for moving such slave cassette from the first (supply) station;

FIG. 18 is a fragmentary perspective view of apparatus for pivoting the cover on the slave cassette to expose the slave tape in the slave cassette during the movement of the slave cassette from the first (supply) station to the second (threading) station;

FIG. 19 is a fragmentary perspective view of apparatus for pivoting the cover for the slave cassette with the cover partially pivoted from the slave cassette to expose the slave cassette;

FIG. 20 is a perspective view of the apparatus shown in FIGS. 18 and 19 and shows such cover completely pivoted from the slave cassette to expose the slave tape in such cassette and further shows a pin, at the second (threading) station to maintain the cover in the fully pivoted position;

FIG. 21 is an elevational view taken substantially on the line 21—21 of FIG. 2 and illustrates the construction in additional detail of the station (the fourth station) for receiving the slave cassettes after the image on the master tape has been transferred to the slave tapes in such cassettes;

FIG. 22 is a fragmentary elevational view similar to that shown in FIG. 21 and illustrates certain features shown in FIG. 21 in a different position than that shown in FIG. 21;

FIG. 23 is an exploded perspective view of the apparatus shown in FIGS. 21 and 22;

FIG. 24 is a perspective view of the apparatus shown in FIGS. 21–23 and illustrates the position of a slave cassette as the slave cassette is being transferred into the fourth (receiving) station;

FIG. 25 is a fragmentary plan view of members for transferring the slave cassette into the fourth (receiving) station after the slave cassette has reached the fourth (receiving) station, the members being shown in a first position for initiating the transfer of the slave cassette into the fourth station;

FIG. 26 is a fragmentary plan view similar to that shown in FIG. 25 and schematically illustrates the members at an intermediate position in transferring the slave cassette into the fourth (receiving) station;

FIG. 27 is a fragmentary plan view similar to that shown in FIGS. 25 and 26 and schematically illustrates the members at an advanced position in transferring the slave cassette into the fourth (receiving) station;

FIG. 28 is a sectional view taken substantially on the line 28—28 of FIG. 25 and illustrates in additional detail the construction of certain of the members shown in FIGS. 25–27;

FIG. 29 is a flow diagram of a subroutine indicating the sequence of steps performed in determining the length of the image or movie on the mirror-master tape and in then positioning the mirror-master tape to initiate the transfer of the image or movie on the master tape to the slave tape;

FIG. 30 is a flow diagram of a subroutine for positioning the mirror-master tape on the supply reel to transfer an image on the mirror-master tape to a slave tape;

FIG. 31 is a flow diagram of a subroutine for disposing a slave tape on the capstan, the guide and the heater to obtain a transfer of the image on the mirror-master tape to the slave tape and for removing the slave tape from the capstan, the guide and the heater after such image transfer;

FIG. 32 is a flow diagram of a subroutine for gripping the forward one of the slave cassettes in the first (supply) station, pivoting the slave cassette to the second (threading) position and disposing the slave tape in such cassette on the capstan, guide and heater at the second station;

FIG. 33 is a flow diagram of a subroutine for transferring the image on the mirror-master tape to the slave tape after the slave tape has been transferred to the third (image transfer) position;

FIG. 34 is a flow diagram of a subroutine for removing the slave cassette from the capstan, the heater and the guide and for moving the slave cassette to the fourth (receiving) station after the image on the mirror-master tape has been transferred to the slave tape in such slave cassette;

FIG. 35 is a flow diagram of a subroutine for transferring the slave cassette into the fourth (receiving) station after the slave cassette has been moved to the fourth station, FIG. 36 is a schematic block diagram of a system for regulating the heat produced by the heater for the thermomagnetic layer on the slave tape and for providing a rapid heating of the heater on a regulated basis when the apparatus show in the previous Figures initially becomes operative;

FIG. 37 is a schematic view illustrating the transfer of an image from a master tape to a mirror-master tape to compensate for the stretching of the slave tape, as a result of the heat in the slave tape, during the transfer of the image from the mirror-master tape to the slave tape;

FIG. 38 is a schematic perspective view of one embodiment of apparatus for determining the length of the slave tape;

FIG. 39 is a schematic perspective view of another embodiment of apparatus for determining the length of the slave tape; and FIG. 40 is a schematic view of one embodiment of apparatus for removing water from the thermomagnetic layer of the slave tape before the image on the mirror-master tape is transferred to the thermomagnetic layer on the slave tape.

Basic aspects of the system constituting this invention are disclosed and claimed in application Ser. No. 07/733,174 filed by Alfred M. Nelson and Robert P. Adams on Jul. 19, 1991, for a "Tape Duplicating System" and assigned of record to the assignee of record of this application. Improvements in this system are disclosed and claimed in application Ser. No. 07/886,688 filed by Alfred M. Nelson and Robert P. Adams on May 19, 1992, for a "Tape Duplicating System" and assigned of record to the assignee of record of this application. Additional improvements are disclosed and claimed in application Ser. No. 08/026,697 filed by Alfred M. Nelson and Robert P. Adams on Mar. 5, 1993, for a "Tape Duplicating System" and assigned of record to the assignee of record of this application. Other improvements are disclosed and claimed in application Ser. No. 08/028,240 filed by Alfred M. Nelson, Charles E. Redman and Alan N. Raffaelli on Mar. 9, 1993, for a "Tape Duplicating Apparatus and Method". If any additional information should be needed to complete the disclosure of the invention claimed in this application, applicants intend to have such co-pending applications complete the disclosure. This is particularly true since applicants provide only a limited disclosure in this application of some of the features common to the co-pending applications.

In one embodiment of the invention generally indicated at 11, a mirror-master tape 10 (FIG. 1) is provided with a mirror image of information such as visual pictures and aural sound to be reproduced on a slave tape 12. Preferably the mirror-master image of the visual and aural information is recorded in magnetic form on the mirror-master tape 10. The mirror-master image may be recorded in either analog or digital form. The visual and aural information may be provided in a layer of a magnetizable oxide such as an iron oxide on the surface of the mirror-master tape. The magnetizable oxide may be formed in a conventional manner on the mirror-master tape 10.

The slave tape 12 (FIG. 1) preferably has a thermomagnetic layer on the tape. The thermomagnetic layer may be formed on the slave tape 12 from a suitable material such as chromium dioxide in a manner well known in the art. The thermomagnetic layer preferably has a Curie temperature above which magnetic information in the thermomagnetic layer is destroyed and below which the magnetic information on the mirror-master tape can be transferred in the mirror image to the thermomagnetic layer 14 on the slave tape by contact between the master and slave tapes. Preferably the image transfer occurs at a temperature close to the Curie temperature. When this occurs, the image transfer can occur by pressing the mirror-master and slave tapes together and can occur without any need to provide magnetic heads for transferring the magnetic information from the mirror-master tape 10 to the thermomagnetic layer on the slave tape 12. It will be appreciated that the magnetic layer on the mirror-master tape 10 may also be formed from a thermomagnetic material. It will be further appreciated that the slave tape 12 does not have to have a thermomagnetic layer and that the image can be magnetically transferred from the mirror-master tape 10 to the slave tape 12 by the other techniques than thermomagnetic techniques.

The mirror-master tape 10 can be initially wound on a supply reel 16 and can then be unwound from the supply reel 16 and wound on a take-up reel 18. The unwinding of the mirror-master tape 10 from the supply reel 16 can be provided by a capstan motor 13 (FIG. 1) and the winding of the master tape on the take-up 18 reel can occur through the operation of a take-up motor 20 (FIG. 1). The reels 16 and 18 and the take-up motor 20 can be constructed in a conventional manner as in a video cassette 21 found in many homes. Similarly, a supply reel 22, a take-up reel 24 and a take-up motor 26 can be provided in a video cassette 28 for the slave tape 12. The cassettes 21 and 28 can be those used in video cassette recorders (VCR) for some time available commercially for showing home movies.

FIG. 1 shows a system for transferring the image on the mirror-master tape 10 to the slave tape 12. The mirror-master tape 10 extends from the supply reel 16 over a pin 30 in the cassette 21 to tensioning apparatus generally indicated at 32 for maintaining a substantially constant tension on the mirror-master tape regardless of variations in tape tension resulting from eccentricities in the rotation of the supply reel. The tensioning apparatus 32 is disclosed in detail and claimed in application Ser. No. 08/026,697 (attorneys file D-2666). The tape 10 is disposed on a spring 34 in the tensioning apparatus 32 and is then extended around pins 36 and 38. The tensioning apparatus 32 and the pins 36 and 38 are disposed on a member 40 pivotable as at 42 between an operative position shown in solid lines in FIG. 1 and a position displaced in a counterclockwise direction from the operative position as shown in FIGS. 5 and 6. The tensioning apparatus 32 may be considered as an articulator when the flow charts shown in FIGS. 29–35 for providing subroutines are discussed subsequently in this specification.

The tape 10 then extends over a guide generally indicated at 44 in FIG. 1. The construction and operation of the guide 44 are fully disclosed and claimed in co-pending application Ser. No. 07/886,688. The guide 44 receives a vacuum from a source 46 at its upstream end in the direction of tape movement and air under pressure from a source 48 at its downstream end. In this way, the tension of the master tape 10 is regulated at a substantially constant value just before the mirror-master tape moves to the periphery of a pinch roller 50. The mirror-master tape 10 then extends around a pin 52 at the end of a dancer arm 54, around a pin 56 and between a pair of pins 58 in the cassette 21 to the take-up reel 18 in the cassette.

The slave tape 12 extends from the supply reel 22 between a pair of pins 60 in the slave cassette 28 and then on the end of a spring 62 in tensioning apparatus generally indicated at 64. The tensioning apparatus 64 is also referred to as "an articulator" in the subsequent discussion relating to the flow charts shown in FIGS. 29–35. The tensioning apparatus 64 may have a construction and operation corresponding to the construction and operation of the tensioning apparatus 32. In this way, the tensioning apparatus 64 compensates in the tension of the slave tape 12 for changes in tension resulting from eccentricities in the rotation of the supply reel 22.

The slave tape 12 then extends over a pin 66 to a guide generally indicated at 68. The guide 68 corresponds in function and operation to the guide 44. The guide 68 regulates the tension of the slave tape 12 just before the slave tape reaches a heater generally indicated at 70. The heater may have a construction and operation such as disclosed and claimed in co-pending application Ser. No. 07/733,174. In this way, the tensions of the mirror-master tape 10 and the slave tape 12 are respectively regulated by the guides 44 and 68 so that the image on the slave tape 12 will conform to the image on the mirror-master tape 10 after the thermomagnetic layer on the slave tape has cooled to ambient temperatures. In effect, the guide 44 compensates for the extra length imparted to the slave tape 12 by the stretching resulting from the heater 70.

The heater 70 is disposed between the guide 68 and a capstan 72 in contiguous relationship to the guide and the capstan. The capstan 72 abuts the pinch roller 50 in one operative relationship of the pinch roller and the slave tape 12 extends over the capstan. The capstan 72 is driven by the motor 13. The capstan 72 and the pinch roller 50 accordingly press the slave tape 12 against the mirror-master tape 10 after the heater 70 has heated the thermomagnetic layer on the slave tape to a temperature above the Curie temperature of the thermomagnetic layer to destroy any image in the thermomagnetic layer.

It will be appreciated that the capstan 72, the heater 70 and the guide 68 can be interchanged with the guide 44 and the pinch roller 50 without departing from the scope of the invention. The claims in the application should accordingly be interpreted broadly to cover the possibility of such an interchange.

The contact between the mirror-master tape 10 and the slave tape 12 causes the slave tape to be cooled below the Curie temperature and the image on the master tape 10 to be transferred to the thermomagnetic layer on the slave tape. The slave tape 12 then extends around a pin 76 at the end of a dancer arm 78 and around a pin 80 to a pin 82 in the cassette 28. The slave tape 12 extends from the pin 82 to the take-up reel 24.

A controller 84 (which may be a microprocessor) in FIG. 1 controls the operation of the take-up motors 20 and 26 for the take-up reels 18 and 24, the drive motor 13 and the power source to the heater 70. The controller 84 also controls the operation of an actuator 86 which moves the guide 44 and the pinch roller 50 to a first position with the pinch roller abutting the capstan 72 and a second position with the pinch roller displaced from the capstan. In the first position of the pinch roller 50, the image on the mirror-master tape is transferred to the slave tape 12 when the pinch roller and the capstan 72 are rotated. In the second position of the pinch roller 50, the mirror-master tape 10 can be disposed on the pinch roller and the slave tape 12 can be disposed on the capstan 72.

An infrared source 85 is in an aperture in the slave cassette 28. An infra-red detector 87 receives the light from the source 85 and produce a signal when substantially all of the image on the mirror-master tape 10 has been transferred to the slave tape 12. This causes the pinch roller to be moved from the position (FIG. 14) abutting the capstan 72 to the position (FIG. 13) displaced from the capstan. In the displaced position of the pinch roller 50, the capstan 72 is immediately stopped by de-energizing the drive motor 13 (FIG. 1). An infrared detector 89 detects when the slave tape 12 is broken or when all of the slave tape has been transferred from the supply reel 22. An infrared source 89 and an infra-red detector 91 may be similarly provided for the master tape 10. An infrared detector 93 detects when the mirror-master tape 10 is broken or when all of the master tape has been transferred from the supply reel 16.

The system shown in FIG. 1 and described above has certain important advantages. It provides for the transfer of the image on the mirror-master tape 10 in the cassette 21 to the slave tape 12 in the cassette 28. Since the image transfer is from the tape in the cassette 21 to the tape in the cassette 28, the system can be relatively small and simple. Furthermore, since the image on the mirror-master tape 10 is transferred to the slave tape 12 in the cassette 28, the image on the slave tape is ready for immediate display since the cassette is a video cassette reproducer (VCR) of standard construction. The system is also advantageous in regulating the tensions of the mirror-master and slave tapes during the transfer of the image on the master tape to the slave tape. This provides for the transfer of the image on the mirror-master tape with high fidelity to the slave tape.

The system shown in FIG. 1 is disposed at a 0° station where the image on the mirror-master tape 10 can be transferred to the slave tape 12. In this station, all of the components shown in FIG. 1 are in a common plane. Stated differently, the master cassette 21 is perpendicular to the pinch roller 50 and the slave cassette 28 is perpendicular to the capstan 72. Before the image on the mirror-master tape 10 can be transferred to the slave tape 12, the mirror-master tape 10 has to be disposed on the guide 44 and the pinch roller 50 and the slave tape 12 has to be disposed on the guide 68, the heater 70 and the capstan 72. This is accomplished with certain components shown in FIG. 1 in positions defining a 15° station. In the 15° station, certain of the components defining the path of the slave tape 12 in FIG. 1 may be considered as being tilted upwardly from the plane of the paper through a suitable angle such as approximately 15° with the right end of the cassette 28 in FIG. 1 as a fulcrum. Similarly, the components defining the path of the mirror-master tape 12 in FIG. 1 may be considered as being tilted upwardly from the plane of the paper through an angle such as approximately 15° with the fulcrum near the left end of the cassette 21 in FIG. 1.

The mirror-master tape 10 is initially disposed on a plate 90 (FIG. 2) at a suitable angle such as an angle of approximately 90° to the flat surface shown in FIG. 1. This flat surface is common to the guide 44, the pinch roller 50, the guide 68, the heater 70 and the capstan 72, the mirror-master tape 10 and the slave tape 12 during the time that the image on the mirror-master tape 10 is being transferred to the slave tape 12. This flat surface may be considered to be a 0° position or station. The position of the master cassette 21 at the 90° position is illustrated schematically at 21a in FIG. 2 and the position of the master cassette 21 at the 0° position is illustrated schematically at 21b in FIG. 2.

Before the mirror-master tape 10 is transferred from the 90° position or station 21a to the 0° position or station 21b, it is transferred to a position or station 21c. The position of the station 21c is between the positions or stations 21a and 21b and is at a suitable angle such as 15° relative to the 0° position 21b. The plate 90 (FIGS. 2, 5 and 6) is initially disposed at the 15° position 21c. The plate 90 holds a pair of threading arms 92 and 94 (FIGS. 5 and 6) and the dancer arm 54. The threading arms 92 and 94 are respectively pivotable on pins as at 96 and 98 between retracted and extended positions.

The pivoting of the threading arms 92 and 94 is synchronized by of meshing gears 100 and 102 (FIGS. 5 and 6) respectively disposed on the pins 96 and 98. The pin 30 (also shown in FIG. 1) is disposed at the free end of the threading arm 92 and a pin 104 is disposed at the free end of the threading arm 94. As shown in FIGS. 5 and 6, the threading arm 94 engages a lug 106 on the dancer arm 54 to pivot the dancer arm from the retracted position shown in FIG. 5 to the extended position shown in FIG. 6 as the threading arm pivots from the retracted position shown in FIG. 5 to the extended position shown in FIG. 6. The dancer arm 54 is pivotable as at 110 and is spring loaded as at 112 to return the dancer arm from the extended position shown in FIG. 6 to the retracted position shown in FIG. 5 when the threading arms 92 and 94 return from the extended positions shown in FIG. 6 to the retracted positions shown in FIG. 5.

In the position shown in FIG. 5, the pin 30 on the threading arm 92 and the pin 104 on the threading arm 94 engage the master tape while the master tape 10 is still entirely within the cassette 21. This is the 15° position of the station discussed above and is indicated at 21c in FIG. 2. With the cassette 21 disposed on the plate 90 in the position of the station 21c (FIG. 2), the threading arms 92 and 94 are pivoted from the retracted positions shown in FIG. 5 to the extended positions shown in FIG. 6. When the threading arm 94 is pivoted to the position shown in FIG. 6, the threading arm 94 engages the lug 106 and moves the dancer arm 54 to the position shown in FIG. 6 against the action of the helical spring 112.

In the position shown in FIG. 6, the pins 30 and 104 respectively on the threader arms 92 and 94 dispose the master tape 10 outwardly from the master cassette 21. The pin 52 on the dancer arm 54 engages the mirror-master tape 10 tightly against the pin 104. The plate 90 is then moved from the station 21c (the 15° position) to the station 21 (the 0°) position in FIG. 2.

At the station 21b shown in FIG. 2, the threading arms 92 and 94 are retracted from the extended position shown in FIG. 6 to the position shown in FIG. 5. As the threading arms 92 and 94 retract, the dancer arm 54 retracts because of the action of the spring 112. As the threading arms 92 and 94 retract from the position shown in FIG. 6 to the position shown in FIG. 5, the articulator 32 pivots on the pin 42 from the position shown in FIGS. 5 and 6 to the position shown in FIG. 1 so that the mirror-master tape 10 becomes disposed on the spring arm 34 at the end of the spring arm. This causes the mirror-master tape 10 to become disposed on the spring arm 34, the guide 44 and the pinch roller 50 as shown in FIG. 1.

The slave tape 12 receives a sequence of operations similar to that shown in FIGS. 1, 2, 5 and 6 for the master tape 10 and described above. The slave cassette 28 has different stations corresponding to the different stations for the master tape. Specifically, a plurality of slave cassettes 28 are disposed in a stacked relationship in a station generally indicated at 120 at FIG. 2. The forward cassette in the station 120 is designated as 28a to indicate its correspondence to the station 21a for the master cassette.

The slave cassettes 28 are retained in the station 120 as by a leaf spring 123 (FIGS. 2, 2A and 2B) wound in a helical configuration at one end on a pin 286. The helical portion of the leaf spring 123 is confined within a pair of spaced walls 124. A backing member 125 attached to the spaced walls 124 also tends to confine the helical portion of the leaf spring 123. The leaf spring 123 urges the cassettes forwardly in the station.

The leaf spring is attached to a post 127 at the forward end of the station 120. A ramp 129 pivotable as at 131 abuts the forward periphery of the forward one of the cassettes in the station 120. The ramp 129 is biased upwardly by a compressed spring 133. The ramp 129 is depressed by a pivotal movement on the pin 131 against the action of the spring 133 when additional ones of the slave cassettes 28 are loaded into the station 120 from the forward end of the cassette.

The forward cassette 28a in the station 120 is pivoted through an arc indicated in broken lines at 122 (FIG. 2) to a position or station 28c corresponding to the station 21c for the master cassette. It will be appreciated that this pivotal movement is through an angle such as 165° for the slave cassette 28 as distinguished from a pivotal movement of the master cassette 10 through an angle such as approximately 75°. At the position or station 28c, an initial threading operation is provided corresponding to the initial threading provided on the cassette 21 at the station 21c. In other words, the slave tape 12 is moved from the position inside the cassette 28 to a position above the guide 68, the heater 70 and the capstan 72 with the pinch roller 50 displaced from the capstan.

The slave cassette 28a is then pivoted to the position 28b corresponding to the position shown at 21b for the master tape 10. The pivoting occurs through an arc indicated schematically at 122 in FIG. 2. At this station, the master cassette 21 is perpendicular to the pinch roller 50 and the slave cassette 28 is perpendicular to the capstan 72. After the image on the mirror-master tape 10 has been transferred to the slave tape 12 at the position 28b, the slave cassette 28a is transferred to a position or station 28c and the slave tape 12 is removed from the guide 68, the heater 70 and the capstan 72 and causes the slave tape 12 to be returned to a disposition entirely within the cassette 28. The slave cassette is then transferred into a station generally indicated at 250 in FIG. 2.

As will be seen in FIG. 3, the slave cassette 28 has a groove 130. This groove is disposed at a forward periphery of each of the slave cassettes 28 in the station 120. As shown in FIG. 3, a spring clip 132 is disposed in the groove 130 in the forward one of the cassettes 28 in the station 120. A retaining pin 134 extends into the groove 130 in the forward periphery of the next one of the slave cassettes 28 in the station 120 and grips the rear periphery of the forward one of the cassettes. The spring clip 132 and the retaining pin 134 retain the forward one of the slave cassettes as the slave cassette is pivoted to the different positions or stations shown in FIG. 2. Although only one spring clip 132 and one retaining pin 134 are shown in FIG. 3, two (2) spring clips 132 and two (2) retaining pins 134 are actually provided (FIG. 15) to grip the forward one of the slave cassettes 28 at different heights on the slave cassette. This will be described in detail subsequently.

When the slave cassette 28 is in the position or station 28c, it engages a plate 136 (FIGS. 7 and 8) corresponding to the plate 90 (FIG. 8b) for the mirror-master tape. The plate 136 contains threading arms 138 and 140 respectively corresponding to the threading arms 92 and 94 for the master tape 10. The threading arms 138 and 140 are respectively pivotable on pins 142 and 144. Pins 146 and 148 are respectively provided at the ends of the threading arms 138 and 140. The pins 146 and 148 engage the slave tape 12 inside the slave cassette 28 in the retracted position of the threading arms shown in FIG. 7. The threading arms 138 and 140 are pivoted synchronously as by meshing gears 150 and 152 driven by a motor 154.

The plate 136 also contains the dancer arm 78. The threading arm 140 engages a lug 156 on the dancer arm 78 to drive the dancer arm from the position shown in FIG. 7 to the position shown in FIG. 8 as the threading arm is pivoted by the motor 154 from the position shown in FIG. 7 to the position shown in FIG. 8. The dancer arm 78 is pivotable on a pin 158 at one end of the threading arm. A suitable constrainable member such as a helical spring 160 becomes constrained when the dancer arm 78 becomes pivoted from the position shown in FIG. 7 to the position shown in FIG. 8. The constrained spring 160 returns the dancer arm 78 to the position shown in FIG. 7 when the motor 154 returns the threading arms 138 and 140 to the positions shown in FIG. 7 from the positions shown in FIG. 8.

The threading arms 138 and 140 and the dancer arm 78 are in the positions shown in FIG. 7 when the slave cassette 28 reaches the position 28c after being withdrawn from the station 120 and pivoted from the position or station 28a to the position or station 28c. The position or station 28c corresponds to the 15° position or station of the slave cassette. At this station, the threading arms 138 and 140 are rotated from the position shown in FIG. 7 to the position shown in FIG. 8. The threading arm 140 in turn drives the dancer arm 78 from the position shown in FIG. 7 to the position shown in FIG. 8. FIG. 8A shows the slave tape 12 partially extended in the 15° position or station. FIG. 8B shows the slave tape 12 in the fully extended position.

In the position shown in FIG. 8, the slave tape 12 is disposed over guide 68, the heater 70 and the capstan 72. The plate 136 is moved to the station 28b (the 0° position) for the slave tape 12 after the tape has been extended to the position shown in FIG. 8. At this station, the threading arms 138 and 140 are retracted to the position shown in FIG. 7. This causes the dancer arm 78 to be retracted to the position shown in FIG. 7. In these positions of the threading arms 138 and 140 and the dancer arm 78, the slave tape 10 has the path shown in FIG. 1 with the slave tape being disposed on the guide 68, the heater 70 and the capstan 72. At the same time that the threading arms 138 and 140 and the dancer arm 78 are retracted to the positions shown in FIGS. 1 and 7, the articulator 64 is moved from the position shown in FIGS. 7 and 8 to the position shown in FIG. 1.

The slave cassette 28 is pivoted to the different positions shown in FIG. 3 as by an arm 160 pivotable on a pin 162. The arm 160 is shown in FIG. 3 in a first position 160a corresponding to the position or station 28a for the slave cassette 28 and in a position 160c corresponding to the position or station 28c for the slave cassette. As will be seen in Figures subsequent to FIGS. 7 and 8, the arm 160 is mechanically coupled to an arm which drives the spring clip 132 with the arm 160 to rotate the slave cassette 28 from the position or station 28a to the position or station 28c.

A roller 164 (FIGS. 3 and 4) is disposed against the back side of the plate 136. The roller 164 is disposed at the end of an arm 166 pivotable at its opposite end on a pin 168. A constrainable member such as a helical spring 170 is disposed on the pin 168 so as to become constrained as the plate 136 is moved from the 15° position (shown in solid lines in FIG. 4) to the 0° position (shown in broken lines in FIG. 4). As the spring 170 becomes constrained, it exerts a force against the plate 136 to provide a controlled movement of the plate 136 to the 0° position. In the 0° position, the image on the mirror-master tape 10 is transferred to the slave tape 12. After the image on the mirror-master tape 10 has been transferred to the slave tape 12 and the plate 136 is returned to the 15° position (the position or station 28c) for the slave cassette 28, the spring 170 operates to move the plate 136 to the 15° position.

As shown in FIG. 11, the slave cassette 28 has a socket 172 concentric with the supply reel 22 and a socket 174 concentric with the take-up reel 24. Each of the sockets 172 and 174 is splined respectively to receive mating cylinders 176 and 178 on the plate 136 in the 15° position of the plate. The mating cylinder 178 is driven by the take-up motor 26 in FIG. 1 when the plate 136 is pivoted to the 0° position (the position 28b of the slave cassette 28) in FIGS. 2, 3 and 4.

After the image on the mirror-master tape 10 has been transferred to the slave tape, the threading arms 138 and 140 and the dancer arm 78 (FIGS. 1, 7 and 8) are pivoted from the retracted position shown in FIG. 7 to the extended position shown in FIG. 8. This causes the slave tape 12 to become displaced from the guide 68, the heater 70 and the capstan 72. The plate 136, the threading arms 138 and 140 and the dancer arm 78 are then moved with the slave cassette 28 to the 15° position or station. The threading arms 138 and 140 and the dancer arm 78 are then moved from the extended position shown in FIG. 8 to the retracted position shown in FIG. 7. In this relationship, the slave tape 12 becomes released from the threading arms 138 and 140 and the dancer arm 78 and becomes disposed entirely in the slave cassette 28 as shown in FIG. 7.

As previously described, the slave cassettes 28 are initially located in a supply station 120 (indicated by the slave cassette 28a in FIG. 2) and are moved to the 15° station indicated schematically at 28c in FIG. 2. The rotation is provided by a gear 180 (FIG. 17) which drives a bevel gear 182 mounted on a support member 195. The bevel gear 182 in turn drives a shaft 184 on which is mounted the arms holding the spring clips 132 (also shown in FIG. 3). As previously described, the spring clips 132 are seated in the groove 130 (FIG. 3) at the forwardly facing periphery of the forward one of the slave cassettes 28 in the station 120. Each of the arms holding the spring clips 132 is formed by a block 186 (FIG. 17A) to which is attached as by bolts 187 a plate 188 holding one of the spring clips 132. A slot 190 is provided in the block 186 at a position adjacent the plate 188.

A bracket 192 (FIG. 17A) is disposed on a bearing 194 which is mounted on the shaft 184. The bracket 192 is attached as by bolts 196 to the plate 136. A bracket 193 (FIG. 15) is mounted on a support member 195 and is provided with a lug 197 which overhangs the plate 136 and prevents the plate from moving past the 15° station (the position 28c of the slave cassette 28 in FIG. 2) toward the 180° position (the position 28a of the slave cassette 28 in FIG. 2). This causes the plate 136 to be movable only between the 15° position (the position 28c of the slave cassette 28 in FIGS. 2 and 3) and the 0° position (the position 28b of the slave cassette 28 in FIG. 2).

A pair of clevises generally indicated at 198 (FIGS. 15, 16, 17 and 17A), each defined by two (2) spaced discs, 199 with a groove 200 between the discs is also mounted on the shaft 184. A tyne 202 extends vertically from one of the discs in each clevis 198 into the slot 190 in the block 186 to move the block and the plate 188 rotationally with the clevis. Forked members 204 are disposed in the grooves 200 in the clevises 198 with the legs of each fork enveloping the associated groove. The forked members 204 are mounted on rods 206 each of which is movable vertically in accordance with the rotary movements of a crank 208 (FIGS. 15 and 17). The crank 208 is mounted on the support member 195. As may be seen in FIGS. 15 and 17, the crank 208 has a pair of pins 212 one of which engages the upper one of the rods 206 and the other one of which engages the lower one of the rods. The crank 208 is rotatable on a pin 214. Each of the rods 206 has a button 215 (FIG. 17A) which moves on the support member 195 (FIGS. 15 and 17A) in accordance with the rotation of the crank 208. The crank 208 is driven by a motor 217 in FIG. 16.

Each of the clevises 198 is attached as by bolts 216 (FIG. 17A) to a support member 218. The support member 218 has a socket 220 which receives the clevis 198. The support member 218 also has a socket 222 which receives one of the pins 134 (also shown in FIG. 3). The pin 134 is fixedly positioned relative to the support member 218 as by a set screw 226. Each of the pins 134 has a finger 228 which is disposed in the groove 130 (FIG. 3) in the forward periphery of the next one of the slave cassettes 28 in the station 120. The finger 228 may be tapered. The finger 228 engages the rearward periphery of the forward one of the slave cassettes 28 in the station 120. Support members 230 (FIG. 17A) are disposed at the top and bottom of the shaft 184 and are suitably attached as by bolts 232 to the support member 195. The shaft 184 extends through a hole 234 in each of the support members 230. A bearing 236 is disposed between the shaft 184 and each of the support members 230.

When the crank 208 is rotated in a counterclockwise direction on the pin 214 as shown by the arrows in FIG. 17, one of the pins 212 on the crank in FIG. 17 drives the upper rod 206 downwardly and the other pin 212 on the crank drives the lower rod 206 upwardly. The upper one of the forked members 204 (FIG. 17A) moves downwardly with the associated rod 206 and drives the upper clevis 198 downwardly. This causes the finger 228 on the associated one of the pins 134 to become disposed in the top of the groove 130 in the next one of the slave cassettes 28 in the supply station 120 and to grip the forward one of the slave cassettes at the rear periphery of the slave cassette.

In like manner, the lower one of the forked members 204 moves upwardly with the associated rod 206 and drives the lower clevis 198 upwardly. This causes the associated finger 228 on the associated one of the pins 134 to become disposed in the bottom of the groove 130 in the next one of the slave cassettes 28 in the supply station 120 and to grip the forward one of the slave cassettes at the rear periphery of this slave cassette. Since the forward periphery of the forward one of the slave cassettes 28 in the supply station 120 is also gripped at its upper and lower positions by the spring clips 132 (FIG. 3), the forward one of the slave cassettes 28 is firmly held at its forward and rear peripheries and is able to be pivoted from the supply station 120 (the 180° position) to the position 28c (the 15° position) in FIGS. 2 and 3 and the position 28b (the 0° position) in FIGS. 2 and 3.

Each of the slave cassettes 28 has a spring loaded cover 230 (FIGS. 18–20) which is disposed over the slave tape 12 in the cassette. The spring-loaded cover 230 is conventional in tape cassettes now on the market. As the slave cassette 28 moves from the supply station 120 (the 180° position) toward the threading station (the 15° position), the spring loaded cover 230 becomes opened by the mechanism shown in FIGS. 18–20. The opening of the cover 230 is initiated by the depression of a button 232 on the top peripheral surface of the slave cassette 28. A lug 234 on a bracket 236 depresses the button 232 as the slave cassette 28 swings past the lug. The bracket 236 is supported as by bolts 238 on the support member 195.

As the slave cassette 28 continues to move toward the 0° position, a pawl 240 at the end of an arm 242 engages the cover 230 and opens the cover to expose the slave tape 12. The arm 240 is pivotable as at 244 on the bracket 236. The pawl 240 is tapered as at 246. The pivotable relationship of the arm 242 and the taper 246 at the bottom of the pawl 240 causes the pawl to ride upwardly as the slave cassette 28 moves toward the 15° position or station, thereby providing for the continued movement of the slave cassette 28 toward the 15° position. When the slave cassette 28 reaches the 15° position or station, a pin 248 at the bottom of the plate 136 holds the cover 230 open to provide for the disposition of the slave tape on the capstan 72, the heater 70 and the guide 68 and the subsequent transfer of the image on the master tape 10 to the slave tape 12.

After the image on the master tape 10 has been transferred to the slave tape 12, the slave cassette 28 holding the slave tape 12 is transferred from the 0° station to the 15° station. At the 15° position, the threading arms 138 and 140 and the dancer arm 78 are retracted to the position shown in FIG. 7. The slave cassette is then pivoted to a receiving station generally indicated at 250 in FIGS. 21–28. The receiving station 250 is disposed at a 90° position relative to the supply station 120 at the 180° position and the image transfer station at the 0° position.

At the receiving station 250, the slave cassette 28 is transferred between a pair of belts 252 (FIGS. 21 and 23) movable in the 90° direction. The belts are initially displaced by a distance greater than the height of the slave cassette 28 so that the slave cassette 28 can be easily disposed between the belts. The belts 250 are disposed on a pair of spaced pulleys 254 (FIG. 23) so that the belts can be rotatable in a closed loop in the 90° direction. The pulleys 254 are in turn disposed within a pair of pulleys 256, one of the pulleys in each pair driving the other as by a belt 258.

A motor 260 (FIG. 23) drives one of the pulleys 256 in the upper pair. A pulley 262 is rotatable with the other pulley 256 in the upper pair. The pulley 262 drives an endless belt 264 which in turn drives a pulley 266. Gears 268 and 270 are in turn driven by the pulley 266. The gear 270 is coupled to one of the pulleys 256 in the lower pair. With the belts 252 disposed as shown in FIG. 23, the distance between the belts 252 is greater than the height of the slave cassette 28 to facilitate the transfer of the slave cassette to the position between the belts for transport by the belts.

After the slave cassette 28 has been transferred between the belts 250, a solenoid 272 in FIG. 21 is energized. This causes an arm 274 mounted concentrically on the solenoid to rotate in a counterclockwise direction in FIG. 21. At its free end, the arm 274 has a roller 276 which engages a shelf 278 on which the pulley 266 is mounted. The pivotal movement of the arm 274 in the counterclockwise direction causes the shelf 278 to rise so that the lower one of the belts 252 engages the bottom surface of the slave cassette 28.

The lowered position of the bottom belt 252 is shown in solid lines in FIG. 21 and the raised position of the belt is shown in broken lines in FIG. 21. The raised position of the bottom belt 252 is shown in solid lines in FIG. 22. When the belt is raised to the position shown in FIG. 22, the belt 264 becomes tilted because the gears 268 and 270 change from the vertical relationship shown in FIG. 23 to the skewed relationship shown in FIG. 22.

After the lower belt 252 has become raised to the position shown in FIG. 22, the support members 218 (FIG. 17A) are moved vertically so that the distance between the upper and lower fingers 228 is increased. This causes the fingers 228 to be removed from the rear peripheral surface of the slave cassette 28. Even though the fingers 228 become removed from the rear peripheral surface of the slave cassette 28, the slave cassette is retained firmly in position between the belts 252 in FIG. 23. The slave cassette 28 is then rotated through a relatively small angle such as a few degrees (e.g. 4°) toward the 0° position by the rotation of the gears 180 and 182 (FIG. 16). This allows the spring clips 132 to slip out of the grooves 130 in the slave cassette 28 so that the slave cassette 28 is retained only by the belts 252.

After the slave cassette 28 has been transferred to the belts 252 by raising the lower one of the belts, the motor 260 (FIG. 23) is operated to move the belts in a direction (see the arrow 281 in FIG. 25) for transferring the slave cassette to a platform 280 (FIG. 21) laterally displaced from a compartment 282 (FIG. 27) included in the station. As shown in FIG. 27, the slave cassettes 28 having a copy of the image from the mirror-master tape 10 are disposed in a stacked relationship in the compartment 282.

The mechanism for transferring the slave cassette 28 into the compartment 282 is shown primarily in FIGS. 21 and 24–28. The mechanism includes a motor 300 (FIG. 24) which drives a gear 302 (FIG. 21). The gear 302 is in mesh with a bevel gear 304 which drives a gear train generally indicated at 306 (FIGS. 21 and 24). A disc 308 (FIG. 24) is driven by one of the gears in the gear train 306 and a member 310 in the form of a segment of a cylinder is driven by another one of the gears in the gear train 306. A drive pin 312 is disposed on the periphery of the disc 308 and a drive pin 314 is disposed on the periphery of the disc segment 310. A disc 316 (FIG. 28) is disposed on the same shaft as the disc 308 to sense the light from a source 318 schematically shown in FIG. 25. The sensing is provided to insure that the drive pin 312 is in proper rotary position when the slave cassette 28 is transferred into the compartment 282.

When the slave cassette 28 has been transferred to the compartment 282, the bottom belt 252 (FIG. 23) is lowered. This is partly to position the bottom belt 252 so that the pin 314 (FIG. 24) can be moved by the drive pins 310 into the compartment 282. The rotation of the drive pins 312 and 314 is shown by arrows in FIG. 25. As will be seen in FIG. 25, the rotation of the disc segment 310 is in a clockwise direction and the rotation of the disc 308 is in a counter-clockwise direction.

When the slave cassette 28 reaches the platform 280, the drive pins 312 and 314 are substantially in the positions shown in FIG. 25. The drive pins 312 and 314 are then rotated to the positions shown in FIG. 26. In these positions, the drive pins 312 and 314 engage the rear peripheral surface of the slave cassette 28 at the opposite ends of this peripheral surface. As the drive pins 312 and 314 continue to rotate from the position shown in FIG. 26 to the position shown in FIG. 27, they drive the slave cassette 28 from the platform 280 into the compartment 282 through a mouth 318 through a mouth 319 in the compartment. As will be seen in FIGS. 24 and 25, the mouth 319 of the compartment 318 is substantially parallel to, but displaced from the belts in the direction of movement of the belts. In this way, the belts 252 initially displace the slave cassettes in a direction parallel to the mouth 319 of the compartment 282 and, after the slave cassettes have been transferred to the mouth of the cassette, the slave cassettes are transferred through the mouth into the compartment.

It will be appreciated that the drive pins 310 and 312 align the slave cassette 28 before they drive the slave cassette 28 into the compartment 282. For example, if the slave cassette 28 is skewed to the left as shown in solid lines at 28f in FIG. 25, the drive pin 314 will engage the forward peripheral surface of the slave cassette 28 and will reposition the cassette to an aligned relationship before it reaches the rear peripheral surface of the slave cassette as shown in that Figure. Similarly, if the position of the slave cassette 28 is skewed to the right as indicated schematically in broken lines at 28g in FIG. 25, the drive pin 314 will engage the forward surface of the slave cassette as it moves from the position shown in FIG. 25 to the position shown in FIG. 26. As the drive pin 314 continues to move toward the position shown in FIG. 26, it will align the slave cassette so as to be able to clear the slave cassette and reach the position shown in FIG. 26.

The apparatus shown in the drawings and described above may include several doors for purposes of safety. For example, the apparatus may include a door 330 (FIG. 2) pivotable as at 332 for preventing access in the closed position to the master cassette 21 in the 0° and 15° positions of the master cassette and for providing access in the open position to load the master cassette into the apparatus. The apparatus may also include a front door 334 (FIG. 2) pivotable as at 336. In the closed position, the door 334 prevents access to the components shown in FIG. 1 including the pinch roller 50 and the capstan and the threading arms. In the open position, the door 334 provides access to these components. Only a portion of the door 334 is shown in FIG. 2.

The apparatus may include a slidable door 342 (FIG. 12). The slidable door 342 may be operated by a motor 344 (FIG. 2) and by a rack and pinion arrangement 346. The door 342 is slidable to a closed position preventing the forward one of the slave cassettes in the station 120 from being transferred to the 15° and 0° positions. A door 350 (FIG. 10) is disposed at the front end of the supply station 120. In the open position, the door 350 provides for the insertion of additional ones of the slave cassettes 28 into the supply station 120. In the closed position, the door 350 prevents such insertion.

FIG. 29 provides a flow chart showing a subroutine for positioning the master tape 10 to provide an image on the slave tape 12 in the forward one of the slave cassettes 28 after such slave cassette has been transferred to the 0° position or station. As shown in FIG. 29, the subroutine for loading the mirror-master tape 10 and determining its length is selected in the software by selecting the proper "Call" subroutine in the software.

As indicated in the flow chart in FIG. 29, a first step in the subroutine is to determine if the master tape 10 has been provided at the position 21a in FIG. 2. A determination is then made as to whether the magazine door 330 on the master side is closed. This door is to prevent access to the master cassette 21 from an external position when the master tape is in an operative position. If the door 330 is not closed, an error is indicated in one of the lights 338 on the panel 340 and the subroutine is prevented from continuing. If the door 330 is closed, the master cassette 21 is pivoted to the 15° position or station.

The mirror-master tape 10 is then wound so that substantially all of the tape is on the take-up reel 18 (FIG. 1) and the mirror-master tape 10 is at the beginning of the image or movie. The mirror-master tape 10 is thereafter wound on the supply reel 16 to the end of the tape as sensed by infrared sensor 91. The mirror-master tape 10 is then disposed on the pinch roller 50 at the 0° station and the pinch roller is moved at the 0° station into abutting relationship with the capstan 72. The mirror-master tape 10 is then rewound on the take-up reel 18 until the beginning of tape is sensed by infrared sensor 93.

As part of the factory calibration of the tape drive system, the diameter of the capstan 72 is measured to a high accuracy. This capstan diameter measurement is made as follows: A known-length calibration tape is run from end to end with the pinch roller 50 and the capstan 72 in abutting relationship. The rotation angle of the capstan 72 is measured by counting pulses from a code wheel attached to the capstan as the calibration tape is run from end to end. Since the length of the calibration tape is known and the measurement of the rotation angle of the capstan is inherently accurate, the diameter of the capstan can be calculated with high accuracy. This calculated capstan diameter is stored in computer memory for subsequent measurements of the lengths of mirror-master tapes.

During the rewinding of the mirror-master tape 10 on the take-up reel 18 at the 0° station with the pinch roller 50 and the capstan 72 in abutting relationship, the length of the image on the mirror-master tape 10 is determined. The mirror-master tape is run from one end to the other. The length of the mirror-master tape is determined relatively precisely during this run because the capstan 72 is well coupled to the mirror-master tape 10 by a force of the abutting pinch roller 50 at the 0° station and because the diameter and total rotation angle of the capstan are known with high accuracy. The location of the image on the mirror-master tape is located accurately by specifying that the beginning and end of the image be placed at a specific distance from the beginning and end of the master-tape. A return is then made to the software to obtain a selection in the software of the next subroutine to be performed.

FIG. 30 illustrates a simplified flow chart of a subroutine for indicating the steps in preparing the mirror-master tape 10 to rewind the mirror-master tape. As a first step, the mirror-master tape is unthreaded. This includes the steps of moving the plate 90 to the 15° position and retracting the threading arms 92 and 94 and the dancer arm to the position shown in FIG. 5. The mirror-master tape 10 is then rewound on the take-up reel 18 at the 15° station to the position that constitutes the beginning of the tape (actually the end of the image or movie) on the mirror-master tape. The mirror-master tape 10 is thereafter rethreaded over the guide 44 and the pinch roller 50, and the mirror-master tape is returned to the 0° position ready to transfer the image again to another slave tape 12.

Although the subroutine shown in FIG. 30 and described above is satisfactory at the 15° station, it will be appreciated that the subroutine may also be accomplished with the mirror-master tape 10 in the 0° position. This eliminates any necessity of transferring the master cassette 21 from the 0° position to the 15° position before the subroutine shown in FIG. 30 and described above is performed.

FIG. 31 illustrates the flow chart for the subroutine of threading and unthreading the slave tape 12. As a first step, a determination is made as to whether the pinch roller 50 is open, in other words, whether the pinch roller is displaced from the capstan 72. If the pinch roller 50 is not open, it is opened. If the pinch roller 50 is open and a threading operation is being performed on the slave tape 12, the threading arms 138 and 140 and the dancer arm 78 are extended at the 15° position of the slave cassette 28 from the position shown in FIG. 7 to the position shown in FIG. 8.

In the threading operation, the sliding door 342 (FIG. 12) is closed to optionally allow additional slave cossettes 28 to be loaded into station 120. The plate 136 (FIGS. 2, 7 and 8) is then moved to the 0° position and a determination is made as to whether there is any angular error in the positioning of the plate. If there is no error in such positioning, the operation of the motor for the sliding door 342 is interrupted.

The threading arms 138 and 140 and the dancer arm 78 are then retracted from the position shown in FIG. 8 to the position shown in FIG. 7. If there is no error in such retraction, the articulator 64 is moved from the position shown in FIGS. 7 and 8 to the operative position shown in FIG. 1; the door 350 (FIG. 10) for the supply station 120 is unlocked; and a light is illuminated to indicate that this is a proper time for optionally loading additional ones of the slave cassettes 28 into the supply station 120.

If an unthreading operation is being performed, the articulator 64 for the slave tape 12 is initially moved from the operative position shown in FIG. 1 to the extended position shown in FIGS. 7 and 8 to prevent the articulator from interfering with the threading operation. If there is no error in such movement, the threading arms 138 and 140 and the dancer arm 78 are extended from the position shown in FIG. 7 to the position shown in FIG. 8. If there is no error in such extension, the sliding door 342 (FIG. 12) is opened. The door 350 (FIG. 10) for the supply station 120 is then locked in the closed position. This prevents additional ones of the slave cassettes 28 from being inserted into the supply station 120. The lamp indicating the propriety of inserting the additional ones of the slave cassettes 28 into the supply station 120 is also turned off.

The plate 136 (FIGS. 2, 7 and 8) is then moved from the 0° position or station to the 15° position or station. If there is no error in this positioning, the operation of the motor 344 (FIG. 2) for moving the sliding door 342 (FIG. 12) is discontinued. The threading arms 138 and 140 and the dancer arm 78 are then moved from the extended position shown in FIG. 8 to the retracted position shown in FIG. 7. This completes the subroutine if there is no error. A different subroutine can then be selected.

FIG. 32 shows the flow chart for a subroutine for transferring the slave cassettes 28 to the 0° station and transferring the image on the master tape 10 to the slave tape 12 at the 0° station. As a first step in this subroutine, a determination is made as to whether the door 350 (FIG. 10) to the supply station 120 is open. If the door 350 is not open, the mechanism for gripping and transporting the slave cassettes 28 is operated to move the mechanism to the 180° position where the supply station 120 is located. This mechanism is shown in FIG. 15–17A.

If the mechanism is properly positioned at the 180° station, the forward one of the slave cassettes 28 in the supply station is gripped by the mechanism shown in FIGS. 15–17A. This slave cassette is moved to the 0° position or station if there is no error in the gripping of this slave cassette. If the slave cassette is properly positioned at the 0° position, the slave tape is mounted at the 0° position and rewound to the zero position (so that all of the tape is on the supply reel 22). The slave tape 12 is then rewound on the tape-up reel 24 through a distance corresponding to the length of the image on the master tape 10. The slave tape 12 is now in a position to be rewound on the supply reel 16 while the image on the master tape 10 is transferred to the slave tape. The slave tape is then moved to the 15° position.

If there is no error in the steps described in the previous paragraph, a determination is made as to whether the mirror-master tape 10 is rewound to the position for transferring the image on the mirror-master tape to the slave tape. If the master tape 10 has been properly rewound to the desired position, the threading arms 138 and 140 and the dancer arm 78 are extended from the position shown in FIG. 7 to the position shown in FIG. 8; the slave cassette 28, the threading arms 138 and 140 and the dancer arm 78 are moved to the 0° position; and the threading and dancer arms are retracted at the 0° position to dispose the slave tape on the guide 68, the heater 70 and the capstan 72. If there is no error in these steps, the subroutine shown in FIG. 32 is completed as indicated by the "Return" block in FIG. 32.

FIG. 33 is a flow chart of a subroutine for transferring the image on the mirror-master tape 10 to the slave tape 12. As a first step in the subroutine, a determination is made as to whether the master cassette 21 is in place. If the master cassette 21 is not in place, the master cassette is loaded into the apparatus and the master tape 10 is disposed on the pinch roller 50 at the 0° position or station. A determination is then made as to whether the supply station 120 is empty of slave cassettes 28. If the supply station 120 is empty of slave cassettes 28, an indication to this effect is provided. If the supply station 120 is not empty but the supply of the slave cassettes in the station is low, a display warning to this effect is provided so that the slave cassettes in the supply station can be replenished.

As long as there are slave cassettes 28 in the supply station 120, the forward one of the slave cassettes in the supply station 120 is transferred to the 15° position or station to receive the threader arms 138 and 140 and the dancer arm 78 (FIGS. 1, 7 and 8) and then to the 0° position or station. The slave tape in such cassette is then disposed on the guide 68, the heater 70 and the capstan 72. The pinch roller 50 is then moved to the closed position abutting the capstan 72 and the drive motor 13 (FIG. 1) for the capstan 72 is operated.

The heater 70 is energized. If there is no error in energizing the heater 70, the image on the master tape 10 is transferred to the slave tape 12. At the end of this image transfer or in the event of a heater or tape error, the heater 70 is turned off and the pinch roller 50 is moved from the position (FIG. 14) abutting the capstan 72 to the position (FIG. 13) displaced from the capstan. The rotation of the capstan 72 is discontinued. The motor 20 (FIG. 1) for the mirror-master tape 10 and the motor 26 for the slave tape 12 are de-energized. The mirror-master tape 10 is then rewound on the take-up reel 24 to the position (the end of the image or movie) for initiating a transfer to a slave cassette 28. Concurrent with rewinding the mirror-master tape 10, the slave cassette 28 is transferred to the receiving station 250.

If there are slave cassettes 28 remaining in the supply station 120, the sequence is returned to the position designated as "A" in FIG. 33 to initiate the steps of transferring the image on the mirror-master tape 10 to the tape 12 in the forward one of the slave cassettes 28 in the slave station 120. If the specified number of slave cassettes 28 have been coupled, the door 350 (FIG. 10) at the front of the supply 120 is unlocked and the light indicating the opportunity to insert additional ones of the slave cassettes 28 into the supply station 120 is illuminated. Additional ones of the slave cassettes 28 are then inserted into the supply station.

FIG. 34 shows a flow chart of a subroutine for transferring one of the slave cassettes 28 to the receiving station 250 after the image on the mirror-master tape 10 has been transferred to the slave tape 12 in such cassette. The slave tape 12 is unthreaded from the guide 68, the door 350 (FIG. 10) at the front of the supply station 120 is locked and the light indicating the opportunity to load additional ones of the slave cassettes into the supply station is turned off, as part of the unthread tape routine, and the slave tape is moved to the receiving station 250.

FIG. 35 shows a flow chart of a relatively detailed subroutine for transferring one of the slave cassettes 28 into the receiving station 250 after the image on the mirror-master tape 10 has been transferred to the slave tape 12 in such cassette. The slave cassette 28 is initially rotated from the 15° station to the station 250, which is at 90° relative to the supply station 120 and to the 0° station. A determination is then made as to whether the compartment 282 (the output bin) is full. If the compartment 282 is full, an indication to this effect is provided on an output display (not shown).

If the compartment 282 is not full, the lower one of the belts 252 is raised to engage the bottom surface of the slave cassette 28. When the lower one of the belts 252 (FIG. 23) has engaged the bottom surface of the slave cassette 28, the fingers 228 (FIG. 17A) are removed from engaging the rear periphery of the slave cassette 28. When the fingers 228 have cleared the slave cassette 28, the slave cassette 28 is rotated from the 90° position through a few degrees (e.g. 4°) toward the 0° position. This allows the slave cassette 28 to become clear of the spring clips 132 (FIG. 3). The mechanism (FIGS. 15–17A) including the gears 180 and 182 is then retracted toward the 80° position from the 86° position and the belts 252 (FIG. 23) are operated to move the slave cassette 28 to the shelf 280 (FIG. 24).

A determination is then made as to whether the image on the mirror-master tape 10 has been properly recorded on the slave tape 12. If the determination is in the negative, the subroutine is completed and the slave cassette 28 holding this slave tape is removed and therefore not advanced into the compartment 282. The lower one of the belts 252 is then lowered and the pins 312 and 314 are rotated as shown in FIGS. 25–27 to move the slave cassette 28 into the compartment 282.

The apparatus and method described above have certain important advantages. They provide for a transfer of slave cassettes in sequence from the supply station 120 to the 15° position or station where the threading arms 138 and 140 and the dancer arm 78 are extended. The slave cassettes 28, the threading arms 138 and 140 and the dancer arm 78 are then moved to the 0° position or station and the slave tape is disposed on the guide 68, the heater 70 and the capstan 72 by retracting the threading arms 130 and 140 and the dancer arm 78 and by moving the articulator 64 to the operative position shown in FIG. 1. A similar procedure to that specified above is provided for the master cassette 21 when a different image than that previously provided is to be transferred to the slave tapes 12.

The image on the mirror-master tape 10 is then transferred to the slave tape 12 in the slave cassette 28. The image transfer is provided so that the beginning of the image or movie is at the beginning of the slave tape 12 when the slave tape is wound on the take-up reel 24 for the slave cassette 28. In this way, the slave tape 12 in the slave cassette 28 is in a position to be used by a viewer. The slave cassette 28 is then transferred to the output station 50 and is transferred into the station for disposition in a stacked relationship.

FIG. 36 is a schematic block diagram of a system for regulating the heat produced by the heater 172 and for providing an almost instantaneous heating of the heater on a regulated basis when the apparatus shown in FIGS. 1–35 initially becomes operative. In FIG. 36, the heater 70 is shown as an equivalent electrical resistance. The system shown in FIG. 36 includes a potentiometer 380 having an adjustable arm 382. The voltage on the adjustable arm 382 is introduced to a circuit 384 which multiplies the adjustable voltage by a transfer function such as a time constant to obtain a signal representing the desired amount of power to be introduced to the heater 70.

The signal from the time constant circuit 384 is introduced to a differencing circuit 386 which also receives a signal input from a wattmeter 388. The output from the differencing circuit 386 is introduced to an integrator 390. The output from the integrator 390 in turn passes to a stage 392 for obtaining a square root of the output from the integrator. The output from the square root stage 392 then passes to a multiplier 394 which also receives a signal on a line 396. The signal on the line 396 is an alternating signal having a particular waveform such as a sine wave or a square wave. A power amplifier 398 receives the output signal from the multiplier 394 and introduces an amplified signal to the heater 70. The input current and voltage to the heater are introduced to the wattmeter 388.

As will be seen, the system shown in FIG. 36 constitutes a closed loop servo for regulating the power introduced to the heater 70 in accordance with a desired amount of power represented by the voltage on the adjustable arm 382 of the potentiometer 380. This voltage is varied by the time constant provided by the stage 384. The resultant signal represents the desired power to be introduced to the heater 70.

The resultant signal from the stage 384 is introduced to the comparator 386 for comparison with the signal from the wattmeter 388. The signal from the wattmeter 288 represents at each instant the amount of power generated by the heater 70 at that instant. The output from the differencing circuit 386 accordingly represents at each instant any difference between the desired power and the actual power introduced to the heater 70 at that instant.

The difference signal from the differencing circuit 386 is introduced to the integrator 390 which integrates the difference signal at progressive instants of time. The output from the integrator 390 is introduced to the stage 392 which determines at each instant the square root of the output from the integrator 390. The output from the stage 392 accordingly represents the power introduced to the heater 70 at that instant.

The square root output from the stage 392 is in the form of a variable direct voltage. This signal is introduced to the multiplier 394 for multiplication with an alternating signal, such as a sine wave signal or a square wave signal, on the line 396. The resultant alternating signal is amplified by the amplifier 398 and the amplified signal is introduced to the heater 70.

In this way, the heat produced in the heater 70 at each instant is regulated in accordance with a desired amount of heat as represented by the voltage on the adjustable arm 382 of the potentiometer 380. The square root function 392 assures a relatively constant servo loop gain. Without the square root function 392, relatively small changes in the position of the potentiometer arm 382 at typical operating powers will cause large instantaneous changes in the heater power. It will be appreciated that the potentiometer 380 can be replaced by other command means such as a digital-to-analog converter connected to a microprocessor. The system shown in FIG. 36 and discussed above provides this regulation on an instantaneous basis. For example, this regulation is provided in less than a second after the slave tape 12 starts to move.

The time constant stage 384 and the integrator 390 may be caged while the system shown in FIGS. 1–35 is not in use. When the time constant stage 384 and the integrator 390 are caged, a low amount of power is introduced to these stages to prepare the system shown in FIG. 36 for instantaneous operation when the transfer of information from the master tape 10 to the slave tape 12 is initiated. When the transfer of information from the mirror-master tape 10 to the slave tape 12 is initiated, the time constant stage 384 and the integrator 390 are uncaged.

When the slave tape 12 passes over the heater 70 and the capstan 72 with the capstan 72 disposed in abutting relationship to the pinch roller 50 and with the capstan and the pinch roller at the 0° positions, the heater 70 heats the thermomagnetic layer 14 on the slave tape above the Curie temperature. The thermomagnetic layer 14 in the slave tape 12 can have about five hundred milligrams (500 mg) of water for an eight hundred foot (800') tape. Some of this water is converted to steam by the heat from the heater 70. The steam causes the thermomagnetic layer 14 of the slave tape 12 to become separated from the surface of the heater. The steam also constitutes a variable barrier to the transfer of heat from the heater 70 to the thermomagnetic layer 14 on the slave tape 12. Similarly, other materials in the tape with volatile properties, as well as air, can cause a thermal barrier to the transfer of heat.

The system constituting this invention regulates at a substantially constant value the amount of power transferred by the heater 70 to the thermomagnetic layer 14 on the slave tape 12. When the steam produced from the water in the thermomagnetic layer 14 causes the thermomagnetic layer 14 to be separated from the external surface of the heater 70, the constant power from the heater causes the temperature of the heater to rise to such a temperature that the constant power is conducted through the steam barrier to the thermomagnetic layer. This localized increase in the temperature of the heater 70 sometimes causes the heater to crack after a relatively limited period of time.

To increase the life of the heater 70, the system of this invention removes some of the water from the thermomagnetic layer 14 on the slave tape 12 before the image on the mirror-master tape 10 is transferred to the thermomagnetic layer. For example, the system of this invention may remove about two hundred milligrams (200 mg) of water from the thermomagnetic layer 14 on the slave tape 12. By removing this water from the thermomagnetic layer 14 on the slave tape 12, the system of this invention inhibits the thermomagnetic layer 14 from becoming separated from the heater 70 during the transfer of the image on the mirror-master tape 10 to the thermomagnetic layer 14 on the slave tape 12.

Two alternative arrangements may be provided for removing water from the thermomagnetic layer 14 of the slave tape 12 before the image on the mirror-master tape 10 is transferred to the thermomagnetic layer 14 on the slave tape 12. In one arrangement, the heater 70 is heated with the capstan 72 and the heater at the 0° position. The pinch roller 50 can be displaced from the capstan 72 or preferably can be disposed in an abutting relationship with the capstan. In this arrangement, the tape is moved in a direction opposite to that in which the image on the mirror-master tape 10 is transferred to the thermomagnetic layer 14 on the slave tape 12. The operation of the heater 70 may be under the control of the controller 84 in FIG. 1.

In the other arrangement, the capstan 72 and the heater 70 may be at the 15° position. In this arrangement, the slave tape 12 may be passed through a microwave oven 400 (FIG. 40) whose operation is regulated to remove water from the thermomagnetic layer of the slave tape. At the 15° position, the pinch roller 50 does not abut the capstan 72. As will be appreciated, this occurs before the slave tape 12 is moved to the 0° position. Alternatively, the microwave oven 400 may be disposed at the 0° position and the water may be removed by the microwave oven from the thermomagnetic layer 14 of the slave tape 12 in either the rewind or the transfer directions of the slave tape or in both directions.

It will be appreciated that the water can be removed from the tape 12 without converting the water to vapor. This is considered to be within the scope of applicants' invention. The water can also be removed from the tape 12 at a temperature below the Curie temperature if the Curie temperature is relatively high. It is also within the scope of the invention to remove the water from the tape 10 during the step of transferring the information on the mirror-master tape 10. For example, the speed of the mirror-master tape 10 and the slave tape 10 can be reduced during the transfer of the information on the master tape to the slave tape to remove the water from the slave tape during the transfer process.

As previously described, the slave tape 12 is heated above the Curie temperature when it reaches the capstan 72 during the operation of transferring the image on the mirror-master tape 10 to the thermomagnetic layer 14 on the slave tape. The thermomagnetic layer 14 on the slave tape 12 then becomes cooled by the mirror-master tape 10 below the Curie temperature when it contacts the mirror-master tape 10 at the abutting positions of the capstan 72 and the pinch roller 50. In this way, the image on the mirror-master tape 10 becomes transferred to the thermomagnetic layer 14 on the slave tape 12 at the abutting positions of the capstan 72 and the pinch roller 50.

Although the temperature of the thermomagnetic layer 14 on the slave tape 12 is below the Curie temperature at the abutting position with the mirror-master tape 10, this temperature is significantly above ambient. This causes the slave tape 12 to be stretched significantly in length relative to its length at ambient temperatures. When the length of the thermomagnetic layer 14 on the tape 12 has contracted from its length at the elevated temperatures to its length at ambient temperatures, errors are produced in the image on the slave tape 12 if a compensation has not been provided for the contraction in the length of the slave tape. These errors result from the contraction in the lengths of the lines in the raster scans defining the image on the thermomagnetic layer 14 of the slave tape 12 when the thermomagnetic layer contracts from its length at the elevated temperatures to its length at ambient temperatures.

To overcome the disadvantage discussed in the previous paragraph, compensation should be provided for the contraction in the length of the lines in the raster scan on the thermomagnetic layer 14 of the slave tape 12 as the length of the slave tape contracts from its length at the elevated temperatures to its length at ambient temperatures. This compensation may be provided by increasing the length of the lines in the raster scan on the mirror-master tape 10 relative to the length of the lines in the raster scan on a master tape 410.

In one embodiment shown in FIG. 37, the mirror-master tape 10 may be disposed on a rotary member such as a cylinder 414 and the master tape 410 may be disposed on a rotary member such as a cylinder 416. The cylinder 414 may be provided with a greater diameter than the cylinder 416. The relative diameters of the cylinders 414 and 416 may correspond to the relative lengths of the slave tape 12 at the elevated temperatures when it contacts the mirror-master tape 10 and at the ambient temperature of the slave tape after it has cooled.

In the relationship discussed in the previous paragraph, the cylinders 414 and 416 may be rotated at the same angular speeds. During such rotations, the information on the master tape 410 may be read by a magnetic head 418 disposed in contiguous relationship to the master tape and may be transferred to the mirror-master tape 10 by a magnetic head 420 disposed in contiguous relationship to the mirror-master tape. The resultant lines in the raster scan on the mirror-master tape 10 have the same stretched relationship as the lines on the slave tape 12 when the slave tape is at the elevated temperature. When the slave tape 12 cools to an ambient temperature, the lines in the raster scan on the thermomagnetic layer 14 of the slave tape 12 have the same relationship as the lines in the raster scan on the master tape 410. Furthermore, the width of the slave tape 12 at ambient temperatures corresponds to the width of the master tape 410. In this way, the image on the slave tape 12 at ambient temperatures is a duplicate of the image on the master tape 410.

As previously described, it is desirable to wind the slave tape 12 on the supply reel 22 in the slave cassette 28 through a distance corresponding to the length of the image on the mirror-master tape 10. During this time, the image on the mirror-master tape 10 is transferred to the thermomagnetic layer 14 on the slave tape 12. In this way, the slave tape cassette 28 is ready for the image on the thermomagnetic layer 14 of the slave tape 12 to be displayed to a viewer.

In order to transfer the image on the mirror-master tape 10 to the thermomagnetic layer 14 on the slave tape 12 so that the full image is provided on the thermomagnetic layer and the slave tape is in position to display the image without any lost time in the playback operation, the length of the image on the mirror-master tape 10 has to be known. This can be determined by techniques well known in the art. It is also desirable to know the length of the slave tape. This can be determined by arrangements individual to this invention. From the length of the image on the master tape and the length of the slave tape, a determination can be made of the angle through which the slave tape has to be wound in the supply reel 22 or unwound from the take-up reel 24 in the cassette 28 in order for the image on the mirror-master tape 10 to be transferred to the slave tape 12 without any excess length of the slave tape on the supply reel.

One arrangement for determining the length of the slave tape 12 includes the use of a reference tape 430 (FIG. 38) of a known length such as eight hundred feet (800'). This tape is wound on one of the supply reel 16 or the take-up reel 18 in the mirror-master tape cassette 21 and the slave tape 12 is disposed on the supply reel 22 or the pinch roller 24. In FIG. 38, only the take-up reel 18 is shown. The capstan 72 and the pinch roller 50 are disposed in contiguous relationship in the 0° position.

The capstan 72 and the pinch roller 50 are then rotated so that the reference tape 430 becomes transferred between the supply reel 16 and the take-up reel 18 in FIG. 1. The angular revolution of the capstan 72 is then measured. The length of the reference tape can be divided by the angular revolution in moving the reference tape from the tape beginning to the tape end to give the distance per revolution of the capstan, which is the circumference of the capstan. Thereafter, as a tape of unknown length is moved in a non-slipping contact with the capstan, the length of the tape is defined by the previously determined circumference of the capstan times the number of revolutions of the capstan.

In another arrangement shown in FIG. 39, a mirror-master tape is run from leader to leader, that is, from end to end, and the revolution angle of the capstan 72 is measured during this tape movement. The revolution angle is a measure of the length of the tape. The length of the tape is stated as the number of revolutions of the capstan. The actual length in a defined unit such as meters is not known. If the slave tape 12 is moved on the same capstan, its length can also be stated in terms of the number of the number of revolutions of the capstan.

The image on the mirror-master tape is begun not at the beginning of the mirror-master-tape but rather the image is begun at some relatively small, but defined, distance from the beginning of the mirror-master tape 10. For example, the image can begin one meter (1 m.) from the beginning of the mirror-master tape 10. Likewise, the image stops a known distance from the end of the mirror-master-tape 10 e.g., a distance of 2 two meters (2 m.). The image on the slave tape 72 can start at the beginning of the slave tape, not after some distance as is the case for mirror-master tapes. For image transfer, the slave tape beginning is placed at the beginning of the image on the mirror-master tape, not at the mirror-master tape beginning.

The positioning of the master tape relative to the beginning of the slave tape is located with little error because the diameter of the capstan can be illustratively known to two tenths of one percent (0.2%) accuracy. If the capstan diameter is known to such accuracy, the error is small in computing the one meter (1 m.) distance in terms of the circumference and the number of revolutions of the capstan. The beginning of the slave tape 12 is located one meter (1 m.) from the beginning of the mirror-master tape 12, and therefore the image transfer starts at the beginning of the slave tape. The measurement of the distance of the two tapes in contact is made by using revolutions of the capstan, rather than computed distances, since the known master tape was measured in terms of revolutions of the capstan. This insures high length accuracy for images that can be hundreds of meters long.

Another arrangement shown in FIG. 39 for determining the length of the slave tape 12 can also be used. In this arrangement, the slave tape 12 is transferred between the supply reel 22 and the take-up reel 24. As this transfer occurs, the angular revolutions of the supply reel 22 and the take-up reel 24 are respectively measured by detectors 440 and 442 at three (3) successive instants of time. Subscripted symbols are used to represent the rotation angles of the reels 22 and 24. The first number in the subscript is 1 for the reel 22 and 2 for the reel 24. The second number in the subscript indicates the measurement instant of time. For example, 1 indicates the first measurement instant of time and 3 indicates the third measurement instant of time. For example, a representation $\theta_{11}$ indicates the first measurement instant of time of rotation angle in the reel 22. Similarly, a representation $\theta_{23}$ indicates the third measurement instant of time of the rotation angle in the reel 24.

From the above, an equation can be written as follows:

$$\theta_f = \frac{(\theta_{22}^2 + \theta_{12}^2 - \theta_{23}^2 - \theta_{13}^2)(\theta_{12} - \theta_{11} + \theta_{21} - \theta_{22}) + (\theta_{22}^2 + \theta_{12}^2 - \theta_{21}^2 - \theta_{11}^2)(\theta_{13} - \theta_{12} + \theta_{22} - \theta_{23})}{2[(\theta_{22}^2 - \theta_{21})(\theta_{13} - \theta_{12} + \theta_{22} - \theta_{23}) + (\theta_{22} - \theta_{23})(\theta_{12} - \theta_{11} + \theta_{21} - \theta_{22})]} \quad (1)$$

In the above equation, $\theta_f$ indicates the angular rotation of a particular one of the capstan 72, the supply reel 22 or the take-up reel 24 to transfer the slave tape 12 between the supply and take-up reels.

A measurement is then made of the radius of the particular one of the supply reel 22 or the take-up reel 24 without any tape on such reel. As an alternative, the radius may be assumed to be known from the specifications for that type of cassette. For an empty reel of a radius R, the thickness d of the slave tape 12, may be determined from the following equation:

$$d = \frac{4\pi R(\theta_{12} + \theta_{21} - \theta_{11} - \theta_{22})}{\theta_{21}^2 + \theta_{11}^2 - \theta_{22}^2 - \theta_{12}^2 + 2\theta_f(\theta_{22} - \theta_{21})} \quad (2)$$

where $d$ = the thickness of the tape 12.

The length $S_f$ of the slave tape 12 may then be determined from the following equation:

$$S_f = \frac{d}{4\pi} \theta_f^2 + R\theta_f \quad (3)$$

The angular revolution B of the particular one of the supply reel 22 and the take-up reel 24 for transferring an image of length L to the slave tape 12 may then be determined from the following equation:

$$\beta = 2\pi \frac{(R^2 + L d_n^{1/2} - R)}{d} \quad (4)$$

In the above equation, L indicates a desired length of tape, e.g. the length of the image on the slave tape 12.

Another arrangement shown in FIG. 39 for determining the length of the slave tape 12 can also be used. In this arrangement, the slave tape 12 is transferred between the supply reel 22 and the take-up reel 24. The relationship between the length of the slave tape 12, the radius of the spool, the thickness of the tape, and the number of turns of the tape on the spool is:

$$S = N\pi(2R+Nd) \quad (5)$$

where

N=the number of turns of the tape;
R=the radius of the spool;
d=the thickness of the tape;
S=the length of the tape.

This equation can be solved for any one (1) of the four variables in terms of the other three.

Initially the cassette has an empty spool and a more full spool. The length of tape run at any instant is known through the measurement of the revolutions of the capstan. The number of revolutions of the empty cassette is measured for a small number of revolutions, e.g. eight (8) revolutions. Assume a tape thickness such as nineteen microinches (19μ"). Using the formula (5) above, the radius of the hub can be computed. The error in the hub radius is small, since the error caused by the tape thickness being off by, e.g. ten microns (10 μ), is small for the eight (8) turns.

For this same instant, consider the more full spool. Using the same tape thickness assumed earlier, the number of revolutions of the more full spool is measured. A measurement is also made of the length of tape removed from the spool which equals the length of the tape measured by the revolutions of the capstan. Using the formula (5) above, the radius of a fictitious large hub on the more full spool is computed.

Assume that the hub radius on the more full spool is in fact not the radius of the fictitious hub, but rather it is the radius of the empty hub already computed. Then the number of layers of tape between the fictitious radius and the empty hub radius is the difference between them divided by the assumed tape thickness. Add to this number of layers the number of turns measured for the more full spool. Now solve the formula for the length of the tape on the full reel using the number of turns on the more full spool, using the computed empty hub radius, and using the assumed thickness of the tape. This is the first (not so accurate) estimate of the total length of the tape on the cassette.

When the spools have run to about one third of the tape length computed above, compute the tape thickness using the number of revolutions of the empty spool, the radius of the hub, and the length of the tape as metered by the revolutions of the capstan. This is an accurate measure of the tape thickness, and the total length of tape can be computed using the method of the previous paragraph. Thus the tape length, the tape width, the number of turns, and the hub radius can be computed.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave tape, the following steps:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat the thermomagnetic layer on the slave tape above the Curie temperature before the movement of the slave tape to the capstan, removing water from the thermomagnetic layer of the slave tape, and providing a rotation of the capstan and the pinch roller and an operation of the heater to provide for a transfer of the information on the mirror-master tape to the thermomagnetic layer on the slave tape.

2. In a method as set forth in claim 1 wherein the water is removed from the thermomagnetic layer of the slave tape during a first rotation of the capstan and the image on the mirror-master tape is transferred to the to the slave tape during a successive rotation of the capstan.

3. In a method as set forth in claim 2 wherein the capstan is disposed in contiguous relationship to the pinch roller during the transfer of the image on the master tape to the slave tape and the pinch roller is movable between the position contiguous to the capstan and a position displaced from the capstan and the pinch roller is disposed in a selected one of the contiguous and displaced positions when the water is removed from the slave tape.

4. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave tape, the following steps:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat the thermomagnetic layer on the slave tape above the Curie temperature before the movement of the slave tape to the capstan, removing water from the thermomagnetic layer of the slave tape, and providing a rotation of the capstan and the pinch roller and an operation of the heater to provide for a transfer of the information on the mirror-master tape to the thermomagnetic layer on the slave tape, the capstan being rotated in a first direction to transfer the image on the mirror-master tape to the slave tape and being rotated in a second direction opposite to the first direction with the heater operative, before the rotation of the capstan in the first direction, to remove water from the thermomagnetic layer of the slave tape during such rotation of the slave tape in the second direction.

5. In a method as set forth in claim 4 wherein the pinch roller is disposed in displaced relationship to the capstan during the rotation of the capstan in the opposite direction to remove water from the thermomagnetic layer of the slave tape and is disposed in contiguous relationship to the capstan during the rotation of the capstan in the first direction to transfer the images on the mirror-master tape to the slave tape.

6. In a method as set forth in claim 4 wherein the pinch roller is disposed in contiguous relationship to the capstan during the rotation of the capstan in the opposite direction to remove water from thermomagnetic layer of the slave tape and is disposed in contiguous relationship to the capstan during the rotation of the capstan in the first direction to transfer the images on the mirror-master tape to the slave tape.

7. In a method as set forth in claim 4 wherein the pinch roller is movable between a first position abutting the capstan and a second position displaced from the capstan and the image on the mirror-master tape is transferred to the thermomagnetic layer on the slave tape with the pinch roller in the first position and water is removed from the thermomagnetic layer on the slave tape with the pinch roller in the first position.

8. In a method as set forth in claim 4 wherein the pinch roller is movable between a first position abutting the capstan and a second position displaced from the capstan and the image on the mirror-master tape is transferred to the thermomagnetic layer on the slave tape with the pinch roller in the first position and water is removed from the thermomagnetic layer on the slave tape with the pinch roller in the second position.

9. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave tape, the following steps:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat the thermomagnetic layer on the slave tape above the Curie temperature before the movement of the slave tape to the capstan, removing water from the thermomagnetic layer of the slave tape, and providing a rotation of the capstan and the pinch roller and an operation of the heater to provide for a transfer of the information on the mirror-master tape to the thermomagnetic layer on the slave tape, the pinch roller being movable between a first position abutting the capstan and a second position displaced from the capstan and the image on the mirror-master tape being transferred to the thermomagnetic layer on the slave tape with the pinch roller in the first position and water being removed from the thermomagnetic layer on the slave tape with the pinch roller in the second position.

10. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave tape, the following step:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat the thermomagnetic layer on the slave tape above the Curie temperature before the movement of the slave tape to the capstan, removing water from the thermomagnetic layer of the slave tape, and providing a rotation of the capstan and the pinch roller and an operation of the heater to provide for a transfer of the information on the mirror-master tape to the thermomagnetic layer on the slave tape, the pinch roller being movable between a first position abutting the capstan and a second position displaced from the capstan and the image on the mirror-master tape being transferred to the thermomagnetic layer on the slave tape with the pinch roller in the first position and water being removed from the thermomagnetic layer on the slave tape with the pinch roller in the first position.

11. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave the following steps:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat the thermomagnetic layer on the slave tape above the Curie temperature before the movement of the slave tape to the capstan, removing water from the thermomagnetic layer of the slave tape, and providing a rotation of the capstan and the pinch roller and and operation of the heater to provide for a transfer of the information on the mirror-master tape to the thermomagnetic layer on the slave tape, the water being removed from the thermomagnetic layer of the slave tape and the image on the mirror-master tape being transferred to the slave tape in the same rotation of the capstan.

12. In a method as set forth in claim 11 wherein the pinch roller is disposed in contiguous relationship to the capstan to rotate the capstan for the removal of water from the slave tape and the transfer of the image on the mirror-master tape to the thermomagnetic layer of the slave tape.

13. In a method of transferring an image on a mirror-master tape to a slave tape where the slave tape has a thermomagnetic layer with a Curie temperature above which an image on the thermomagnetic layer of the slave tape is destroyed and below which information on the mirror-master tape can be transferred to the slave tape, the steps of:

disposing the slave tape on the capstan with the thermomagnetic layer facing outwardly from the capstan, disposing the mirror-master tape on the pinch roller, disposing the pinch roller in abutting relationship to the capstan, disposing a heater in contiguous relationship to the capstan, disposing the slave tape on the heater with the thermomagnetic layer facing the heater, rotating the pinch roller and the capstan and heating the heater to provide for a transfer of the image on the mirror-master tape to the slave tape, and operating on the thermomagnetic layer of the slave tape, before the transfer of the image on the mirror-master tape to the slave tape, to inhibit the slave tape from being separated from the heater during the operation of transferring the image on the mirror-master tape to the thermomagnetic layer on the slave tape, the slave tape being moved by the capstan before the transfer of the image on the mirror-master tape to the thermomagnetic layer on the slave tape and the thermomagnetic layer on the slave tape being heated during such movement to inhibit the slave tape from being separated from the heater during the transfer of the image on the mirror-master tape to the thermomagnetic layer on the slave tape.

14. In a method as set forth in claim 13 wherein a regulated amount of heat is applied to the thermomagnetic layer on the slave tape to remove water from the thermomagnetic layer on the slave tape during the movement of the slave tape before the transfer of the image on the mirror-master tape to the thermomagnetic layer on the slave tape.

15. In a method as set forth in claim 14 wherein the slave tape is moved in a first direction during the transfer of the image on the mirror-master tape to the thermomagnetic layer on the slave tape and is moved in the opposite direction before the transfer of the image on the mirror-master tape to the thermomagnetic layer on the slave tape.

16. In a method of transferring an image on a mirror-master tape to a slave tape where the slave tape has a thermomagnetic layer with a Curie temperature above which an image on the thermomagnetic layer of the slave tape is destroyed and below which information on the mirror-master tape can be transferred to the slave tape, the steps of:

disposing the slave tape on the capstan with the thermomagnetic layer facing outwardly from the capstan, disposing the mirror-master tape on the pinch roller, disposing the pinch roller in abutting relationship to the capstan, disposing a heater in contiguous relationship to the capstan, disposing the slave tape on the heater with the thermomagnetic layer facing the heaters, rotating pinch roller and the capstan and heating the heater to provide for a transfer of the image on the mirror-master tape to the slave tape, and operating on the thermomagnetic layer of the slave tape, before the transfer of the image on the mirror-master tape to the slave tape, to inhibit the slave tape from being separated from the heater during the operation of transferring the image on the mirror-master tape to the thermomagnetic layer on the slave tape, the water being removed from the slave tape in a first rotation of the capstan and the image on the mirror-master tape being transferred to the slave tape in a second rotation of the capstan.

17. In a method as set forth in claim 16 wherein the capstan and the pinch roller have a first relationship with capstan disposed in contiguous relationship to the pinch roller and have a second relationship with the capstan displaced from the pinch roller and wherein the capstan and the pinch roller have a selected one of the first and second relationships when the capstan is rotated to obtain a removal of the water from the slave tape.

18. In a method of transferring an image on a mirror-master tape to a slave tape where the slave tape has a thermomagnetic layer with a Curie temperature above which an image on the thermomagnetic layer of the slave tape is destroyed and below which information on the mirror-master tape can be transferred to the slave tape, the steps of:

disposing the slave tape on the capstan with the thermomagnetic layer facing outwardly from the capstan, disposing the mirror-master tape on the pinch roller, disposing the pinch roller in abutting relationship to the capstan, disposing a heater in contiguous relationship to the capstan, disposing the slave tape on the heater with the thermomagnetic layer facing the heaters, rotating the pinch roller and the capstan and heating the heater to provide for a transfer of the image on the mirror-master tape to the slave tape, and operating on the thermomagnetic layer of the slave tape, before the transfer of the image on the mirror-master tape to the slave tape to inhibit the slave tape from being separated from the heater during the operation of transferring the image on the mirror-master tape to the thermomagnetic layer on the slave tape, the water being removed from the slave tape in a rotation of the capstan and the image on the mirror-master tape being transferred to the slave tape in the same rotation of the capstan.

19. In a system for transferring an image on a mirror-master tape to a thermomagnetic layer on a slave tape where the thermomagnetic layer has a Curie temperature above which any image on the thermomagnetic layer is destroyed and below which an image on the mirror-master tape can be transferred to the slave tape, a rotatable capstan for holding the slave tape on its periphery with the thermomagnetic layer facing away from the capstan, first means for rotating the capstan, second means for disposing the mirror-master tape in abutting relationship to the slave tape to obtain a transfer of the image on the mirror-master tape to the thermomagnetic layer on the slave tape during the rotation of the capstan, a heater disposed in contiguous relationship to the capstan for receiving the slave tape on its periphery with the thermomagnetic layer facing the heater, third means for heating the heater to obtain a temperature above the Curie temperature in the thermomagnetic layer of the slave tape during the rotation of the capstan to obtain a transfer of the image on the mirror-master tape to the slave tape, and fourth means operative on the thermomagnetic layer of the slave tape before the transfer of the image on the mirror-master tape to the thermomagnetic layer on the slave tape for inhibiting the slave tape from being separated from the periphery of the heater during such image transfer, the fourth means including means for providing a rotation of the capstan in a direction opposite to the direction of rotation of the capstan during the transfer of the image on the mirror-master tape to the thermomagnetic layer on the slave tape and for providing a heating operation of the heater during the rotation of the capstan in the opposite direction.

20. In a system for transferring an image on a mirror-master tape to a thermomagnetic layer on a slave tape where the thermomagnetic layer has a Curie temperature above which any image on the thermomagnetic layer is destroyed and below which an image on the mirror-master tape can be transferred to the slave tape, a rotatable capstan for holding the slave tape on its periphery with the thermomagnetic layer facing away from the capstan, first means for rotating the capstan, second means for disposing the mirror-master tape in abutting relationship to the slave tape to obtain a transfer of the image on the mirror-master tape to the thermomagnetic layer on the slave tape during the rotation of the capstan, a heater having a periphery and disposed in contiguous relationship to the capstan for receiving the slave tape on its periphery with the thermomagnetic layer facing the heater, third means for heating the heater to obtain a temperature above the Curie temperature in the thermomagnetic layer of the slave tape during the rotation of the capstan to obtain a transfer of the image on the mirror-master tape to the slave tape, and fourth means operative on the thermomagnetic layer of the slave tape during the rotation of the capstan but before the transfer of the image on the mirror-master tape to the thermomagnetic layer on the slave tape for inhibiting the slave tape from being separated in a direction transverse to the periphery of the heater in a direction transverse to the periphery of the heater during such image transfer, the fourth means being operative to remove water from the thermomagnetic layer of the slave tape during the rotation of the capstan but before the transfer of the image on the mirror-master tape to the thermomagnetic layer on the slave tape.

21. In a system for transferring an image on a mirror-master tape to a thermomagnetic layer on a slave tape where the thermomagnetic layer has a Curie temperature above which any image on the thermomagnetic layer is destroyed and below which an image on the mirror-master tape can be transferred to the slave tape, a rotatable capstan for holding the slave tape on its periphery with the thermomagnetic layer facing away from the capstan, first means for rotating the capstan, second means for disposing the mirror-master tape in abutting relationship to the slave tape to obtain a transfer of the image on the mirror-master tape to the thermomagnetic layer on the slave tape during the rotation of the capstan, a heater disposed in contiguous relationship to the capstan for receiving the slave tape on its periphery with the thermomagnetic layer facing the heater, third means for heating the heater to obtain a temperature above the Curie temperature in the thermomagnetic layer of the slave tape during the rotation of the capstan to obtain a transfer of the image on the mirror-master tape to the slave tape, fourth means operative on the thermomagnetic layer of the slave tape before the transfer of the image on the mirror-master tape to the thermomagnetic layer on the slave tape for inhibiting the slave tape from being separated from the periphery of the heater during such image transfer, the second means including a pinch roller movable between a first relationship abutting the capstan and a second relationship displaced from the capstan, and means for providing for a disposition of the pinch roller in the first relationship during the transfer of the image on the mirror-master tape to the thermomagnetic layer on the slave tape and for a disposition of the pinch roller in the second relationship during the operation of the fourth means before the transfer of the image on the mirror-master tape to the thermomagnetic layer on the slave tape.

22. In a system for obtaining a transfer of an image on a mirror-master tape to a thermomagnetic layer on a slave tape where the thermomagnetic layer has a Curie temperature above which an image on the thermomagnetic layer is destroyed and below which an image on the mirror-master tape can be transferred to the thermomagnetic layer on the slave tape, a rotatable capstan for holding the slave tape, first means for rotating the capstan, second means disposed in contiguous relationship to the capstan for heating the thermomagnetic layer on the slave tape above the Curie temperature before the movement of the slave tape to the capstan, third means disposed in abutting relationship to the capstan for holding the mirror-master tape and for providing for a transfer of the image on the mirror-master tape to the thermomagnetic layer on the slave tape, fourth means for obtaining an operation of the third means during the rotation of the capstan to obtain a transfer of the image on the mirror-master tape to the thermomagnetic layer on the slave tape, and fifth means for obtaining a removal of water from the thermomagnetic layer of the slave tape before the operation of the fourth means in obtaining a transfer by the third means of the image on the mirror-master tape to the thermomagnetic layer on the slave tape.

23. In a system as set forth in claim 22, the fifth means being operative to heat the thermomagnetic layer on the slave tape to obtain the removal of water from the thermomagnetic layer.

24. In a system for obtaining a transfer of an image on a mirror-master tape to a thermomagnetic layer on a slave tape where the thermomagnetic layer has a Curie temperature above which an image on the thermomagnetic layer is destroyed and below which an image on the mirror-master type can be transferred to the thermomagnetic layer on the slave tape, a rotatable capstan for holding the slave tape, first means for rotating the capstan, second means disposed in contiguous relationship to the capstan for heating the thermomagnetic layer on the slave tape above the Curie temperature before the movement of the slave tape to the capstan, third means disposed in abutting relationship to the capstan for holding the mirror-master tape and for providing for a transfer of the image on the mirror-master tape to the thermomagnetic layer on the slave tape, fourth means for obtaining an operation of the third means during the rotation of the capstan to obtain a transfer of the image on the mirror-master tape to the thermomagnetic layer on the slave tape, and fifth means for obtaining a removal of water from the thermomagnetic layer of the slave tape before the operation of the fourth means in obtaining a transfer by the third means of the image on the mirror-master tape to the thermomagnetic layer on the slave tape, the fifth means being operative to heat the thermomagnetic layer on the slave tape to obtain the removal of water from the thermomagnetic layer, the capstan being rotated in a first direction to obtain the transfer of the image on the mirror-master tape to the thermomagnetic layer on the slave tape, and sixth means operatively coupled to the first means for obtaining a rotation of the slave tape in a direction opposite to the first direction during the operation of the fifth means in removing water from the thermomagnetic layer of the slave tape, the fifth means being operatively coupled to the second means for heating the thermomagnetic layer of the slave tape, during the rotation of the slave tape in the opposite direction, to a temperature above or below the Curie temperature dependent upon the Curie temperature.

25. In a system for obtaining a transfer of an image on a mirror-master tape to a thermomagnetic layer on a slave tape where the thermomagnetic layer has a Curie temperature above which an image on the thermomagnetic layer is destroyed and below which an image on the mirror-master tape can be transferred to the thermomagnetic layer on the slave tape, a rotatable capstan for holding the slave tape, first means for rotating the capstan, second means disposed in contiguous relationship to the capstan for heating the thermomagnetic layer on the slave tape above the Curie temperature before the movement of the slave tape to the capstan, third means disposed in abutting relationship to the capstan for holding the mirror-master tape and for providing for a transfer of the image on the mirror-master tape to the thermomagnetic layer on the slave tape, fourth means for obtaining an operation of the third means during the rotation of the capstan to obtain a transfer of the image on the mirror-master tape of the thermomagnetic layer on the slave tape, and fifth means for obtaining a removal of water from the thermomagnetic layer of the slave tape before the operation of the fourth means in obtaining a transfer by the third means of the image on the mirror-master tape to the thermomagnetic layer on the slave tape, the fifth means constituting a microwave oven for heating the thermomagnetic layer on the slave tape to obtain the removal of water from the thermomagnetic layer of the slave tape before the operation of the fourth means in obtaining a transfer by the third means of the image on the mirror-master tape to the thermomagnetic layer on the slave tape.

26. In a system for obtaining a transfer of an image on a mirror-master tape to a thermomagnetic layer on a slave tape where the thermomagnetic layer has a Curie temperature above which an image on the thermomagnetic layer is destroyed and below which an image on the mirror-master tape can be transferred to the thermomagnetic layer on the slave tape, a rotatable capstan for holding the slave tape, first means for rotating the capstan, second means disposed in contiguous relationship to the capstan for heating the thermomagnetic layer on the slave tape above the Curie temperature before the movement of the slave tape to the capstan, third means disposed in abutting relationship to the capstan for holding the mirror-master tape and for providing for a transfer of the image on the mirror-master tape to the thermomagnetic layer on the slave tape, fourth means for obtaining an operation of the third means during the rotation of the capstan to obtain a transfer of the image on the mirror-master tape to the thermomagnetic layer on the slave tape, and fifth means for obtaining a removal of water from the thermomagnetic layer of the slave tape before the operation of the fourth means in obtaining a transfer by the third means of the image on the mirror-master tape to the thermomagnetic layer on the slave tape, the capstan being rotatable in a first direction to obtain a transfer of the image on the mirror-master tape to the thermomagnetic layer on the slave tape, the capstan being rotatable in a second direction opposite to the first direction to obtain a removal of water from the thermomagnetic layer of the slave tape, the fifth means being operative during the rotation of the capstan in the second direction for obtaining the 27. In a system as set forth in claim 26, the fifth means being operative during the rotation of the capstan in the second direction for obtaining a heating of the thermomagnetic layer of the slave tape by the second means to a temperature above or below the Curie temperature dependent upon the Curie temperature.

28. In a method of transferring an image on a mirror-master tape to a thermomagnetic layer on a slave tape where the thermomagnetic layer has a Curie temperature above which any image on the thermomagnetic layer of the slave tape is destroyed and below which an image on the mirror-master tape is capable of being transferred to the thermomagnetic layer on the slave tape, the steps of:

removing water from the thermomagnetic layer of the slave tape before any transfer of the image on the mirror-master tape to the thermomagnetic layer on the slave tape, thereafter moving the mirror-master tape and the slave tape past a position of abutment between the mirror-master tape and the thermomagnetic layer on the slave tape to obtain a transfer of the image on the mirror-master tape to the thermomagnetic layer on the slave tape at the position of abutment, and heating the thermomagnetic layer of the slave tape to a temperature above the Curie temperature at a position contiguous to, but upstream from, the position of abutment between the mirror-master tape and the thermomagnetic layer of the slave tape during the movement of the mirror-master tape and the slave tape to the position of abutment.

29. In a method as set forth in claim 28 wherein the slave tape is heated to remove water from the thermomagnetic layer of the slave tape before the transfer of the image on the mirror-master tape to the thermomagnetic layer of the slave tape.

30. In a method of transferring an image on a mirror-master tape to a thermomagnetic layer on a slave tape where the thermomagnetic layer has a Curie temperature above which any image on the thermomagnetic layer of the slave tape is destroyed and below which an image on the mirror-master tape is capable of being transferred to the thermomagnetic layer on the slave tape, the steps of:

removing water from the thermomagnetic layer of the slave tape before any transfer of the image on the mirror-master tape to the thermomagnetic layer on the slave tape, thereafter moving the mirror-master tape and the slave tape past a position of abutment between the mirror-master tape and the thermomagnetic layer on the slave tape to obtain a transfer of the image on the mirror-master tape to the thermomagnetic layer on the slave tape at the position of abutment, and heating the thermomagnetic layer of the slave tape to a temperature above the Curie temperature at a position contiguous to, but upstream from, the position of abutment between the mirror-master tape and the thermomagnetic layer of the slave tape during the movement of the mirror-master tape and the slave tape to the position of abutment, the mirror-master tape and the slave tape being moved in a first direction to obtain a transfer of the image on the mirror-master tape to the thermomagnetic layer on the slave tape and the slave tape being moved in a second direction opposite to the first direction to obtain a removal of water from the thermomagnetic layer of the slave tape.

31. In a method as set forth in claim 30 wherein a heater is provided to heat the thermomagnetic layer of the slave tape to remove water from the slave tape before the transfer of the image on the mirror-master tape to the thermomagnetic layer of the slave tape as a result of the movement of the mirror-master tape and the slave tape to the position of the abutment.

32. In a method of transferring an image on a mirror-master tape to a thermomagnetic layer on a slave tape where the thermomagnetic layer has a Curie temperature above which any information in the thermomagnetic layer is destroyed and below which an image on the mirror-master tape can be transferred to the slave tape, the following steps:

disposing the mirror-master tape on a pinch roller, disposing the slave tape on a capstan in abutting relationship to the mirror-master tape on the pinch roller, providing a heater in contiguous relationship to the capstan and in the path of movement of the slave tape to heat successive positions on the thermomagnetic layer on the slave tape above the Curie temperature during the movement of such successive positions on the slave tape to the capstan, removing water from the successive positions on the thermomagnetic layer of the slave tape during the movement of such successive positions on the thermomagnetic layer to the capstan, and rotating the capstan and the pinch roller and operating the heater during such rotation to provide for a transfer of the information on the mirror-master tape to the thermomagnetic layer on the slave tape.

33. In a system for obtaining a transfer of an image on a mirror-master tape to a thermomagnetic layer on a slave tape where the thermomagnetic layer has a Curie temperature above which an image on the thermomagnetic layer is destroyed and below which an image on the mirror-master tape can be transferred to the thermomagnetic layer on the slave tape, a rotatable capstan for holding the slave tape, first means for rotating the capstan, second means disposed in contiguous relationship to the capstan for heating the thermomagnetic layer on the slave tape above the Curie temperature before the movement of the slave tape to the capstan, third means disposed in abutting relationship to the capstan for holding the mirror-master tape and for providing for a transfer of the image on the mirror-master tape to the thermomagnetic layer on the slave tape, fourth means for obtaining an operation of the third means during the rotation of the capstan to obtain a transfer of the image on the mirror-master tape to the thermomagnetic layer on the slave tape, and fifth means for obtaining a removal of water from the thermomagnetic layer of the slave tape during the rotation of the capstan before the operation of the fourth means in obtaining a transfer by the third means of the image on the mirror-master tape to the thermomagnetic layer on the slave tape.

34. In a system as set forth in claim 33, the fifth means being operative to heat the thermomagnetic layer on the slave tape during the rotation of the capstan to obtain the removal of water from the thermomagnetic layer.

35. In a method of transferring an image on a mirror-master tape to a thermomagnetic layer on a slave tape where the thermomagnetic layer has a Curie temperature above which any image on the thermomagnetic layer of the slave tape is destroyed and below which an image on the mirror-master tape is capable of being transferred to the thermomagnetic layer on the slave tape, the steps of:

moving the slave tape, removing water from the thermomagnetic layer of the slave tape during the movement of the slave tape before any transfer of the image on the mirror-master tape to the thermomagnetic layer on the slave tape, thereafter moving the mirror-master tape and the slave tape past a position of abutment between the mirror-master tape and the thermomagnetic layer on the slave tape to obtain a transfer of the image on the mirror-master tape to the thermomagnetic layer on the slave tape at the position of abutment, and heating the thermomagnetic layer of the slave tape to a temperature above the Curie temperature at a position contiguous to, but upstream from, the position of abutment between the mirror-master tape and the thermomagnetic layer of the slave tape during the movement of the mirror-master tape and the slave tape to the position of abutment.

36. In a method as set forth in claim 35 wherein the slave tape is heated to remove water from the thermomagnetic layer of the slave tape during the movement of the slave tape but before the transfer of the image on the mirror-master tape to the thermomagnetic layer of the slave tape at the position of abutment between the slave tape and the mirror-master tape.

\* \* \* \* \*